US010253587B2

(12) United States Patent
McGraw et al.

(10) Patent No.: US 10,253,587 B2
(45) Date of Patent: *Apr. 9, 2019

(54) METHOD AND APPARATUS OF HOT TAPPING MULTIPLE COAXIAL OR NESTED STRINGS OF UNDERWATER PIPING AND/OR TUBING FOR OVERTURNED WELLS OR PLATFORMS

(71) Applicant: EPIC Applied Technologies, LLC, The Woodlands, TX (US)

(72) Inventors: Harry McGraw, Broussard, LA (US); Leslie M. Bland, Metairie, LA (US); Daniel S. Bangert, Broussard, LA (US); Mark F. Gravouia, Youngsville, LA (US); Rizal Masingkan, New Iberia, LA (US)

(73) Assignee: EPIC Applied Technologies, LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,613

(22) Filed: Dec. 22, 2017

(65) Prior Publication Data

US 2018/0187813 A1  Jul. 5, 2018

Related U.S. Application Data

(63) Continuation of application No. 14/950,908, filed on Nov. 24, 2015, now Pat. No. 9,851,038, which is a
(Continued)

(51) Int. Cl.
*F16L 41/06* (2006.01)
*E21B 29/12* (2006.01)
(Continued)

(52) U.S. Cl.
CPC ............ *E21B 29/12* (2013.01); *B23B 41/003* (2013.01); *B23B 41/006* (2013.01); *B23B 47/281* (2013.01); *E21B 17/01* (2013.01); *E21B 29/10* (2013.01); *F16L 41/06* (2013.01); *B23B 2215/72* (2013.01); *B23B 2260/008* (2013.01); *B23B 2270/08* (2013.01); *E02B 2017/0052* (2013.01); *Y10T 137/0458* (2015.04); *Y10T 137/0463* (2015.04); *Y10T 137/0469* (2015.04); *Y10T 137/612* (2015.04);
(Continued)

(58) Field of Classification Search
CPC .......... F16L 41/06; E21B 29/12; E21B 29/10; B23B 41/003; Y10T 137/0463; Y10T 137/612; Y10T 137/0458; Y10T 137/6123
See application file for complete search history.

(56) References Cited

U.S. PATENT DOCUMENTS 9,851,038 B2 * 12/2017 McGraw et al. ....... F16L 41/06

* cited by examiner

*Primary Examiner* — Kevin Lee
(74) *Attorney, Agent, or Firm* — Brett A. North

(57) ABSTRACT

A method and apparatus for tapping into a pressurized multiple strings of coaxially situated tubulars for wells and/or platforms which have overturned wherein the tapping occurs underwater via a diver or remotely operated vehicle. The assembly includes a tapping tool connectable to the tubular via a saddle connection and an adjustable tapping clamp with adjustable support/locking feet, compression plate with view ports, and angularly adjustable hot tapping system, along with a drill/saw system.

20 Claims, 47 Drawing Sheets

Related U.S. Application Data continuation of application No. 14/263,088, filed on Apr. 28, 2014, now Pat. No. 9,194,525, which is a continuation of application No. 13/717,890, filed on Dec. 18, 2012, now Pat. No. 8,707,979, which is a continuation of application No. 13/248,781, filed as application No. PCT/US2010/029389 on Mar. 31, 2010, now Pat. No. 8,333,211.

(60) Provisional application No. 61/165,475, filed on Mar. 31, 2009.

(51) Int. Cl.
  *E21B 29/10* (2006.01)
  *B23B 41/00* (2006.01)
  *B23B 47/28* (2006.01)
  *E21B 17/01* (2006.01)
  *E02B 17/00* (2006.01)

(52) U.S. Cl.
  CPC .... *Y10T 137/6123* (2015.04); *Y10T 137/8359* (2015.04); *Y10T 408/563* (2015.01); *Y10T 408/567* (2015.01); *Y10T 408/5612* (2015.01); *Y10T 408/56275* (2015.01)

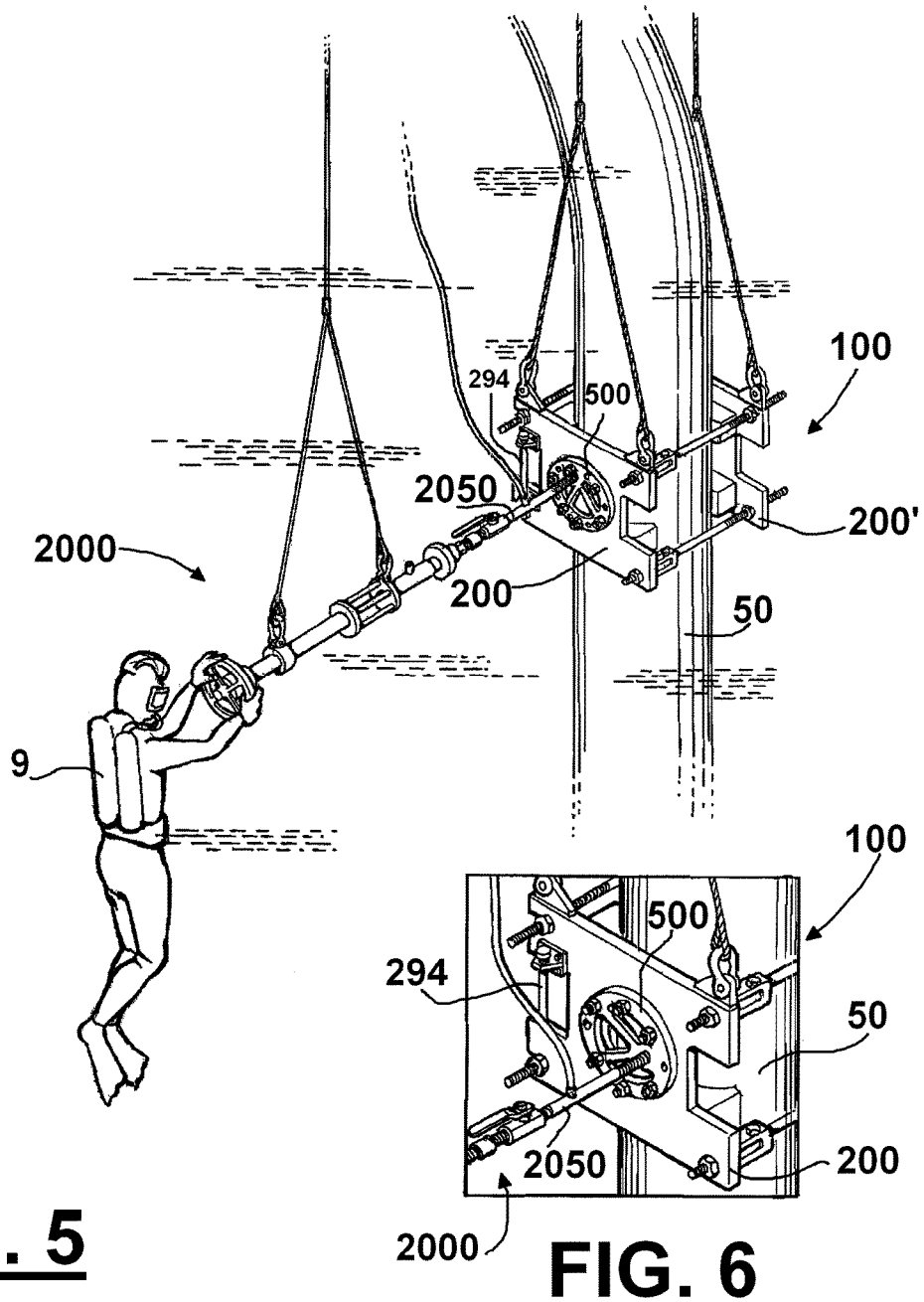

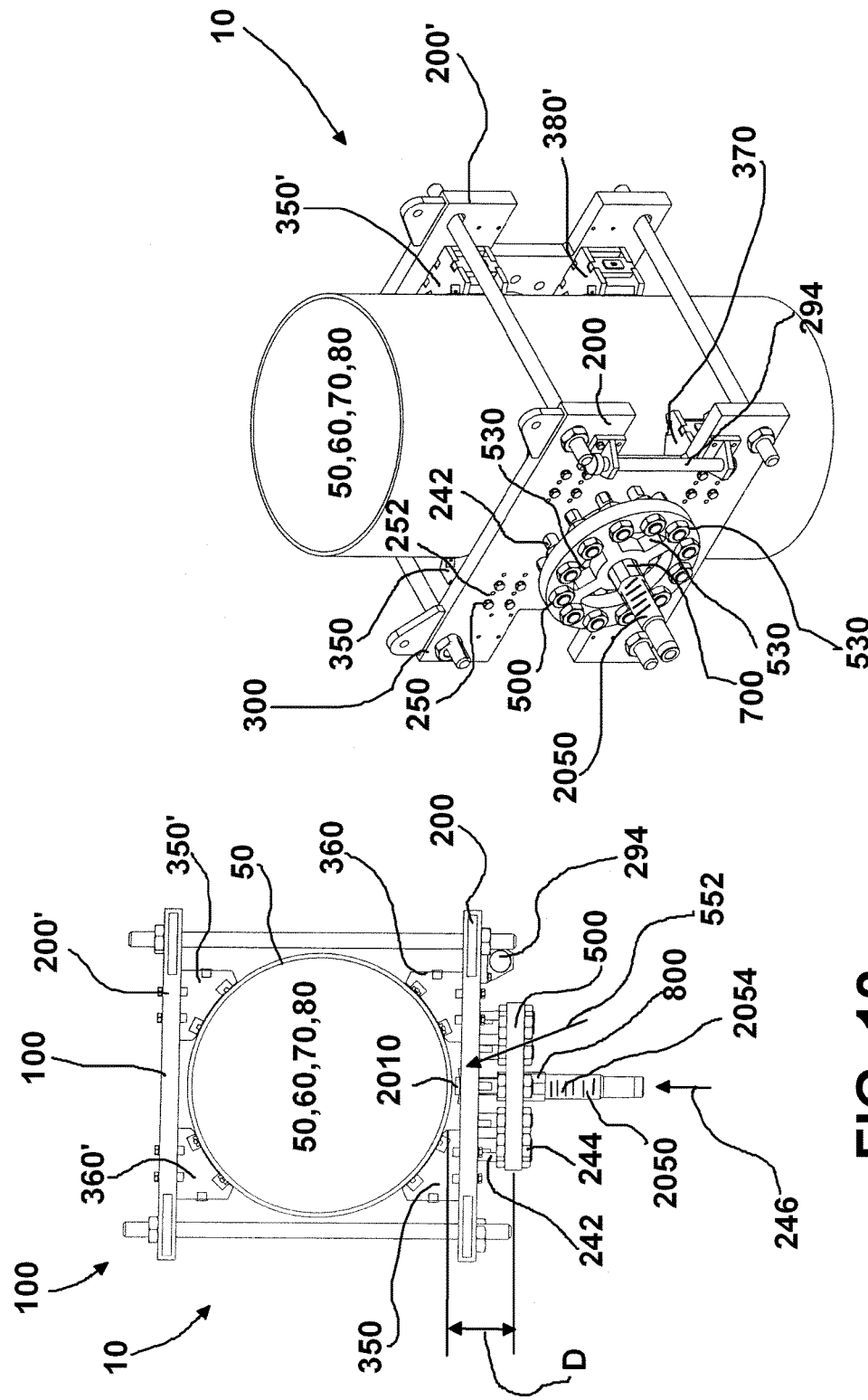

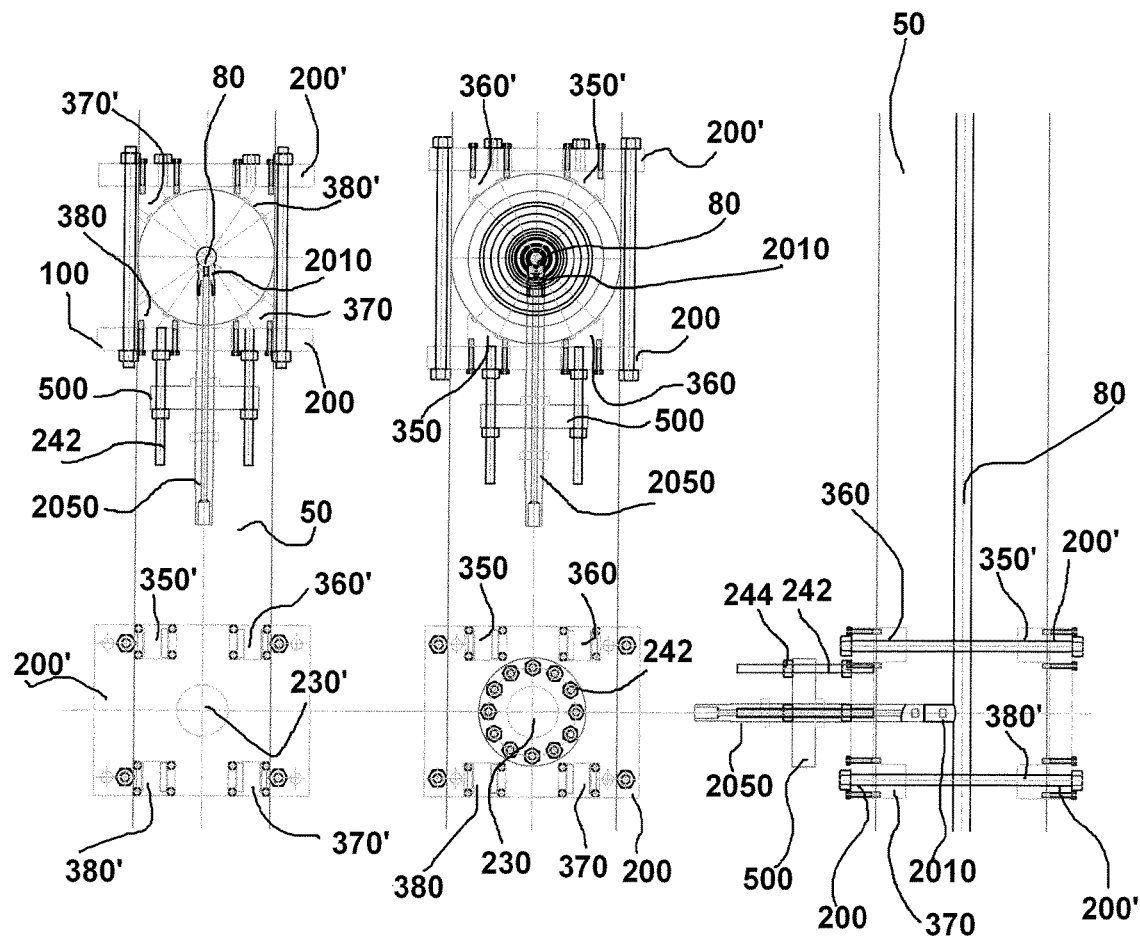

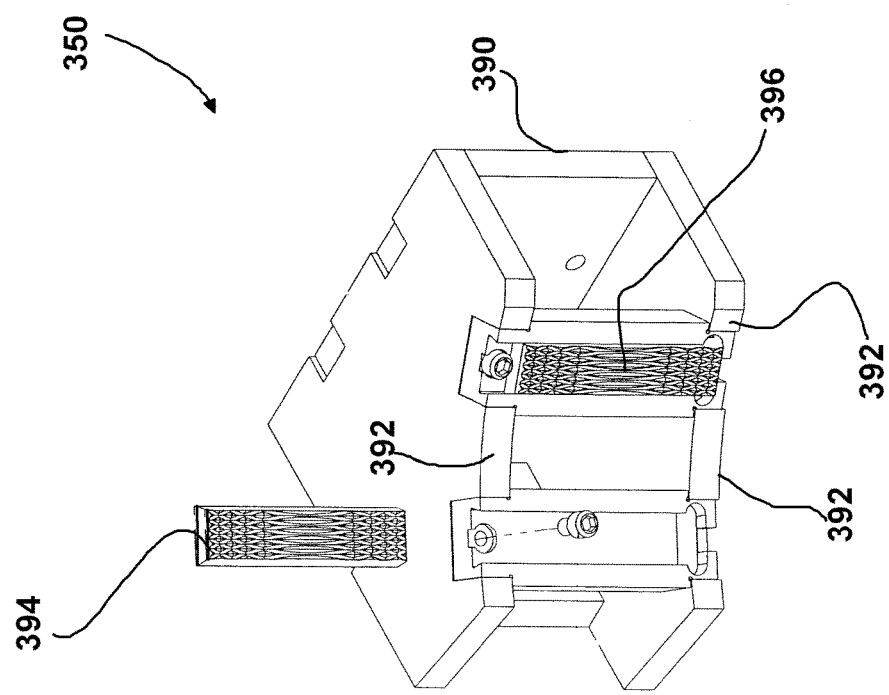

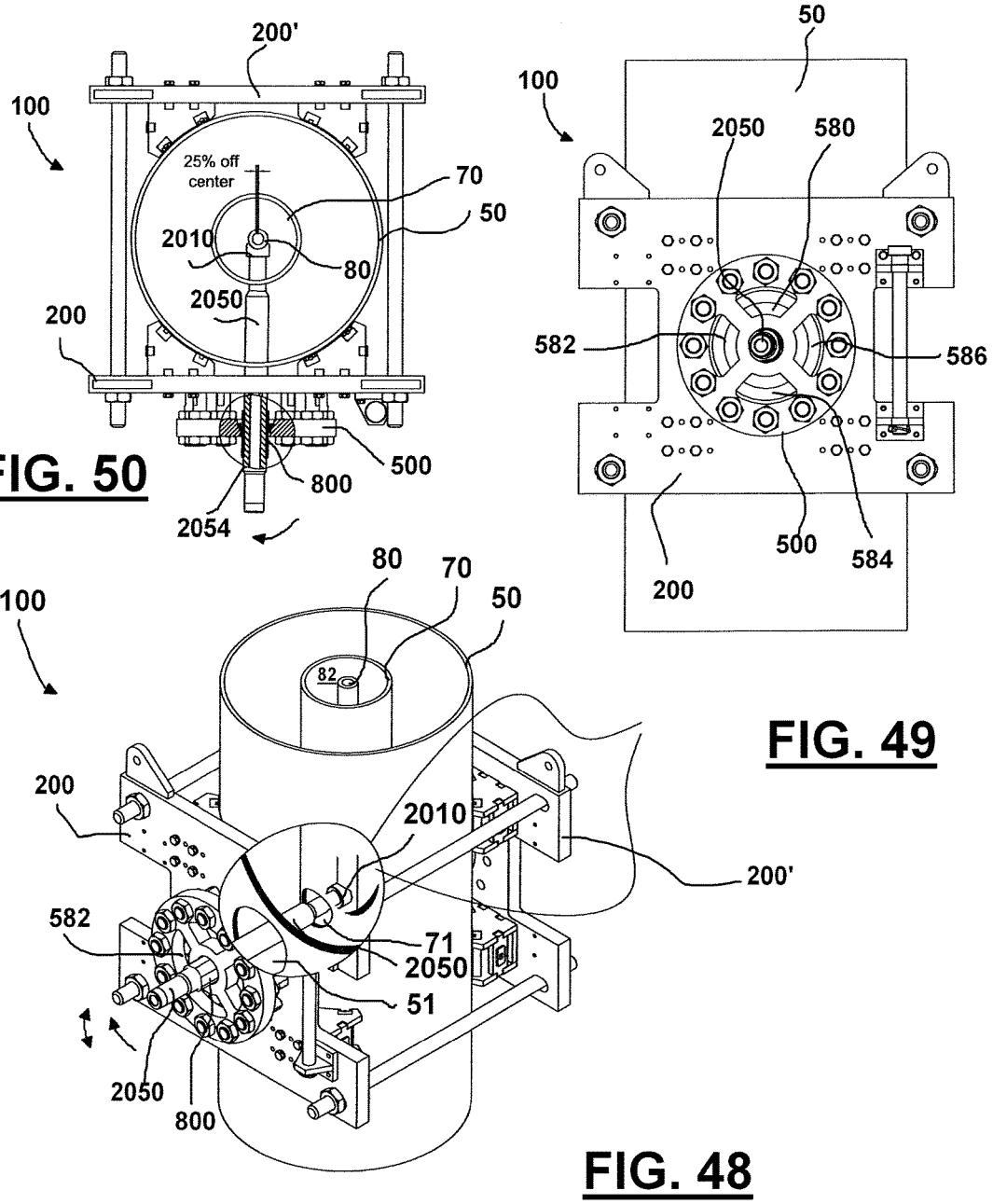

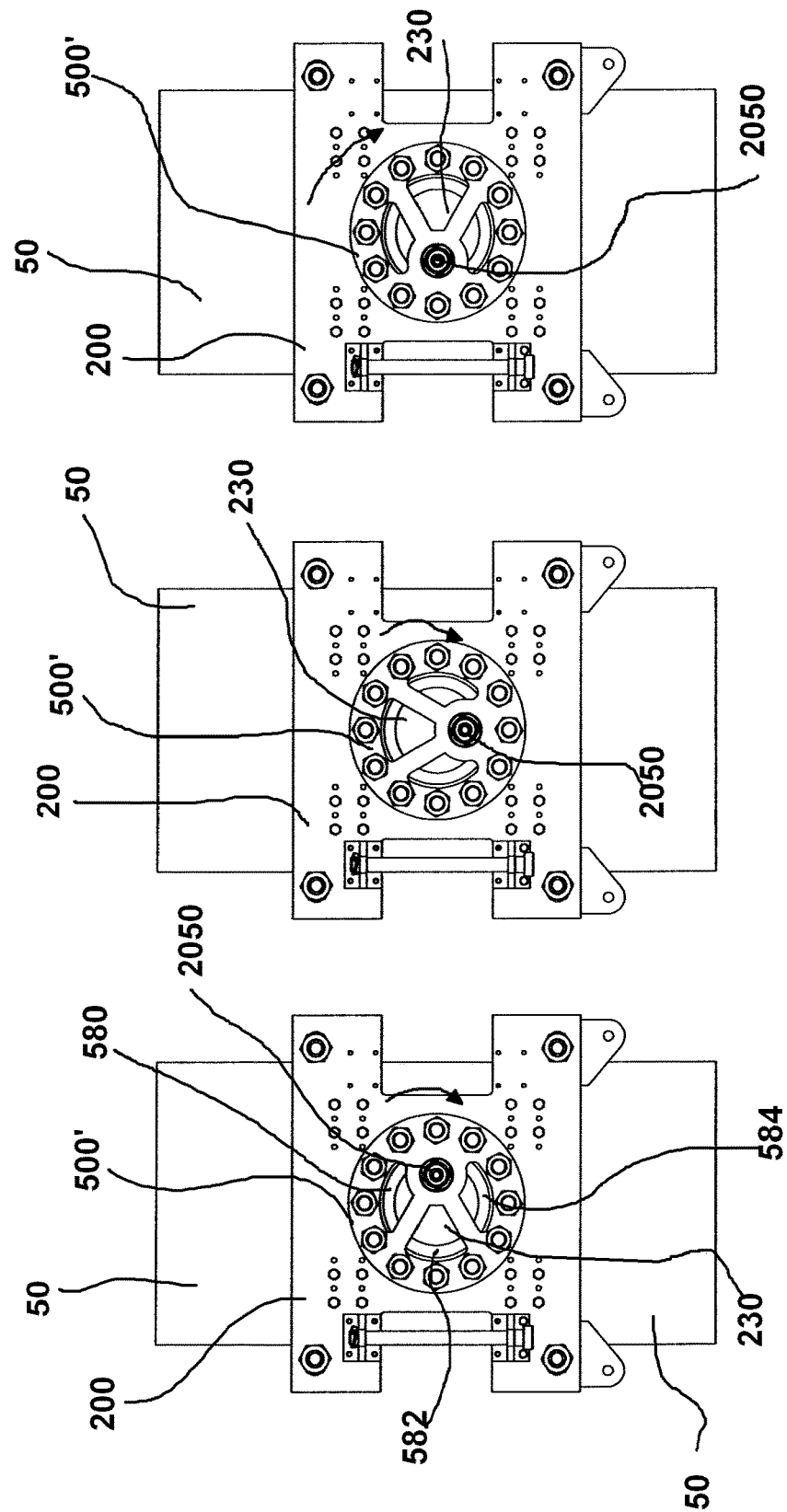

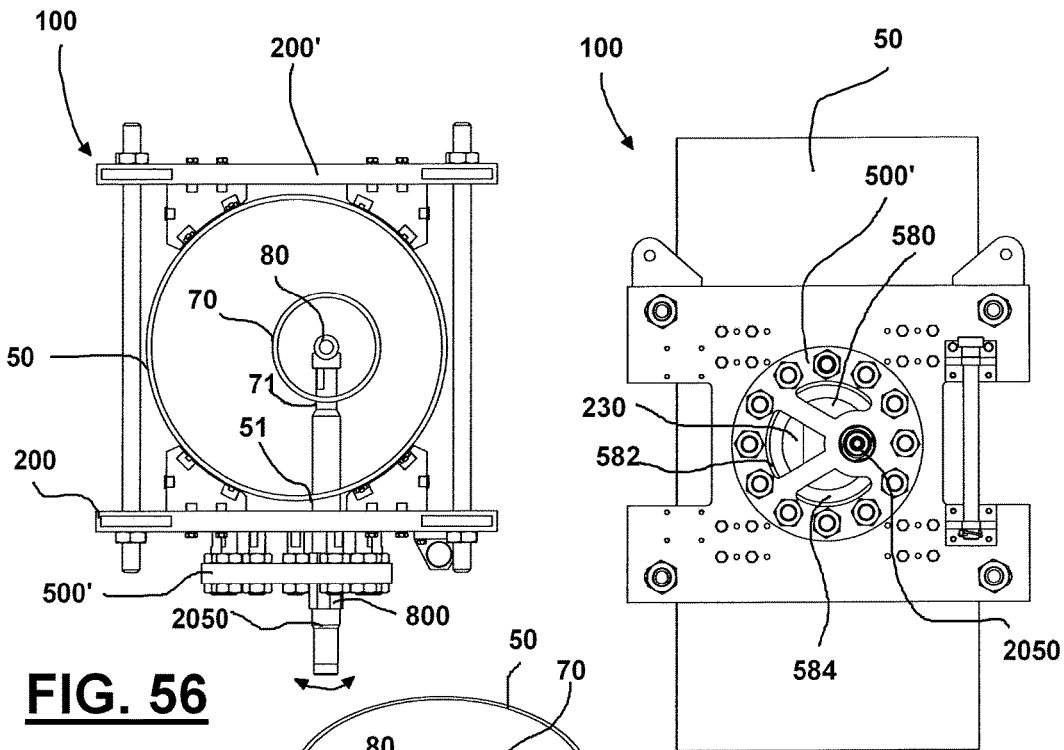
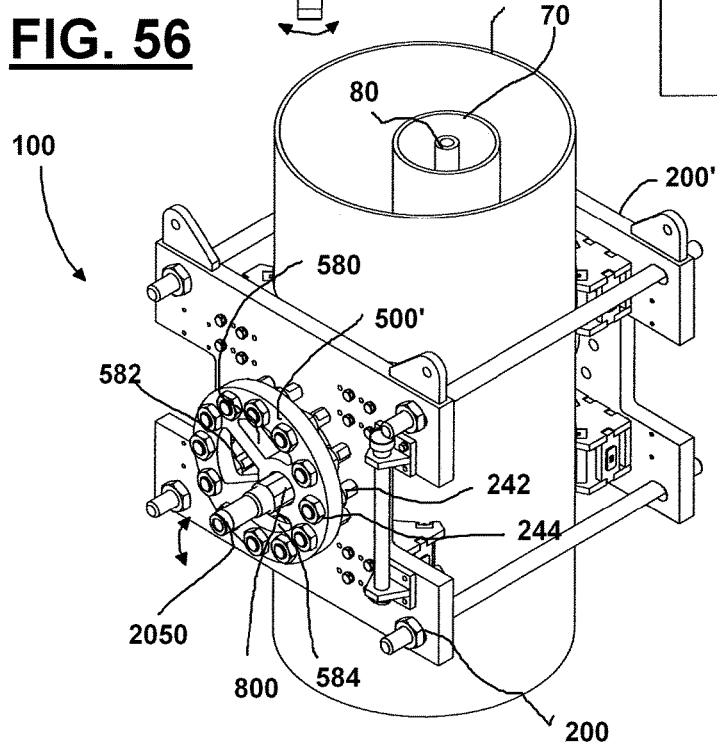
FIG. 56
FIG. 55
FIG. 54

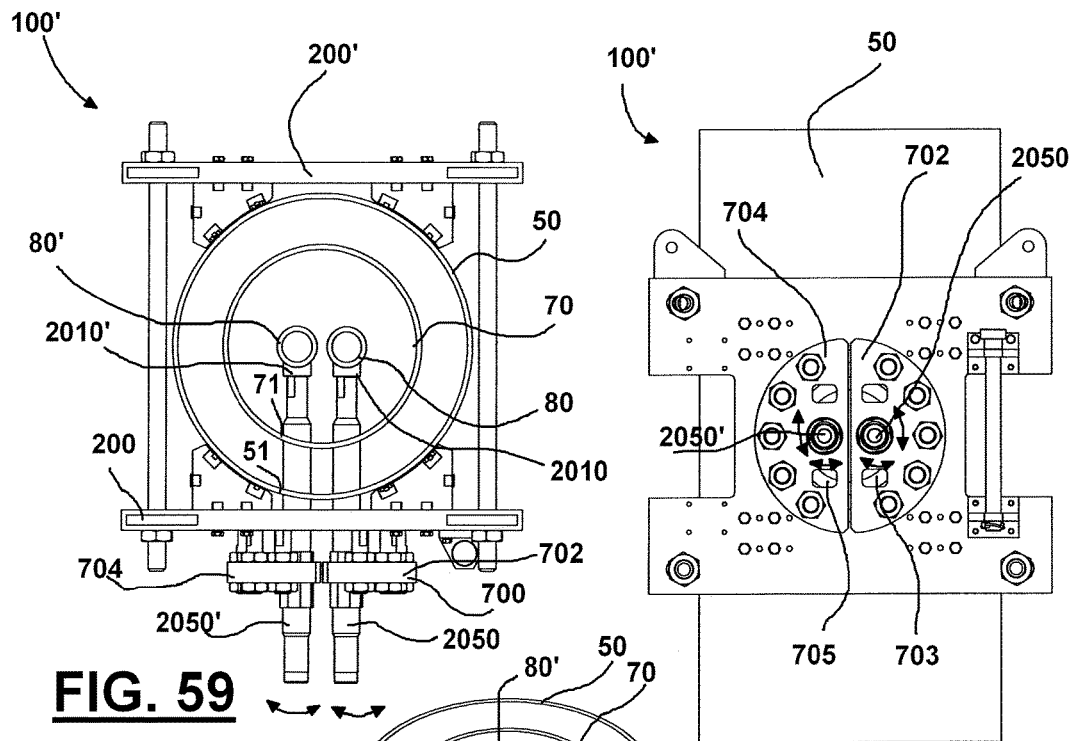
FIG. 58
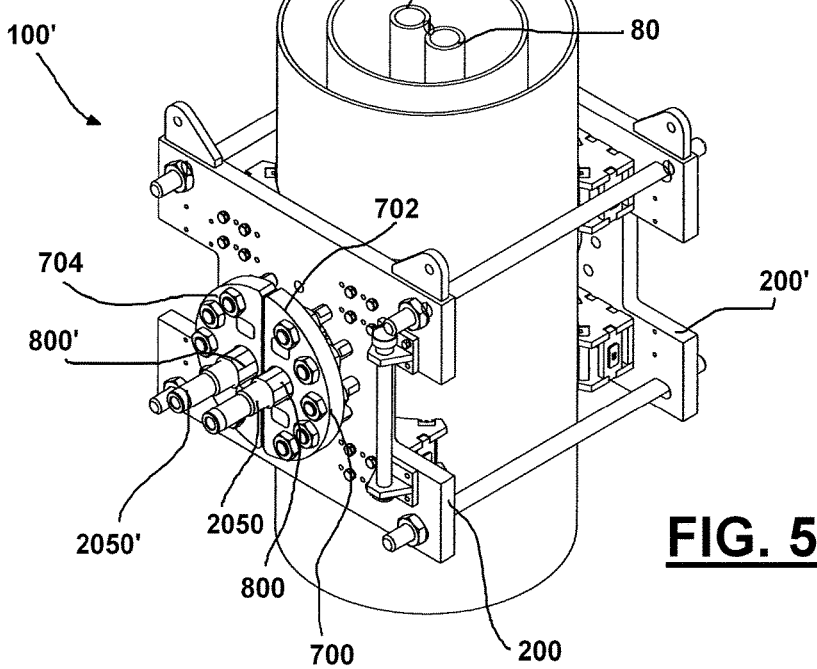
FIG. 57
FIG. 59

METHOD AND APPARATUS OF HOT TAPPING MULTIPLE COAXIAL OR NESTED STRINGS OF UNDERWATER PIPING AND/OR TUBING FOR OVERTURNED WELLS OR PLATFORMS

CROSS-REFERENCE TO RELATED APPLICATIONS

This application is a continuation of U.S. application Ser. No. 14/950,908, filed 24 Nov. 2015 (issued as U.S. Pat. No. 9,851,038 on 26 Dec. 2017), which is a continuation of U.S. application Ser. No. 14/263,088, filed 28 Apr. 2014 (issued as U.S. Pat. No. 9,194,525 on 24 Nov. 2015), which is a continuation of U.S. application Ser. No. 13/717,890, filed 18 Dec. 2012 (issued as U.S. Pat. No. 8,707,979 on 29 Apr. 2014) which is a continuation of U.S. application Ser. No. 13/248,781, filed 29 Sep. 2011 (issued as U.S. Pat. No. 8,333,211 on 18 Dec. 2012) which was a continuation of PCT Patent Application serial number PCT/US2010/029389, with international filing date 31 Mar. 2010, which PCT application claimed priority of (and is a non-provisional of) U.S. Provisional patent application Ser. No. 61/165,475, filed 31 Mar. 2009. Priority of each of these applications is hereby claimed and each is expressly incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

Abandonment Procedure for wells on a platform that has fallen over. There are basically two ways to restore control of the wells on a platform that has fallen over. Abandon the wells completely in the order they are accessed, or remove the bent or broken portion of the well and install a subsea wellhead. However, when removing the bent or broken part of the pipe such piping may still be under pressure such pressure dealt with before removal. Otherwise, a blow out could occur.

The present invention relates to the hot tapping multiple coaxial strings of underwater piping and/or tubing for overturned wells and/or platforms.

Under pressure drilling or hot tapping is the process of drilling into a pressured pipe or vessel using special equipment and procedures to ensure that the pressure and fluids are safely contained when access is made. The most common example of a hot tap is into a pressured pipeline. A typical hot tap assembly consists of a saddle assembly with a doughnut-type elastomer pack off, two outboard full-bore flanged valves, a tee assembly and the hot tapping device.

A conventional hot tap device has a polished rod and pack-off assembly which allows movement in the longitudinal direction, as well as rotation while maintaining a seal. A drill bit is installed on the end of the polished rod to drill into the vessel. The means to turn the polished rod may be manual, or by air or hydraulic-generated torque. A threaded sleeve feeds the polish rod assembly and provides the force to resist the pressure area effect that would tend to blow out the polished rod.

SUMMARY

In one embodiment is provided a hot tapping method and apparatus which can hot tap one or more multiple coaxial strings of underwater piping and/or tubing for overturned wells and/or platforms.

In one embodiment is provided a clamping system which has angular adjustment of tapping tool both up and down and side to side, in a spherical manner.

In one embodiment the adjustable angular offset of hot tapping tool in the compression plate (500 and/or 600) can be at least about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, and 45 degrees from a perpendicular to compression plate. In one embodiment the adjustable angular offset is between about any two of the above specified angles. In one embodiment the angular offset is changed while the tool is attached to the outermost pipe or tubular. In one embodiment the angular offset is changed while the tool is attached to the outermost pipe or tubular and the clamp housing of the tool is not moved during the rotational adjustment.

In one embodiment the clamping system for the hot tapping tool can have a rotationally adjustable compression opening which can be can be rotationally adjustable in at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 50, 55, 60, 65, 70, 75, 80, 85, and 90 degree increments. In one embodiment the rotational adjustability is between about any two of the above specified angular increments. In one embodiment the rotational adjustment occurs while the tool is attached to the outermost pipe or tubular. In one embodiment the rotational adjustment occurs while the tool is attached to the outermost pipe or tubular and the clamp housing of the tool is not moved during the rotational adjustment.

In one embodiment one or more openings provide visual access to pipes and the area of hot tapping seal even while hot tapping tool is mounted on the clamp.

In one embodiment hot tapping tool can have one or more viewing windows to optically view the tip of the hot tapping tool even when the clamping system is attached to the clamping system and inserted into one or more nested tubulars. In one embodiment the two, three and four viewing windows are provided on a compression plate.

In one embodiment the hot tapping tool can have a longitudinally adjustable compression plate in which the rotationally adjustable swivel nut is operably attached. In one embodiment the swivel nut can be threadably connected to a hot tapping mandrel or barrel thereby providing two manners of longitudinally applying compression on the hot tapping tip of the hot tap tool (the first being a plurality of bolts and nuts along the circumference of the compression plate and the second being the threaded connection between the swivel nut and the barrel or mandrel).

In one embodiment is provided a method and apparatus where two hot tapping tools 2000, 2000' are simultaneously connected to a single clamp and two coaxially nested pipes or tubulars are simultaneously hot tapped. In one embodiment each of the hot tapping tools simultaneously tapping nested tubulars are each independently angular adjustable to effect a hot tapping seal.

In one hot tapping system is mounted on a pipe which is substantially out of round in a non-symmetrical manner. In one embodiment, after jetting, system 10 is mounted below the sea floor on a substantially out of round pipe. In one embodiment the sea floor is jetted clear of pipe 30 between 1 and 30, 1 and 25, 1 and 20, 1 and 15, 1 and 14, 1 and 13, 1 and 12, 1 and 11, 1 and 10, 1 and 9, 1 and 8, 1 and 7, 1 and 6, and 1 and 5 feet. In one embodiment the sea floor is jetted clear of pipe 30 between 2 and 30, 2 and 25, 2 and 20, 2 and 15, 2 and 14, 2 and 13, 2 and 12, 2 and 11, 2 and 10, 2 and 9, 2 and 8, 2 and 7, 2 and 6, and 2 and 5 feet.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 5 is a perspective view illustrating the step of hot tapping one or more of the nested tubulars where the hot tap tool is rotatively connected to the circular thrust/articulating plate at a selected rotational position. The one or more windows in the thrust plate allow the user to see the tip of the hot tap tool to obtain a good position between the hot tap tip and the nested tubular being hot tapped.

FIG. 6 is a closeup perspective view of the circular thrust/articulating plate after being connected to the hot tap housing at a different rotational position compared to the connection shown in FIG. 5.

FIG. 11 is an overall perspective view of one embodiment showing a double plate saddle assembly with a single main opening compression plate.

FIG. 12 is a top view of the embodiment shown in FIG. 11.

FIG. 13 is a side wire frame side view of an embodiment showing the hot tapping of an inner tubing.

FIG. 14 includes front and top views of the embodiment shown in FIG. 13.

FIG. 15 shows rear and bottom views of the embodiment shown in FIG. 13.

FIG. 35 is a perspective view of one embodiment of a detachable support foot.

FIG. 48 is a perspective view of the embodiment shown in FIG. 1 with cut outs made in two of the pipes/tubular to hot tap the innermost tubular.

FIG. 49 is a front view of FIG. 48.

FIG. 50 is a top view of FIG. 48.

FIGS. 51 through 53 show the eccentric compression plate with the main opening respectively at the 3, 6, and 9 O'clock positions to illustrate various modes of rotation adjustment of eccentric main opening.

FIG. 54 is a perspective view of the embodiment shown in FIG. 1 but with eccentric compression plate of FIG. 15 with main opening at the 3 O'clock position, and with cut outs made in two of the pipes/tubular to hot tap the innermost tubular.

FIG. 55 is a front view of FIG. 54.

FIG. 56 is a top view of FIG. 54.

FIG. 57 is a perspective view of the preferred embodiment, but with double main opening compression plate schematically indicating the simultaneous hot tapping of two pipes or tubulars with the same clamp.

FIG. 58 is a front view of FIG. 57.

FIG. 59 is a top view of FIG. 57.

DETAILED DESCRIPTION

Figure 1:
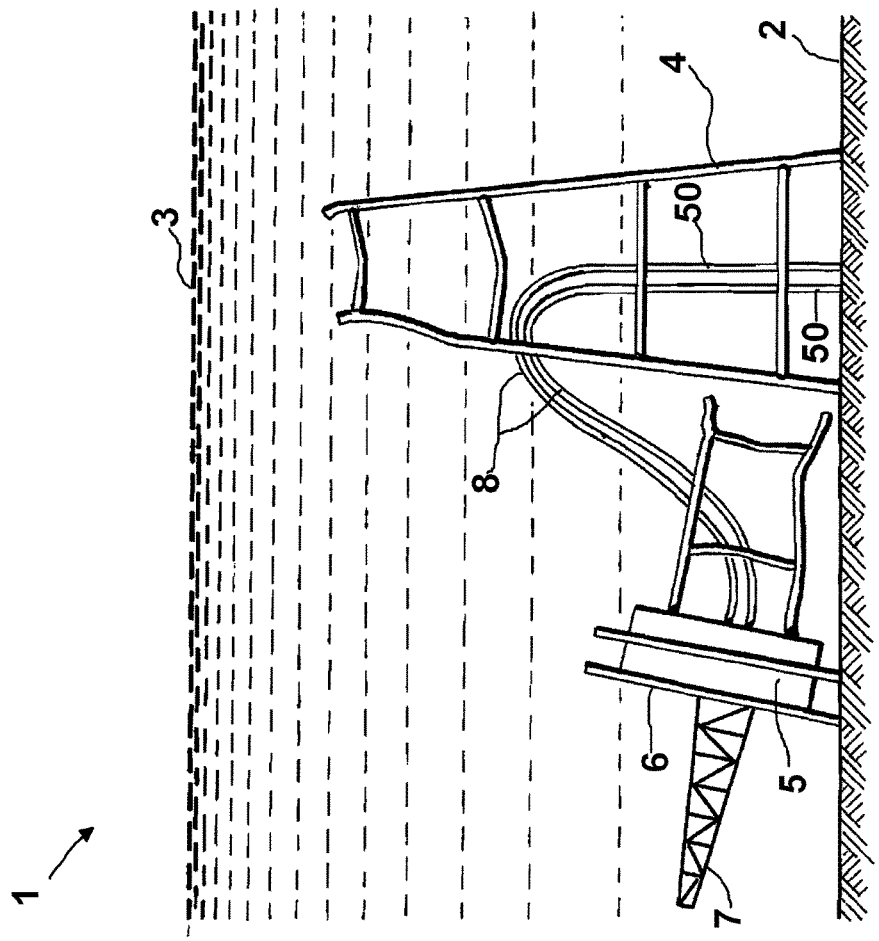
FIG. 1 is an overall perspective view of a platform which has fallen over and needs to be plugged and abandoned (with two riser piping systems although up to 24 or more riser piping systems can be seen).

FIG. 1 shows a damaged marine platform 1. The platform 1 can be any offshore or marine platform such as a drilling platform, production platform or the like. such a platform is normally supported by an underwater jacket 4 that is anchored to seabed 2. When a fierce storm such as a hurricane strikes, the upper 5 can be separated from jacket 4 by wind and wave action at water surface area 3. Upper 5 can be any known above water upper such as drilling (e.g. derrick 7) or production structures having one or more decks 6.

When a hurricane separates upper 5 from jacket 4, tubulars 50 can remain under pressure though bent at bends 8 as shown. Often, multiple nested tubulars are present (see FIGS. 11-24 and 60-71).

One embodiment includes a method and apparatus 10 for hot tapping a string of a plurality of coaxially pipes or tubing systems. The plurality of pipes can include first pipe 50, second pipe 60, third pipe 70, and fourth pipe or tubing 80. Between first and second pipes is annular space 62. Between second and third pipes is annular space 72. Between third and fourth pipes is annular space 82 (see FIGS. 16 and 60-71).

In one embodiment system 10 can include adjustable clamp 100 (see FIGS. 2-24). In one embodiment adjustable clamp 100 can include first and second plates 200, 200' and are threadably connected to each other and can be frictionally connected to a pipe. In one embodiment first and second plates 200, 200' are structurally identical to each other and only one will be described below.

Figure 2:
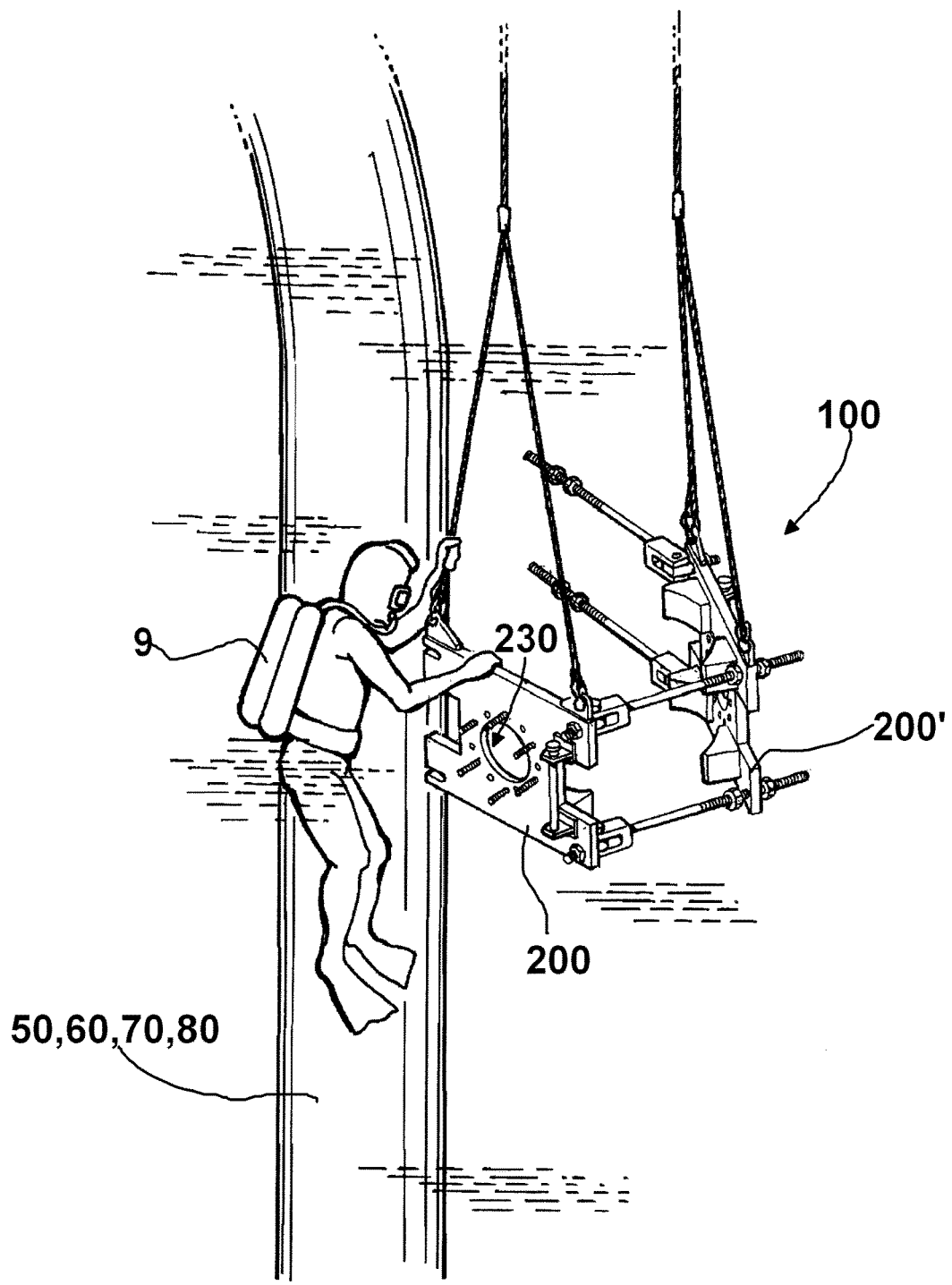
FIG. 2 is a perspective view illustrating the step of lowering one embodiment of hot tap housing (two plate embodiment) and attaching the housing to one of the riser piping systems below the bend in the riser.
Figure 3:
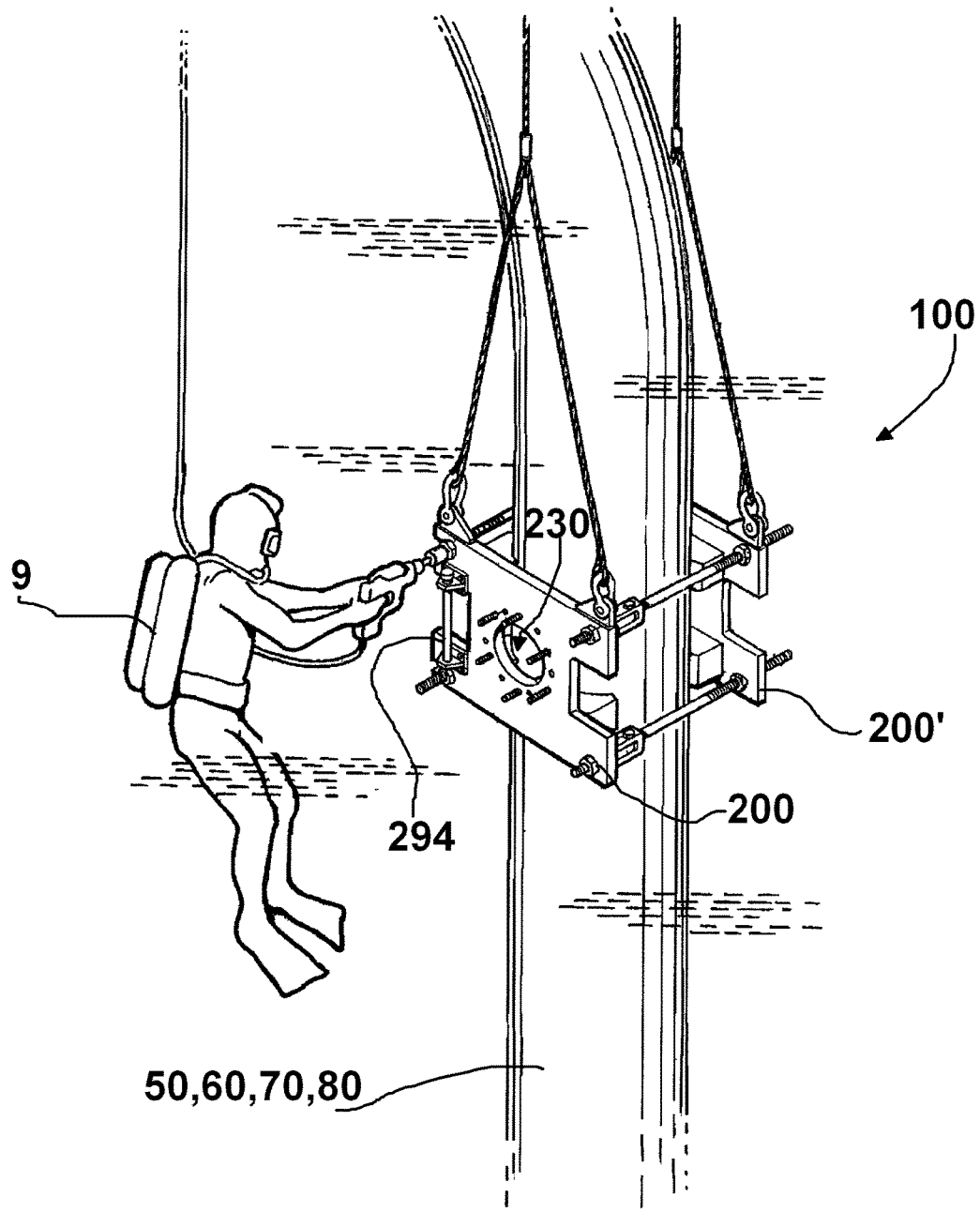
FIG. 3 is a perspective view illustrating the step of tightening the hot tap housing (two plate embodiment) below the bend in the riser.
Figure 4:
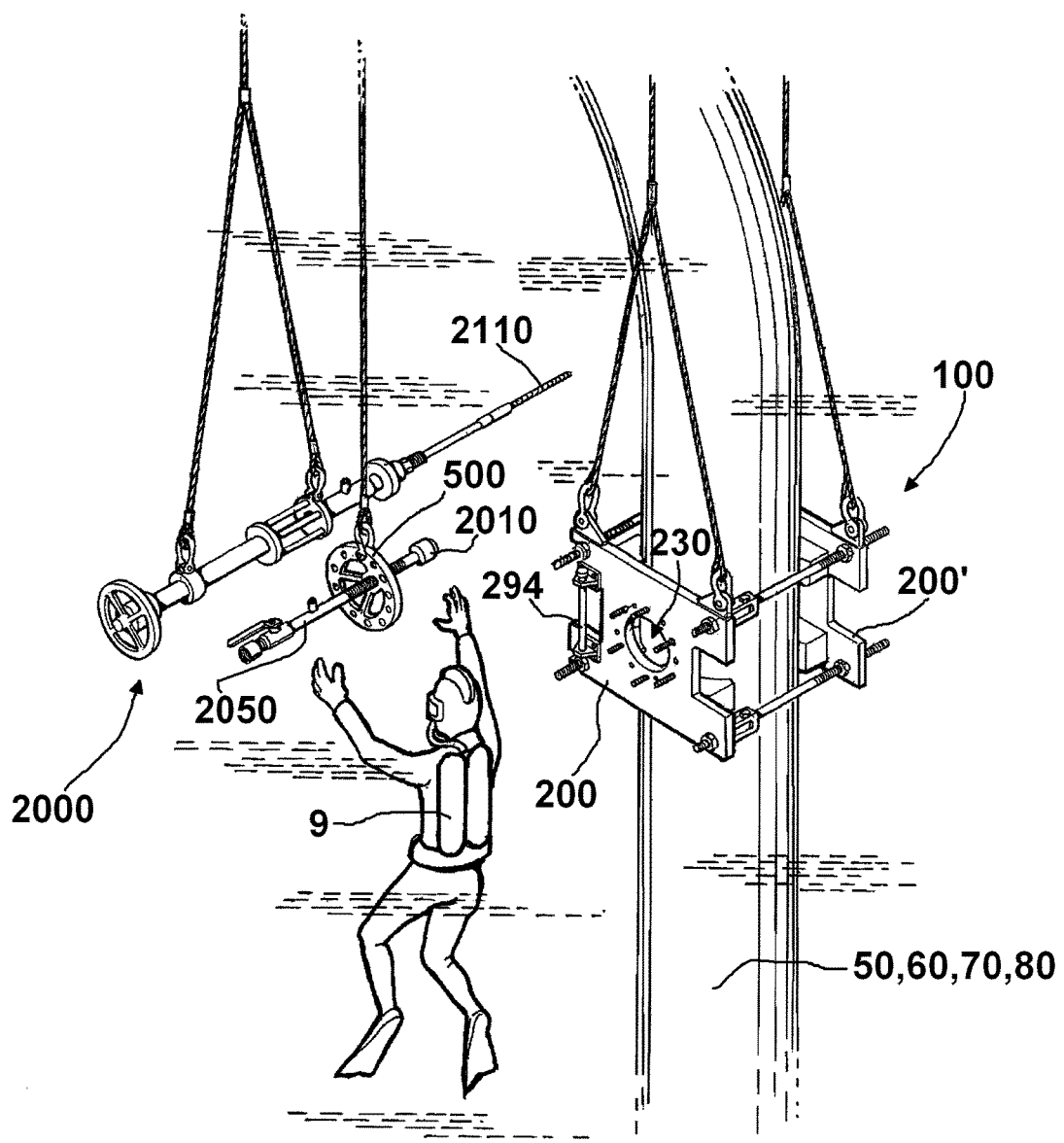
FIG. 4 is a perspective view illustrating the step of lowering the hot tap tool along with the circular thrust/articulating plate and hot tap tip and housing which will be attached to the hot tap housing for hot tapping one or more of the nested tubulars.

FIG. 2 is a perspective view illustrating the step of lowering one embodiment of hot tap housing 100 (two plate embodiment) and a diver 9 attaching the housing to one of the riser piping systems (e.g. nested tubulars 50, 60, 70, 80) below the bend 8 in the riser 50, 60, 70, 80. FIG. 3 is a perspective view illustrating the step of the diver 9 tightening the hot tap housing 100 (two plate embodiment) below the bend in the riser. FIG. 4 is a perspective view illustrating the step of lowering to a diver 9 (from a surface vessel, not shown) the hot tap tool 2000 along with the circular thrust/articulating plate and hot tap tip and housing which will be attached to the hot tap housing 100 for hot tapping one or more of the nested tubulars 50, 60, 70, 80.

FIG. 5 is a perspective view illustrating the step of a diver 9 hot tapping one or more of the nested tubulars 50, 60, 70, 80 where the hot tap tool is rotatively connected to the circular thrust/articulating plate at a selected rotational position. The one or more windows in the thrust plate allow the user (e.g. diver 9) to see the tip of the hot tap tool 2000 to obtain a good position between the hot tap tip and the nested tubular 50 or 60 or 70 or 80 being hot tapped.

Figure 7:
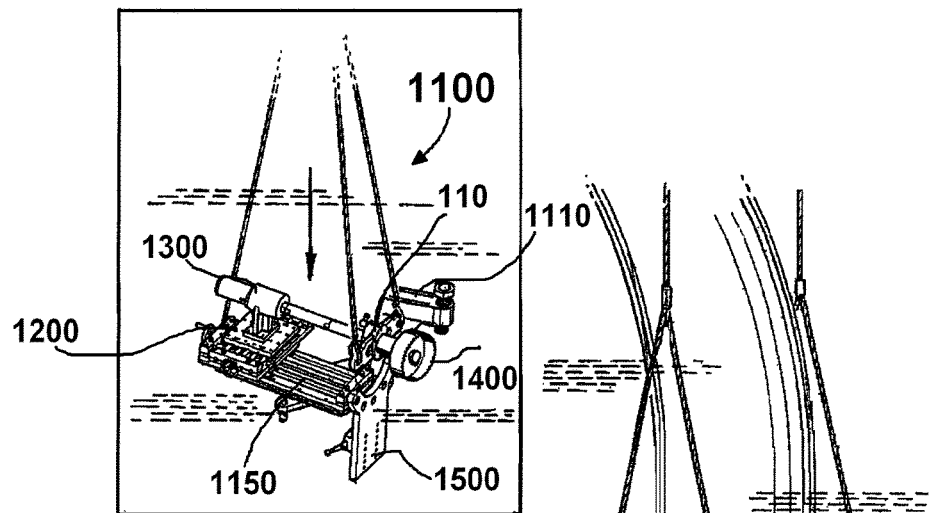
FIG. 7 is a perspective view illustrating the step of lowering a saw and attaching the saw to the hot tap housing (shown in FIG. 8). The saw can be pivotally attached to the hot tap housing via a pin on one side and a support plate on another side (the saw also has an articulating and sliding support join for the rotating saw shaft).

FIG. 6 is a closeup perspective view of the circular thrust/articulating plate after being connected to the hot tap housing 100 at a different rotational position compared to the connection shown in FIG. 5. FIG. 7 is a perspective view illustrating the step of lowering a saw 1100 to a diver 9.

One embodiment includes a method and apparatus for hot tapping a string of a plurality of coaxially pipes or tubing systems.

The plurality of pipes can include first pipe 50, second pipe 60, third pipe 70, and fourth pipe or tubing 80. Between first and second pipes is annular space 62. Between second and third pipes is annular space 72. Between third and fourth pipes is annular space 82.

In one embodiment system 10 can include adjustable clamp 100. In one embodiment adjustable clamp 100 can include first and second plates 200, 200' and are threadably connected to each other and can be frictionally connected to a pipe. In one embodiment first and second plates 200, 200' are structurally identical to each other and only one will be described below.

In one embodiment first plate 200 can comprise first side 210, second side 220, a main opening 230, and a plurality of openings 240 for supporting a compression plate. Main opening 230 is designed to allow access through first plate 200 (from first side 210 and through second side 220).

Detachably connectable to first plate 200 can be a plurality (and preferably four (4)) support feet 350, 360, 370, 380 (see FIGS. 11-24 and 35). Each support foot can be structurally the same and only one will be described below. In one embodiment each support foot can include a base 390 and a curved surface 392. Preferably the curved surface will have substantially the same radius of curvature of the pipe to which surface 392 will contact. In one embodiment a traction system is included on curved surface 392, and can include traction bar 394 and traction bar 396. In one embodiment one or more of the traction bars can be detachable connected to curved surface 392.

In one embodiment one or more of the support feet can be detachably connectable to first plate 200. In one embodiment such detachable connection can be by means of a plurality of fasteners. In one embodiment support feet 350, 360, 370, 380 can respectively be detachably attached to sets of foot support openings 250, 260, 270, 280. In one embodiment support plate 200 includes at least one additional set of support openings 252, 262, 272, 282 to provide adjustability of position of attachment of the particular support feet. In one embodiment two or more additional sets of support openings are provided. In one embodiment a plurality of different sized support feet with differing radii of curvature are also provided. By providing different sized support feet with differing radii of curvature along with provided multiple positioned support openings, attachment of a large range of pipes can be made with first and second plates 200, 200'. In one embodiment the same support plates 200,200' can be used with multiple sized piping systems.

In one embodiment support feet 350, 360, 370, 380 can be slidingly connected to support plate 200. Although not shown in the drawings, sliding connection can be by means of attachment slots instead of support openings 250,260,270, 280 with fasteners being used to lock in place the desired location.

In one embodiment clamp 100 with support feet 350, 360, 370, 380 and support feet 350', 360', 370', 380' can be used to attach clamp to a first pipe 50 that is substantially non-symmetrically out of round. In one embodiment the system will be used on pipes 50 that are part of a well or platform that has collapsed or fallen over. Because it has collapsed or fallen over such first or outer pipe can be substantially misshapen. In the prior art system a substantially smooth curved support plate is used which has difficulty attaching to out of round piping systems—especially those that are not symmetrical. However, it is believed that a substantially stable connection can be made when any three of the four support feet 350, 360, 370, 380 contact the outer surface of first pipe 50. In this manner one embodiment of clamp 100 can be used to attach to non-symmetrically out of round piping. In another embodiment support feet 350, 360, 370, 380 can be placed in non-symmetrical positions 250, 262 (instead of 260), 270, 280. In another embodiment support feet 350, 360, 370, 380 can be of differing sizes (e.g., radii of curvature) to accommodate the non-symmetrical out of roundness of first pipe 50.

In one embodiment one or more of the annular spaces 62, 72, and/or 82 can be monitored by the divers operating the system 10. In one embodiment a video of the hot tapping, drilling, and/or cutting operations can be taken including viewing the annular spaces 62, 72, and/or 82 during such hot tapping, drilling, and/or cutting operations thereby allowing remote monitoring of such operations by operators on the surface of the water.

Compression Plate Embodiments

In one embodiment compression plate 500 can be detachably connected to first plate 200 (see FIGS. 4-6, 9, and 11-28). In one embodiment compression plate can comprise first and second sides 510, 520 along with a main opening 550. In one embodiment main opening 550 can include a tapered area 560. In one embodiment main opening 550 can be offset 552 from center point of compression plate 500. In one embodiment compression plate 500 can include a plurality of viewing openings 580, 582, 584. In one embodiment a fourth viewing area 586 can be provided such as when main opening does not have an offset 552.

In one embodiment one or more openings provide visual access to pipes and the area of hot tapping seal even while hot tapping tool is mounted on the clamp. In one embodiment hot tapping tool can have one or more viewing windows to optically view the tip of the hot tapping tool even when the clamping system is attached to the clamping system 100 and inserted into one or more nested tubulars (e.g., 50, 60, and/or 70). In one embodiment two, three, and/or four viewing windows are provided on a compression plate 500.

During drilling, cutting, and tapping operations viewing areas 580, 582, 584, and 586 can provide visual access to the space between second side 220 of first plate 200 and exterior of first pipe 50. Additionally, when an opening is made in first pipe 50 visual access can be provided to annular space 62 along with second pipe 60 during drilling, cutting, and tapping operations (without the need to remove/reposition clamp 100). When an opening is made in second pipe 60 visual access can be provided to annular space 72 along with third pipe 70 during drilling, cutting, and tapping operations (without the need to remove/reposition clamp 100). When an opening is made in third pipe 70 visual access can be provided to annular space 82 along with fourth pipe or tubing 80 during drilling, cutting, and tapping operations (without the need to remove/reposition clamp 100). Such visual access can be greatly beneficial during drilling, cutting, and tapping operations.

In one embodiment the hot tapping tool can have a longitudinally adjustable compression plate in which the rotationally adjustable swivel nut is operably attached. In one embodiment the swivel nut can be threadably connected to a hot tapping mandrel or barrel thereby providing two manners of longitudinally applying compression on the hot tapping tip of the hot tap tool (the first being a plurality of bolts and nuts along the circumference of the compression plate and the second being the threaded connection between the swivel nut and the barrel or mandrel).

In one embodiment support plate 200 can include a plurality of threaded fasteners 242 attached to the plurality of openings 240. In one embodiment compression plate 500 can also include a plurality of support openings 530 which are symmetrically radially spaced to fit plurality of threaded fasteners 242. In one embodiment a plurality of nuts can be used to slidingly affix compression plate 500 to support plate 200. Additionally, symmetrically spacing fasteners 242 about a circle allows for rotational/radial adjustment of compression plate 500 relative to support plate 200 (and relative to first pipe 50 when clamp 100 is attached). Such rotational/radial adjustment allows for positional adjustment of main opening 550 where such opening has an offset 552.

In one embodiment (see FIGS. 29-31) compression plate 700 can be detachably connected to first plate 200. In one embodiment compression plate can comprise first and second sides 710, 720 along with two main openings 650 and 654 which are offset from a center point. In one embodiment main openings 750 and 760 can include a tapered areas 752 and 762. In one embodiment compression plate 700 can include a plurality of viewing openings 780, 782, 784. In one embodiment compression plate 700 can be comprised of two sections 702 and 704. Two main openings 750 and 760 allow for simultaneous operations of two hot tapping tools 2000, 2000' in a single location.

In one embodiment the adjustable angular offset of hot tapping tool in the compression plate (500 and/or 600) can be at least about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, and 45 degrees from a perpendicular to compression plate. In one embodiment the adjustable angular offset is between about any two of the above specified angles. In one embodiment the angular offset is changed while the tool is attached to the outermost pipe or tubular. In one embodiment the angular offset is changed while the tool is attached to the outermost pipe or tubular and the clamp housing of the tool is not moved during the rotational adjustment.

In one embodiment the clamping system for the hot tapping tool can have a rotationally adjustable compression opening which can be can be rotationally adjustable in at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 50, 55, 60, 65, 70, 75, 80, 85, and 90 degree increments. In one embodiment the rotational adjustability is between about any two of the above specified angular increments. In one embodiment the rotational adjustment occurs while the tool is attached to the outermost pipe or tubular. In one embodiment the rotational adjustment occurs while the tool is attached to the outermost pipe or tubular and the clamp housing of the tool is not moved during the rotational adjustment.

In one embodiment is provided a method and apparatus where two hot tapping tools 2000, 2000' are simultaneously connected to a single clamp and two coaxially nested pipes or tubulars are simultaneously hot tapped. In one embodiment each of the hot tapping tools simultaneously tapping nested tubulars are each independently angular adjustable to effect a hot tapping seal.

Figures 25, 26:
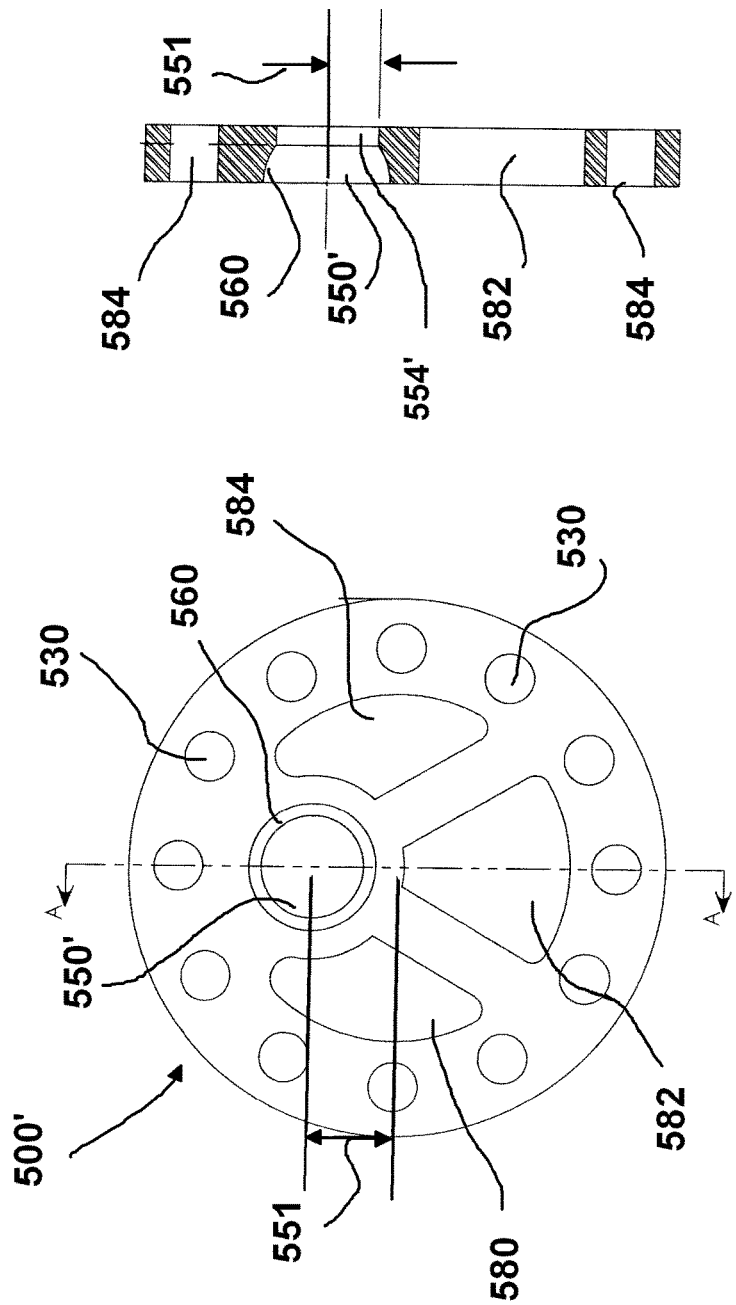
FIG. 25 is a rear view of one embodiment of a compression plate where the main opening is offset from the center with the plate having multiple view openings.
FIG. 26 is a sectional view of the compression plate of FIG. 25 taken through the line A-A.

FIG. 11 is an overall perspective view of one embodiment showing a double plate saddle clamp system 10 with a single main opening 550 compression plate 500. FIGS. 25-26 are top and sectional views of plate 500.

FIG. 13 is a side view of an embodiment showing the hot tapping of an inner tubing 80. FIG. 14 includes front and top views of the embodiment shown in FIG. 13. FIG. 15 shows rear and bottom views of the embodiment shown in FIG. 13.

FIGS. 16 through 24 will schematically illustrate various steps in hot tapping multiple pipes 50, 60, 70, and 80 which may be coaxially nested within one another either symmetrically and/or in an offset condition.

Figure 16:
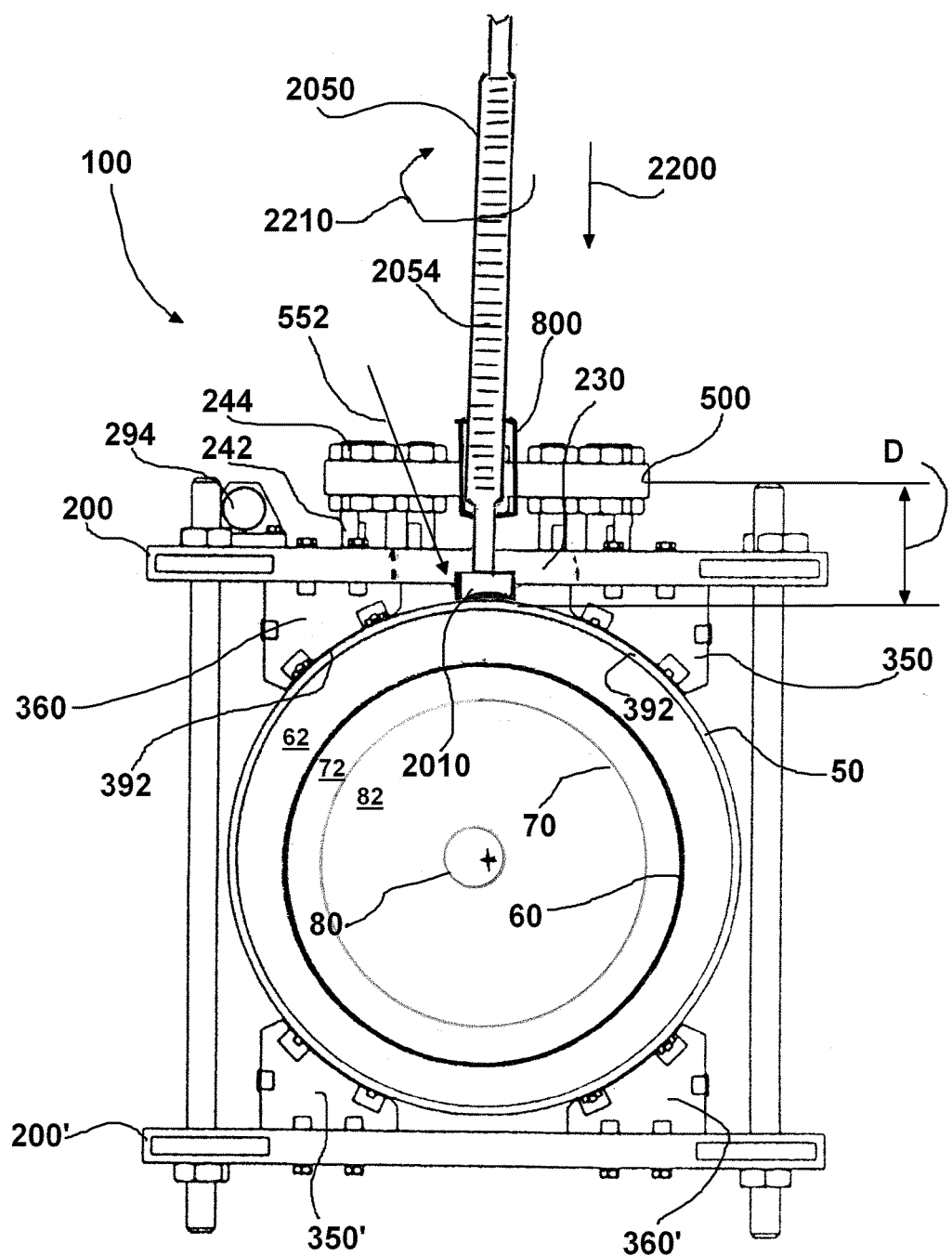
FIG. 16 is a schematic top view of the embodiment shown in FIG. 11 illustrating the step of hot tapping of a first exterior pipe.

FIG. 16 is a schematic top view of hot tapping system 10 illustrating the step of hot tapping a first exterior pipe 50.

Figure 17:
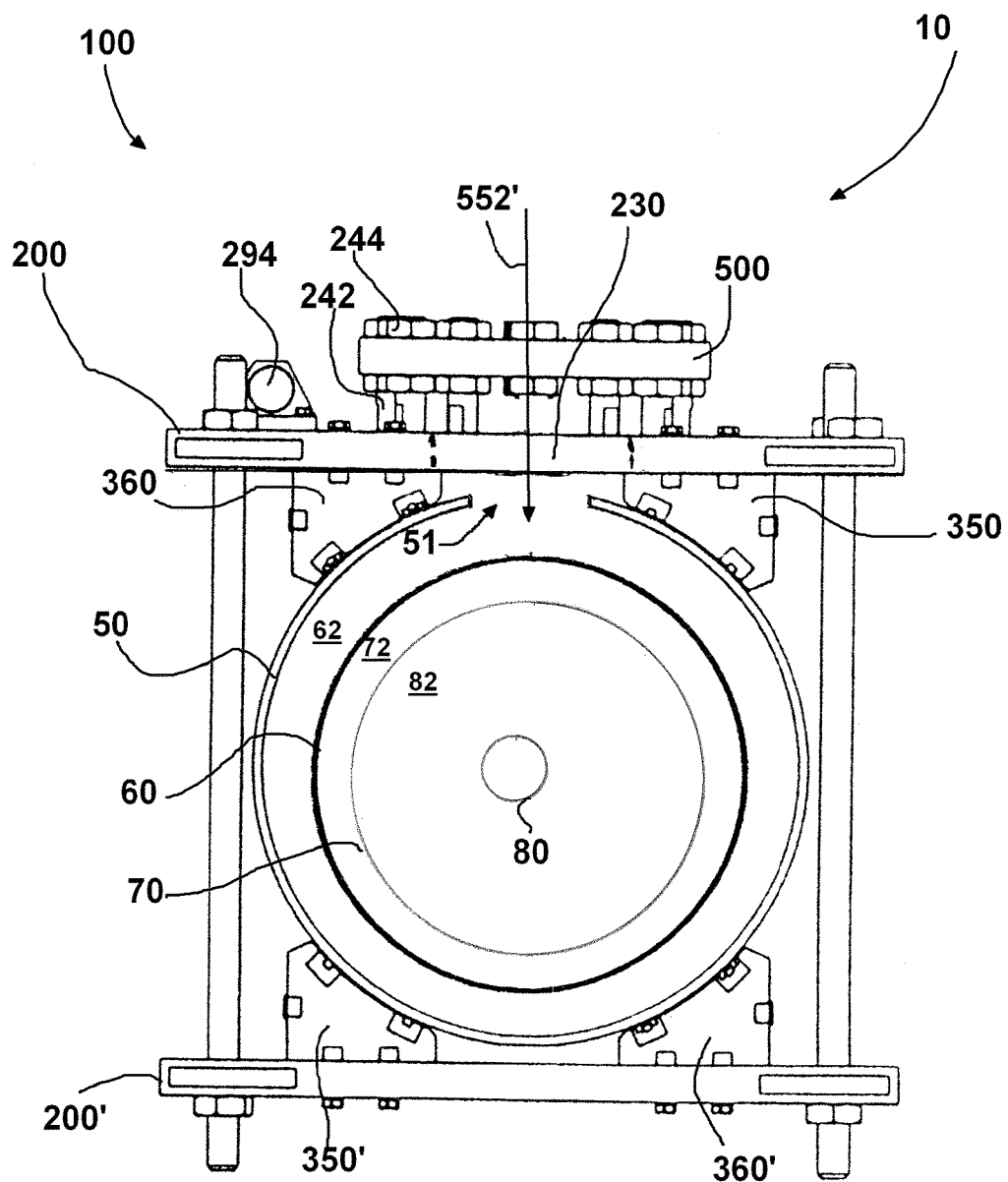
FIG. 17 is a schematic top view of the embodiment shown in FIG. 11 schematically illustrating the step of making an opening in the first exterior pipe.

FIG. 17 is a schematic top view schematically illustrating the step of making an opening 51 in the first exterior pipe 50.

Figure 18:
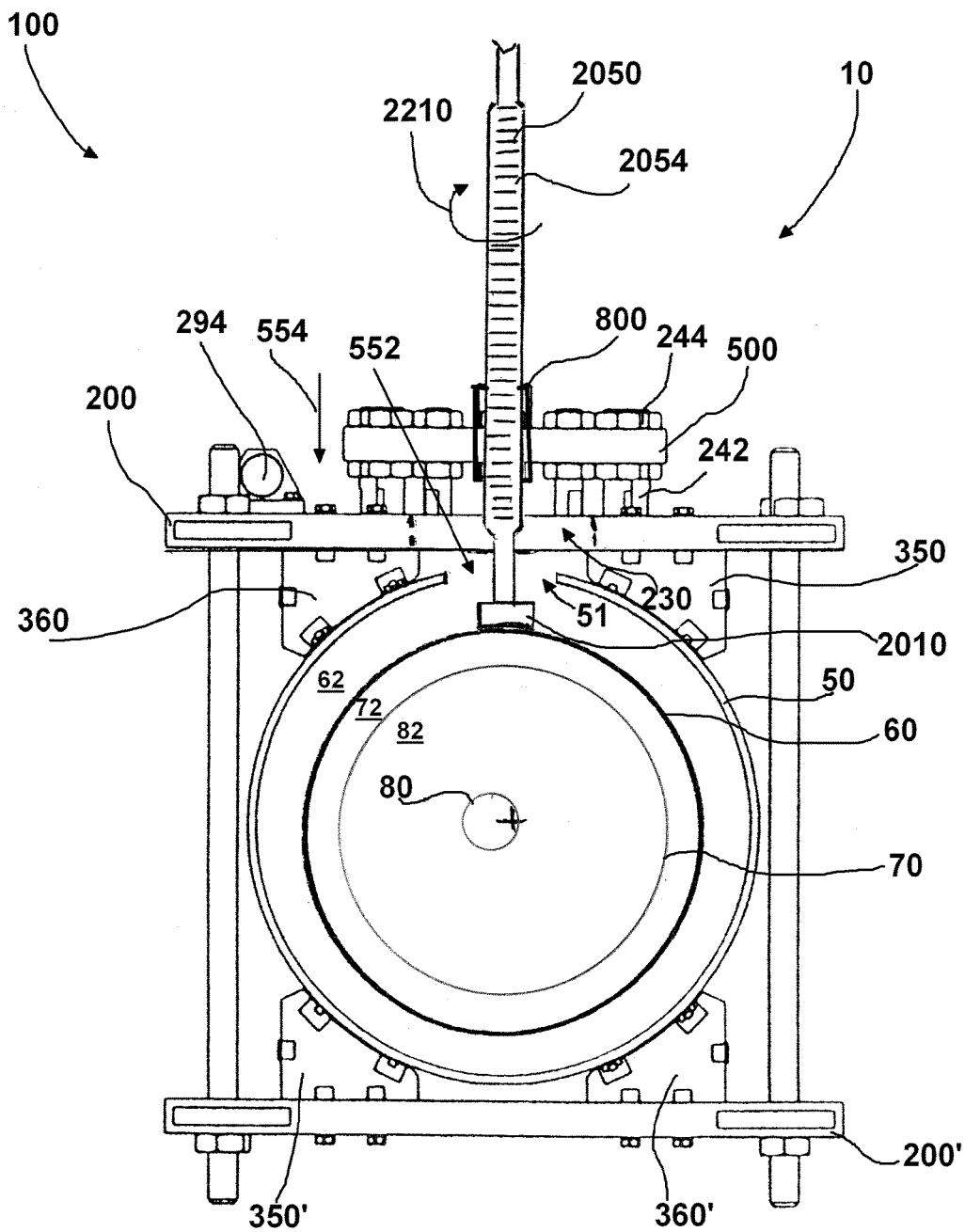
FIG. 18 is a schematic top view of the embodiment shown in FIG. 11 illustrating the step of hot tapping of a second interior pipe.

FIG. 18 is a schematic top view of hot tapping system 10 illustrating the step of hot tapping a second interior pipe 60.

Figure 19:
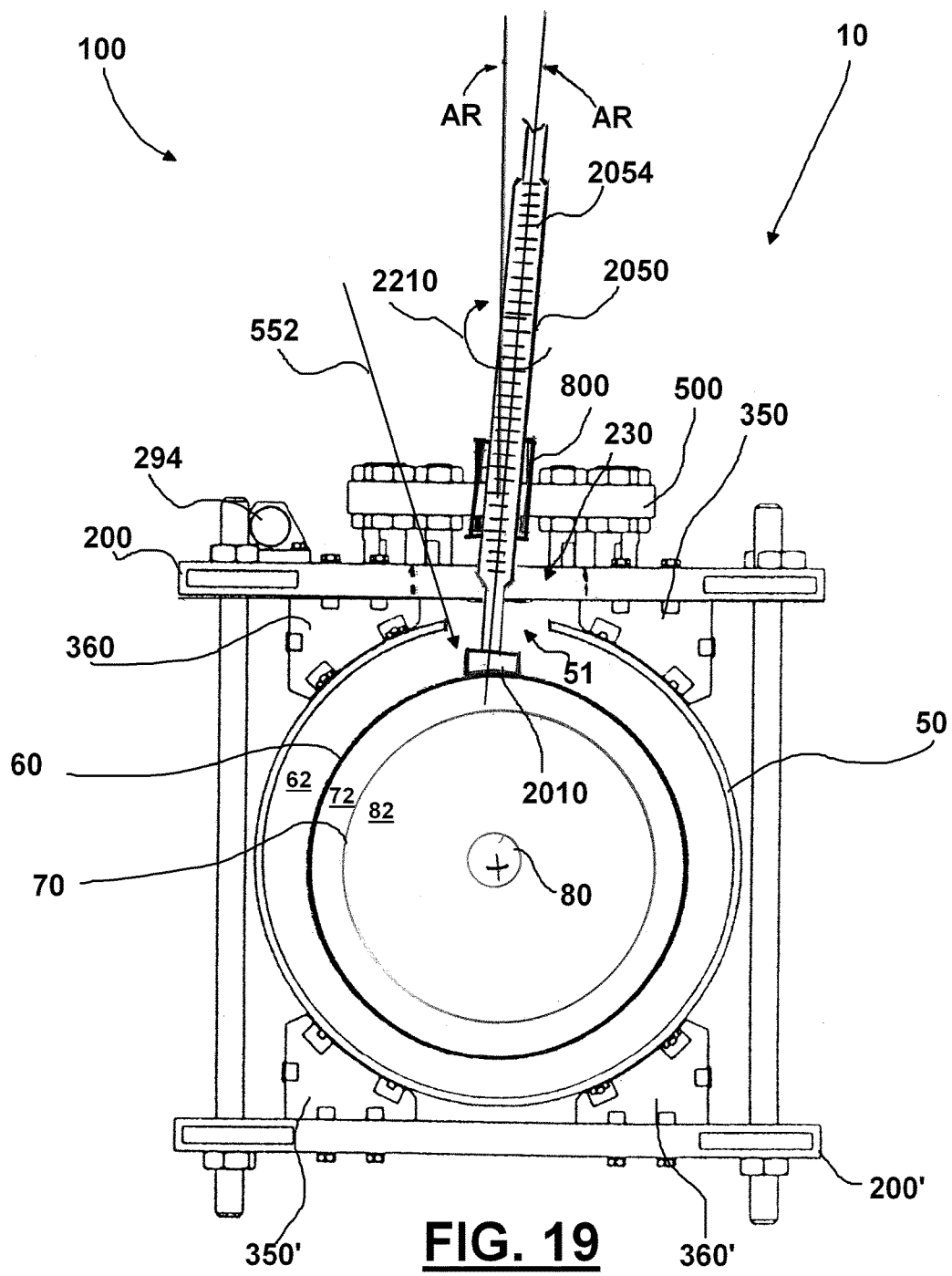
FIG. 19 is a schematic top view of the embodiment shown in FIG. 11 illustrating the step of hot tapping of a second interior pipe where the hot tapping tool is angularly offset from a perpendicular to assist in making the hot tapping seal between the tip and the pipe.

FIG. 19 is a schematic top view of hot tapping system 10 illustrating the step of hot tapping a second interior pipe 60 where the hot tapping tool 2000 is angularly offset (by angle theta) from a perpendicular to assist in making the hot tapping seal between the tip 2010 and the pipe 60.

Figure 20:
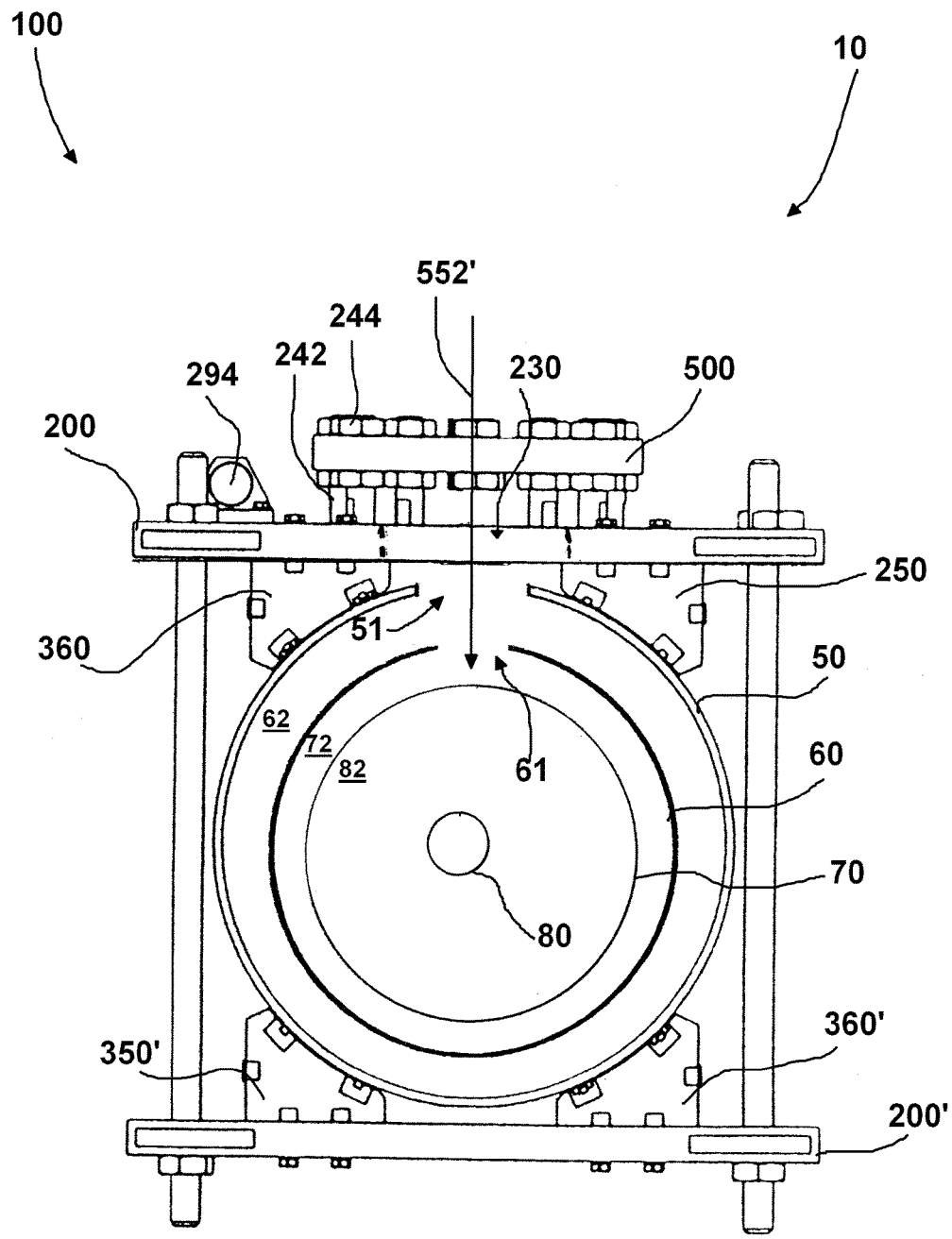
FIG. 20 is a schematic top view of the embodiment shown in FIG. 11 schematically illustrating the step of making an opening in the second pipe.

FIG. 20 is a schematic top view schematically illustrating the step of making an opening 61 in the second pipe 60.

Figure 21:
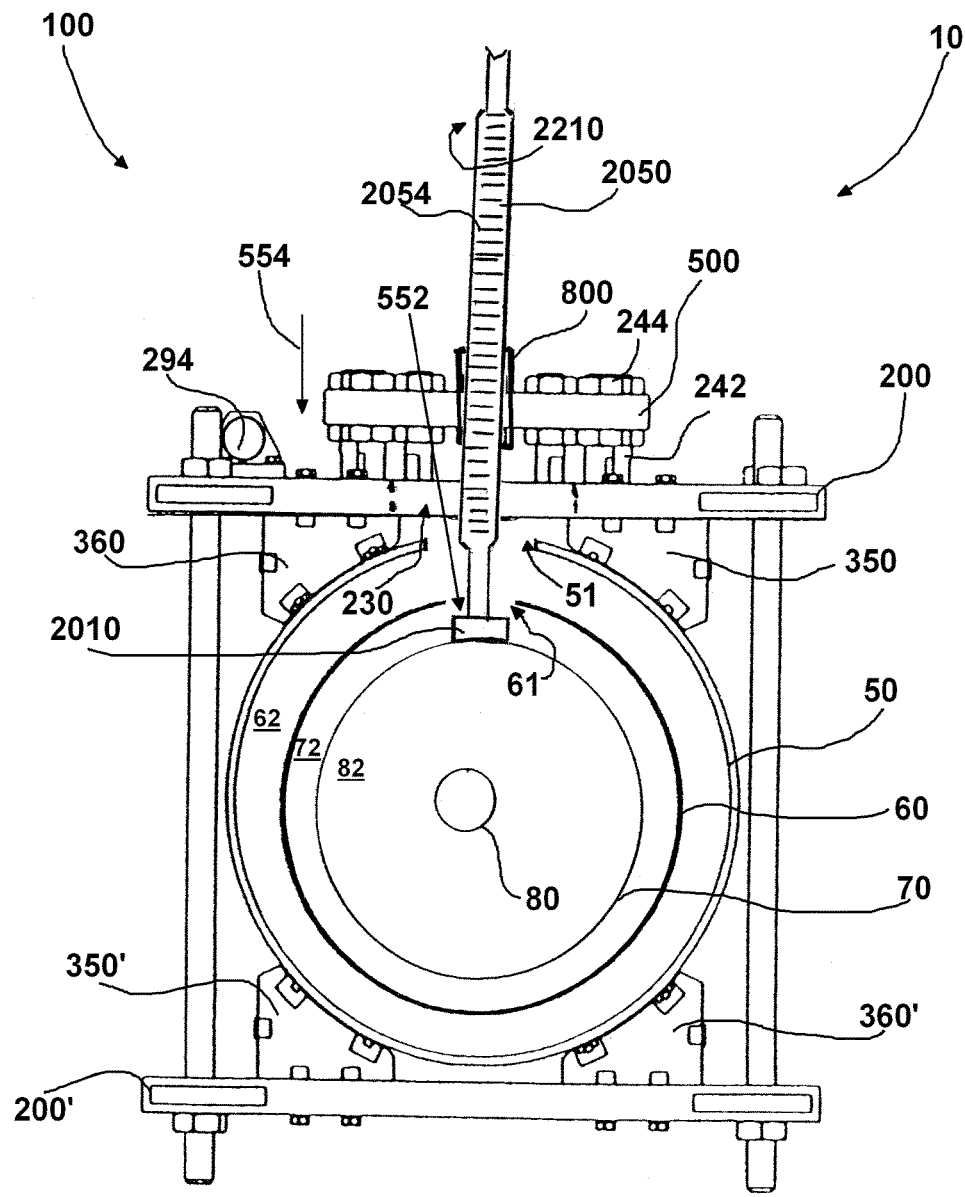
FIG. 21 is a schematic top view of the embodiment shown in FIG. 11 illustrating the step of hot tapping of a third interior pipe.

FIG. 21 is a schematic top view of hot tapping system 10 illustrating the step of hot tapping a third interior pipe 70.

Figure 22:
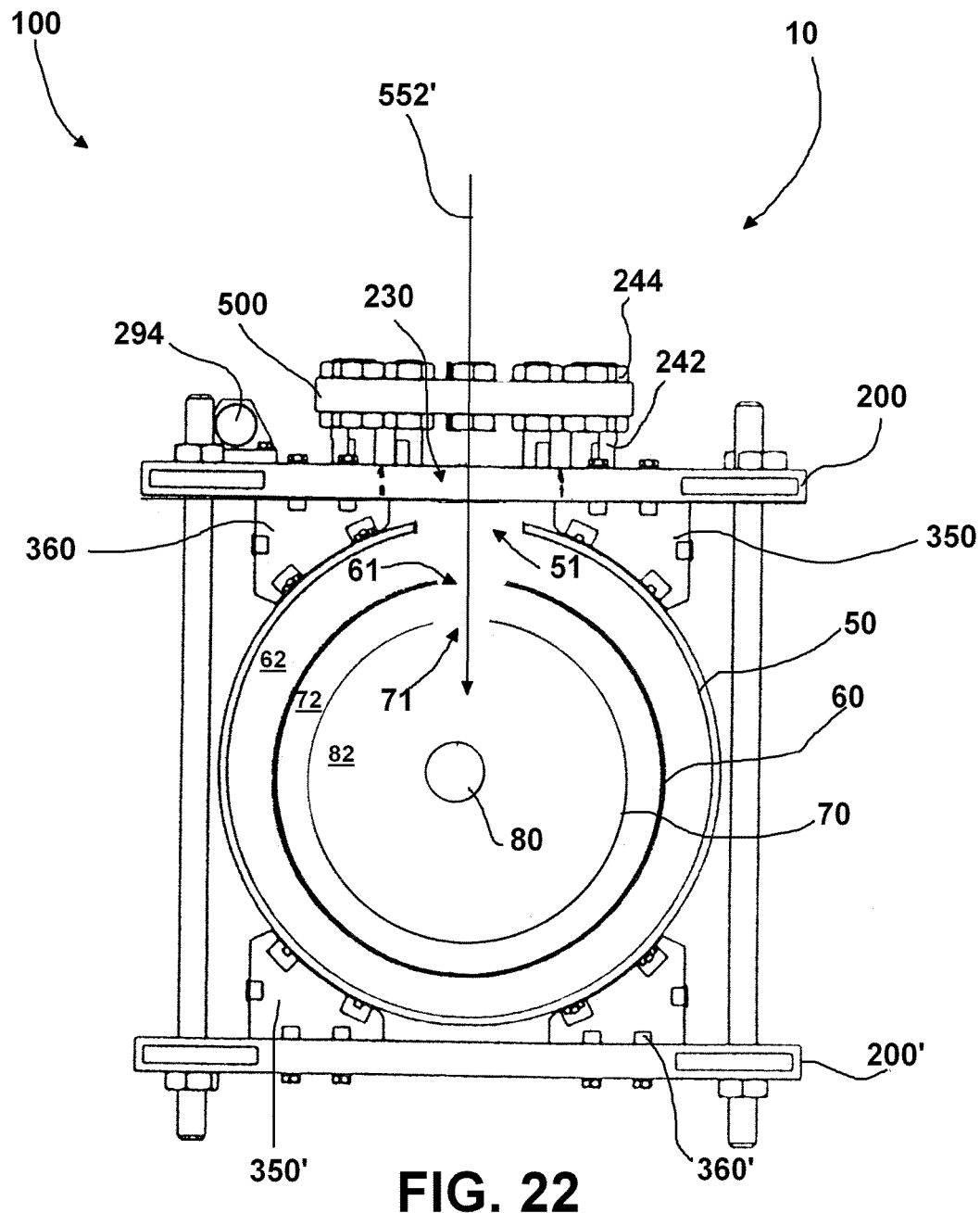
FIG. 22 is a schematic top view of the embodiment shown in FIG. 11 schematically illustrating the step of making an opening in the third pipe.

FIG. 22 is a schematic top view of hot tapping system 10 schematically illustrating the step of making an opening 71 in the third pipe 70.

Figure 23:
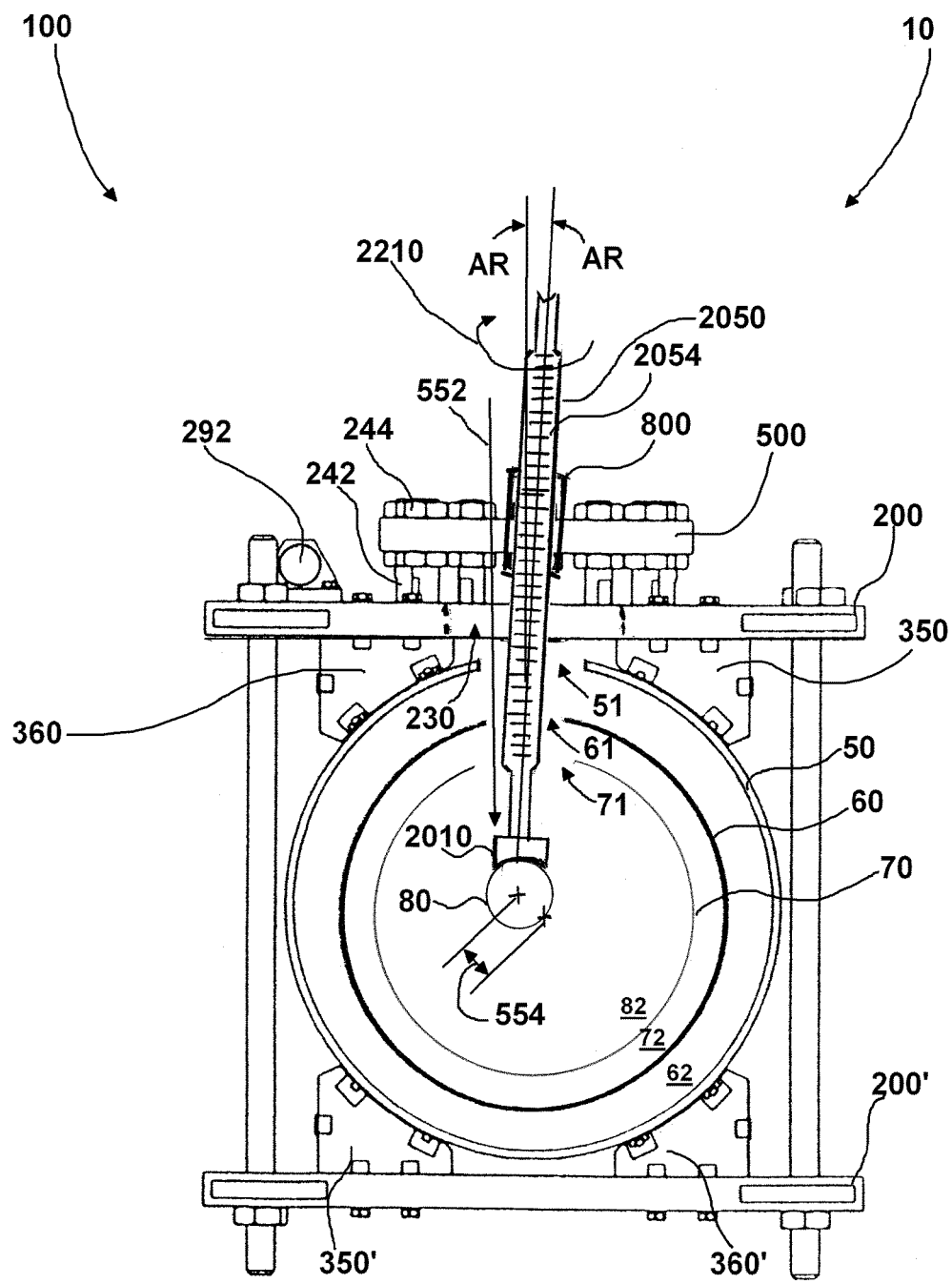
FIG. 23 is a schematic top view of the embodiment shown in FIG. 11 illustrating the step of hot tapping of a fourth pipe or tubing where the hot tapping tool is angularly offset from a perpendicular to assist in making the hot tapping seal between the tip and the pipe.

FIG. 23 is a schematic top view of hot tapping system 10 illustrating the step of hot tapping a fourth pipe or tubing 80 where the hot tapping tool 2000 is angularly offset (by angle theta) from a perpendicular to assist in making the hot tapping seal between the tip 2010 and the pipe 80.

Figure 24:
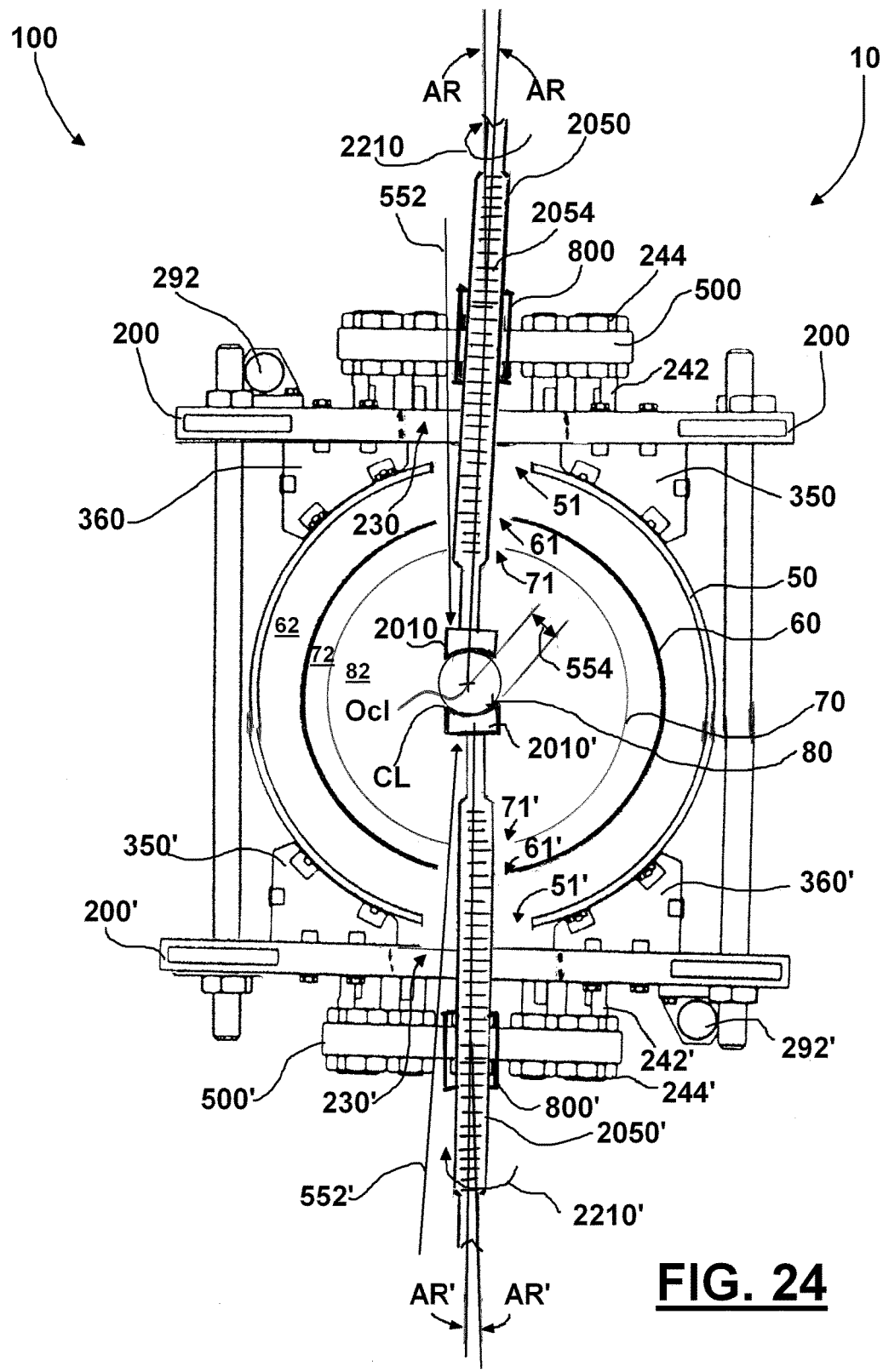
FIG. 24 is a schematic top view of the embodiment shown in FIG. 11 illustrating the step of hot tapping of a fourth pipe or tubing where the hot tapping tool is angularly offset from a perpendicular to assist in making the hot tapping seal between the tip and the pipe, along with the step of using a second tool to provide support for the tubing when making a seal between the hot tapping tool and the tubing.

FIG. 24 is a schematic top view of system 10 illustrating the step of hot tapping a fourth pipe or tubing 80 where the hot tapping tool 2000 is angularly offset (by angle theta) from a perpendicular to assist in making the hot tapping seal between the tip 2010 and the pipe 80, along with the step of using a second tool 3000 to provide support for the tubing 80 when making a seal between the hot tapping tool tip 2010 and the tubing 80.

FIG. 25 is a view of one embodiment of a compression plate where the main opening 550 being offset from the center and plate 500 having multiple view openings 580, 582, 584 positioned about main opening 550. FIG. 26 is a sectional view of compression plate 500 taken through the line A-A.

Figure 28:
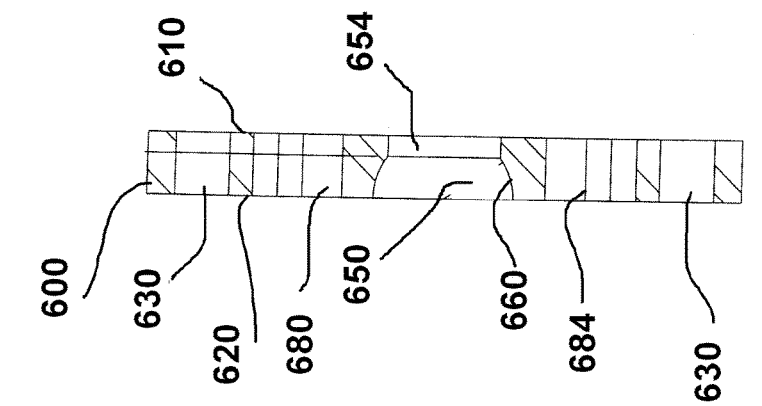
FIG. 28 is a sectional view of the compression plate of FIG. 27 taken through the line A-A.
Figure 27:
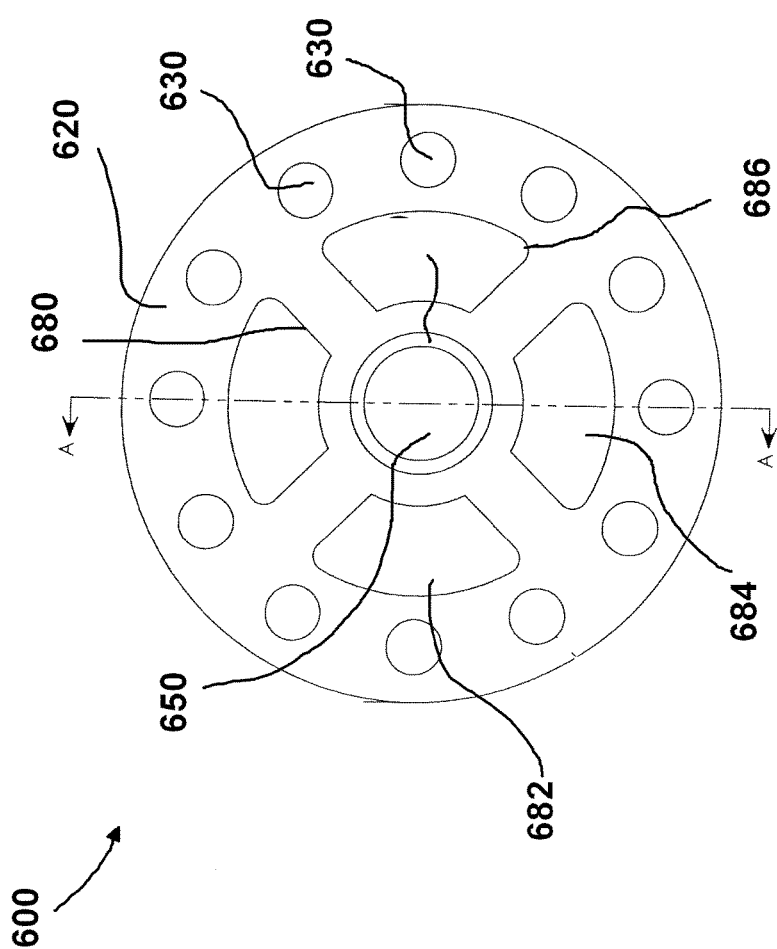
FIG. 27 is a rear view of one embodiment of a compression plate where the main opening is not offset from the center with the plate have multiple view openings.

FIG. 27 is a rear view of one embodiment of a compression plate 600 where the main opening 650 is not offset from the center and with plate 600 having multiple view openings 680, 682, 684, 686. FIG. 28 is a sectional view of the compression plate 600 taken through the line A-A.

Figure 31:
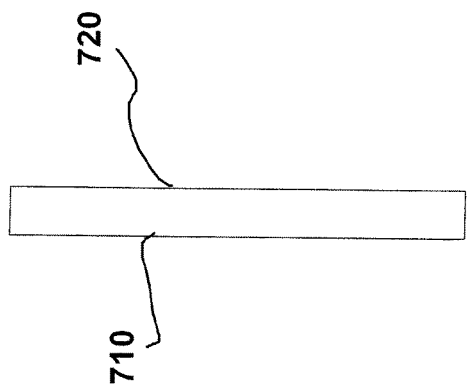
FIG. 31 is a side view of the compression plate of FIG. 29.
Figure 29:
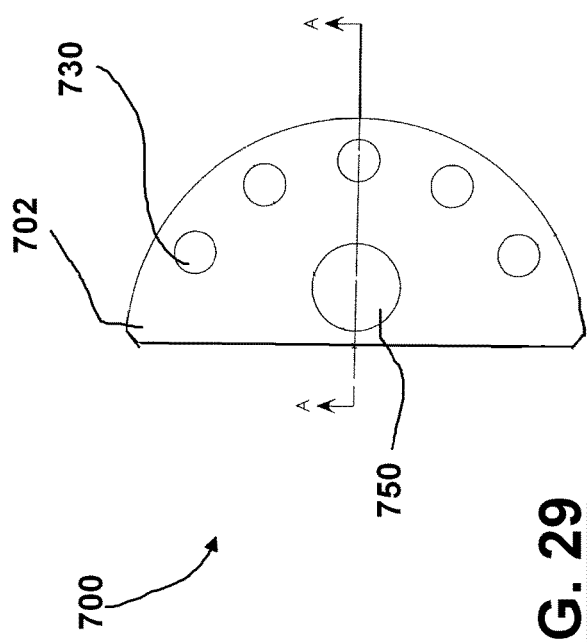
FIG. 29 is a front view of one embodiment of piece of a two piece compression plate where the two piece compression plate has two main openings both of which are offset from the center.
Figure 30:
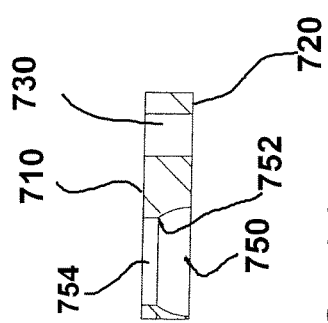
FIG. 30 is a sectional view of the compression plate of FIG. 19 taken through the line A-A.

FIG. 29 is a front view of one embodiment of one piece 710 of a two piece compression plate 700 where the two piece compression plate 700 has two main openings 750 and 760 both of which are offset from the center. FIG. 30 is a sectional view of compression plate 700 taken through the line A-A. FIG. 31 is a side view of the compression plate 700.

Figure 34:
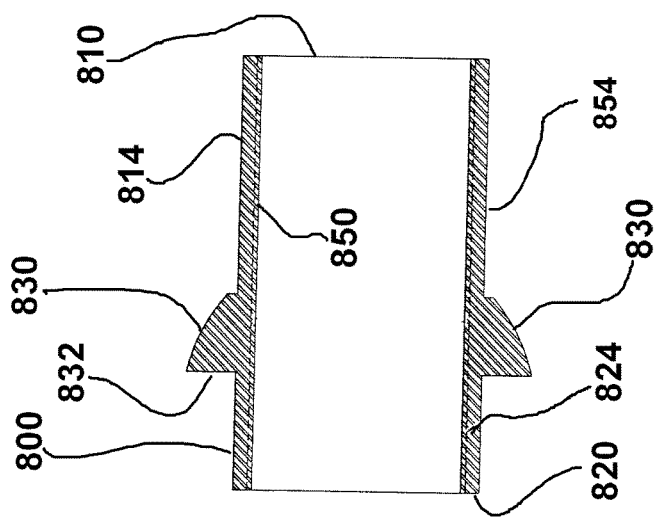
FIG. 34 is a sectional view of the swivel nut of FIG. 32 taken through the line A-A.
Figure 33:
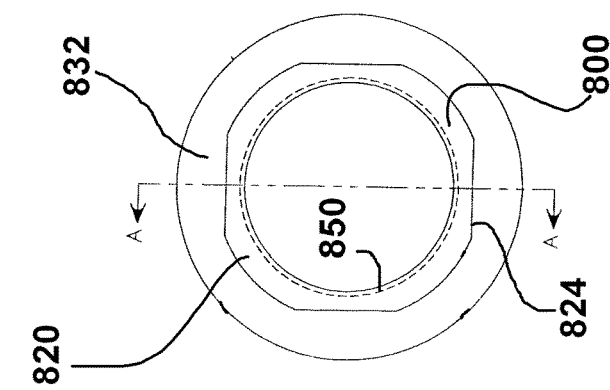
FIG. 33 is a rear view of the swivel nut of FIG. 32.
Figure 32:
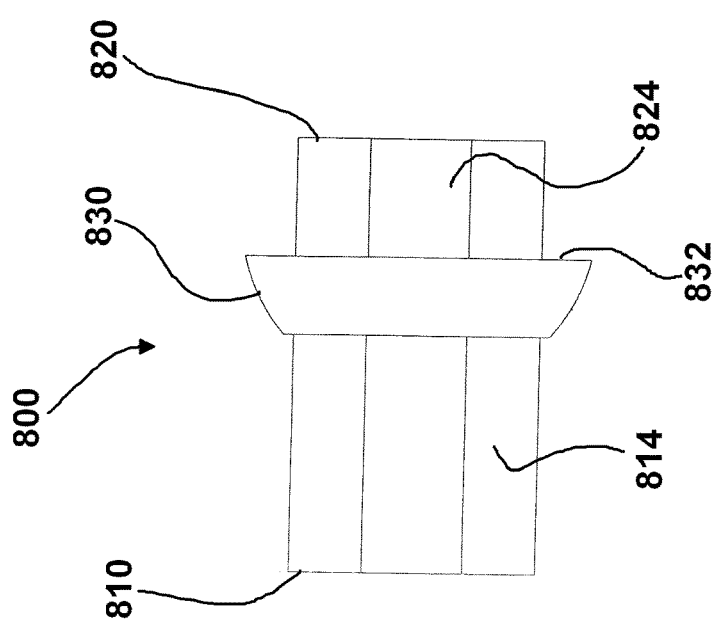
FIG. 32 is a side view of one embodiment of a swivel nut.

FIG. 32 is a side view of one embodiment of a swivel nut 800. FIG. 33 is a rear view of swivel nut 800. FIG. 34 is a sectional view of swivel nut 800 taken through the line A-A.

FIG. 35 is a perspective view of one embodiment of a detachable support foot 350.

Figure 36:
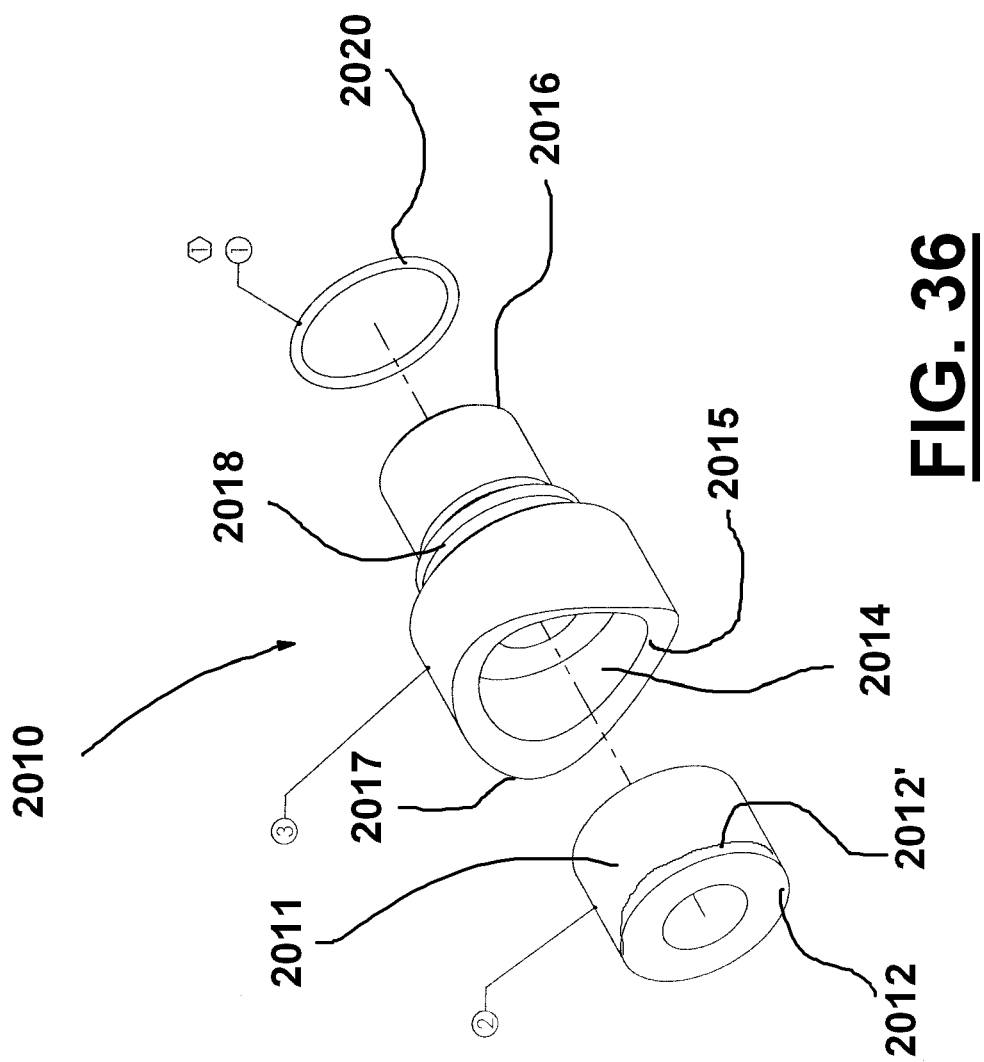
FIG. 36 is a perspective view of one embodiment of a tip for the hot tapping tool.

FIG. 36 is a perspective view of one embodiment of a tip 2010 for the hot tapping tool 2000.

Figure 8:
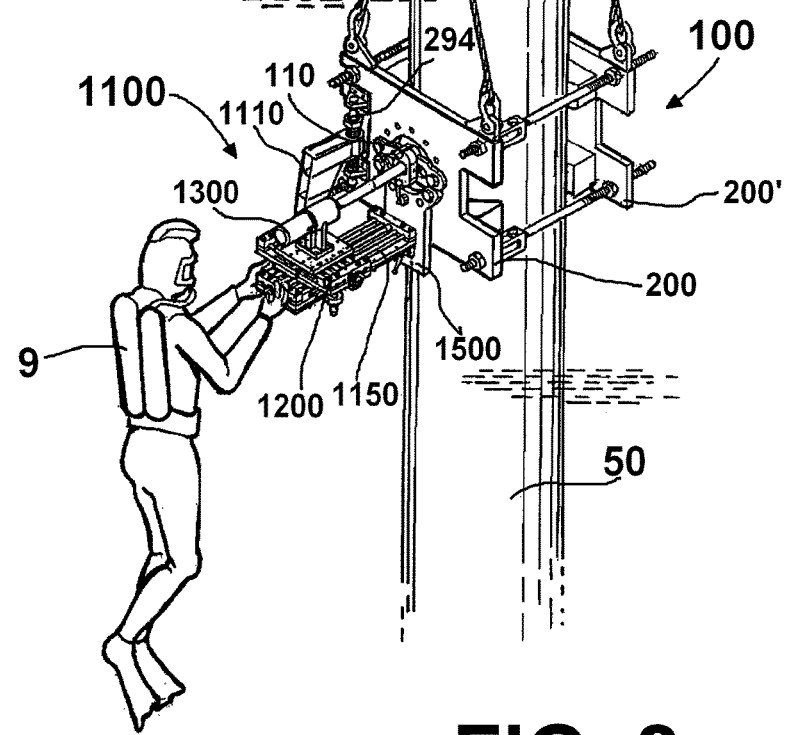
FIG. 8 shows the saw attached to the hot tap housing and positioned to make a cut in one of the nested tubulars.
Figure 10:
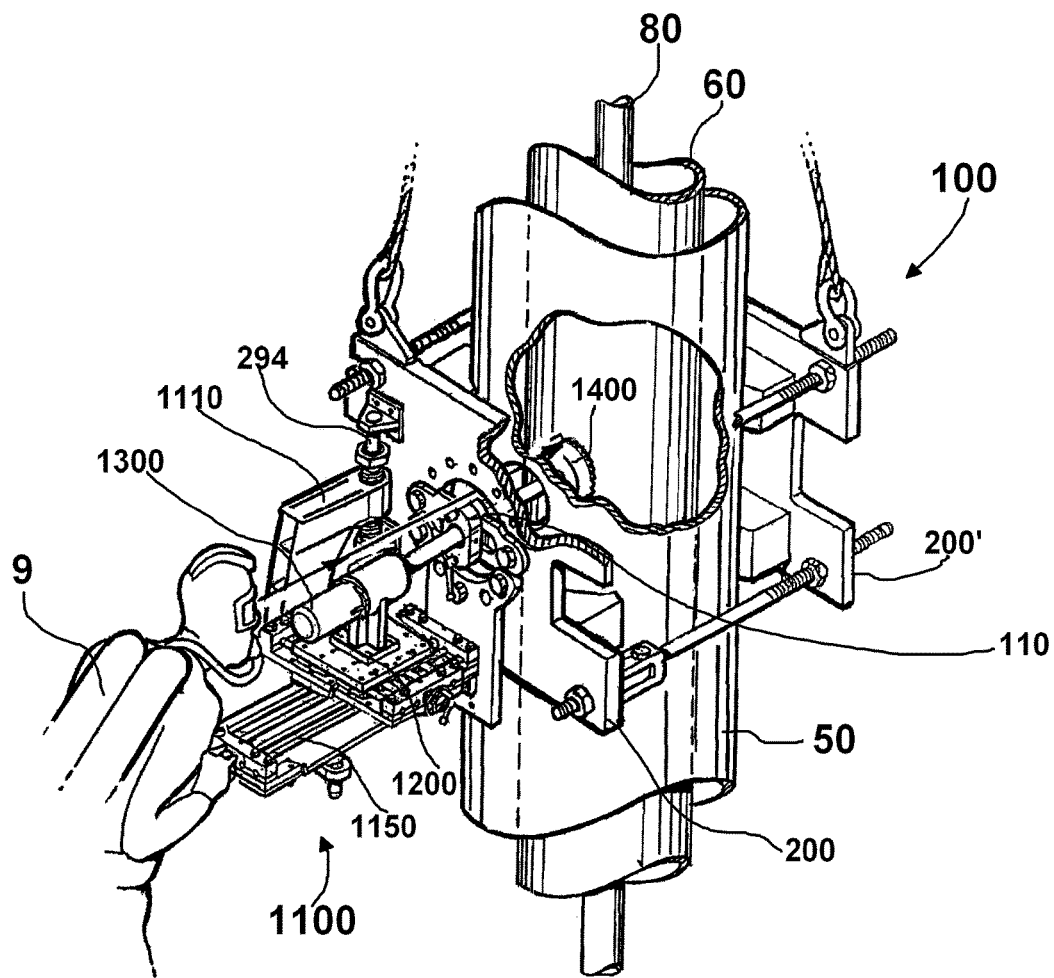
FIG. 10 is a perspective view of a diver using the articulating saw.

In one embodiment a drill system can be used to cut enlarged openings the tubulars in between hot tapping each tubular. For example, an articulating drill system 1100 (see FIGS. 7-8, 10 and 37-47) can be used. In FIG. 8, the diver 9 is shown attaching the articulating saw 1100 to the hot tap housing 100. FIG. 10 is a perspective view of a diver using saw 1100. The saw 1100 can be pivotally attached to the hot tap housing 100 via a pin on one side and a support plate on another side. The saw 1100 also has an articulating and sliding support joint for the rotating saw shaft. FIG. 8 shows the saw 1100 attached to the hot tap housing 100 and positioned to make a cut in one of the nested tubulars 50, 60, 70, 80.

Drill system 1100 and can include first arm 1110, second arm 1120, base 1150, and connection plate 1500. First arm 1110 can be pivotally connected to second arm 1120. Second arm 1120 can be pivotally connected to base 1150. Base 1150 can be pivotally connected to connection plate 1500. Drill 1300 can be attached to base 1150. Drill 1300 can comprise motor 1320 and cutting tip 1400 which is rotationally connected to motor 1320. Longitudinal track system 1160 can allow controlled longitudinal movement (e.g., along the longitudinal direction of base 1150) of drill 1300 such as by a screw and thread system. Track system 1160 can include a quick release/quick lock system which longitudinally locks the position of drill 1300 relative to base 1150. Perpendicular track system 1200 can allow controlled perpendicular movement (e.g., perpendicular to the longitudinal direction of base 1150) of drill 1300 such as by a screw and thread system. Track system 1200 can include a quick release/quick lock system which perpendicularly locks the position of drill 1300 relative to base 1150. Longitudinal and perpendicular track systems 1160 and 1200 can respective longitudinally and perpendicularly adjust the position of drill 1300. Drill system 1100 can be pivotally connected to first plate 200, such as by pin 294. Connection plate 1500 can be used to partially positionally lock drill system 100 relative to first plate 200. Even when partially locked, drill 1300 can be pivoted relative to first plate 200 through pivoting joint 1510. Quick release/quick lock 1550 when unlocked allows for pivoting. However, locking quick release/quick lock 1550 prevents further pivoting movement of drill 1300.

In FIG. 8, the diver 9 is shown attaching the articulating saw 1100 to the hot tap housing 100. The saw 1100 can be pivotally attached to the hot tap housing 100 via a pin on one side and a support plate on another side. The saw 1100 also has an articulating and sliding support joint for the rotating saw shaft. FIG. 8 shows the saw 1100 attached to the hot tap housing 100 and positioned to make a cut in one of the nested tubulars 50, 60, 70, 80.

Figure 37:
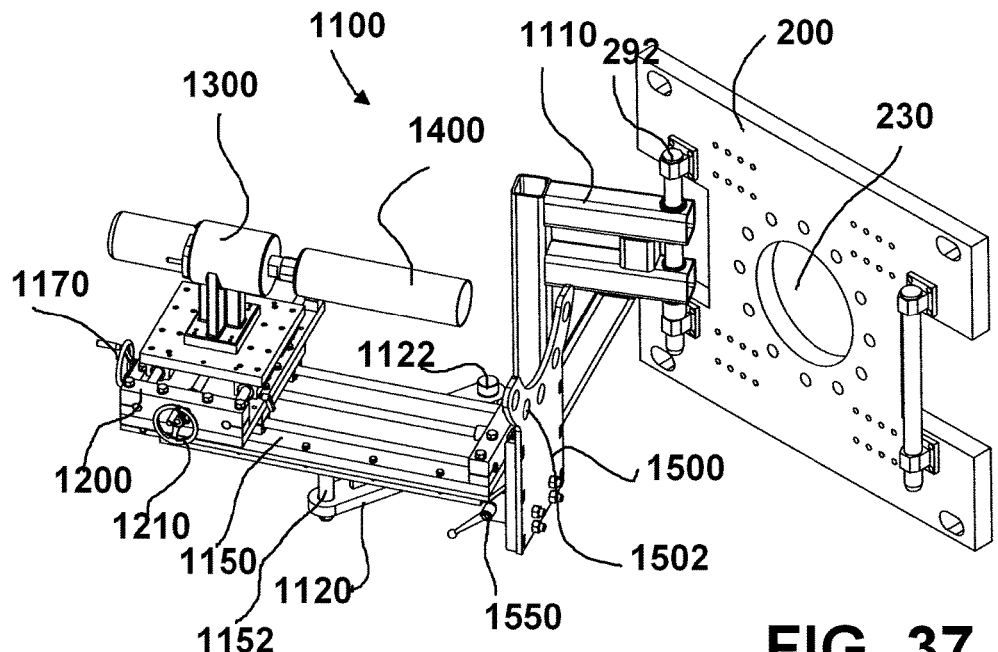
FIG. 37 is a perspective view of the articulating drill system of the present invention where the system is swung away from the plate.
Figure 38:
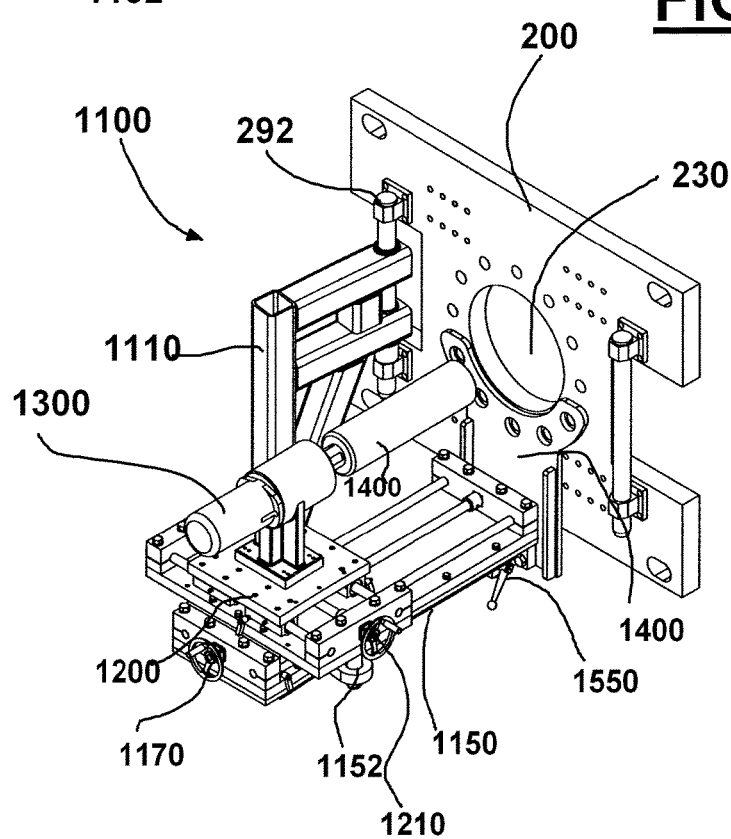
FIG. 38 is a perspective view of the articulating drill system of FIG. 37 here the system is connected to the plate, perpendicular to same and in the center of main plate opening.
Figure 39:
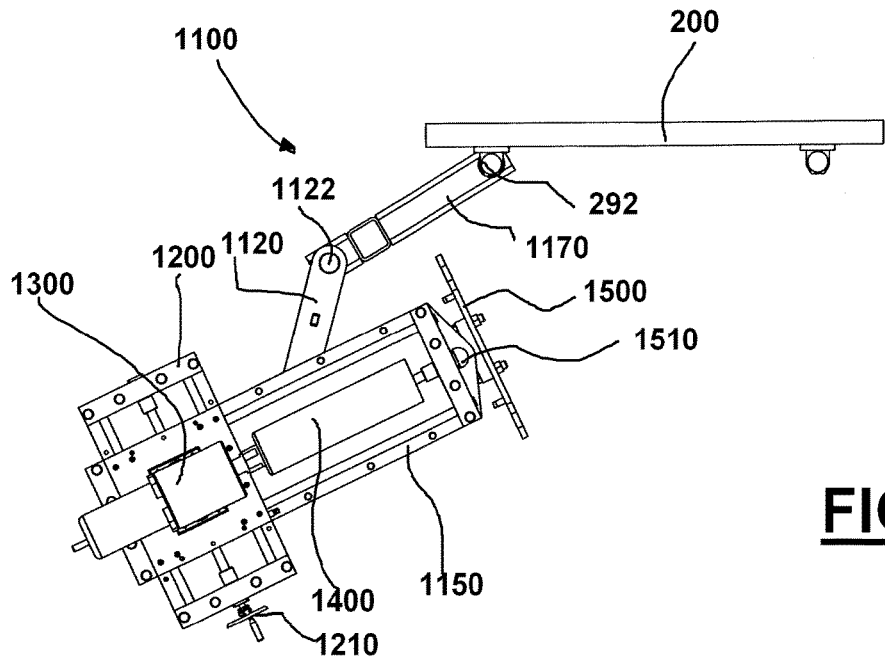
FIG. 39 is a top view of the articulating drill system of FIG. 37.
Figure 40:
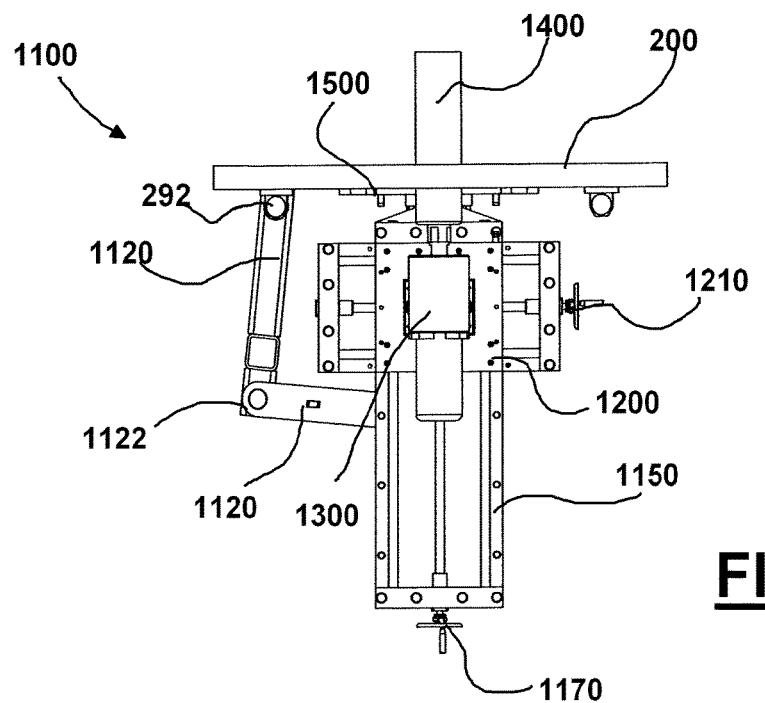
FIG. 40 is a top view of the articulating drill system of FIG. 37 where the system is connected to the plate, perpendicular to same and in the center of main plate opening with the drill tip having passed through main plate opening.
Figure 41:
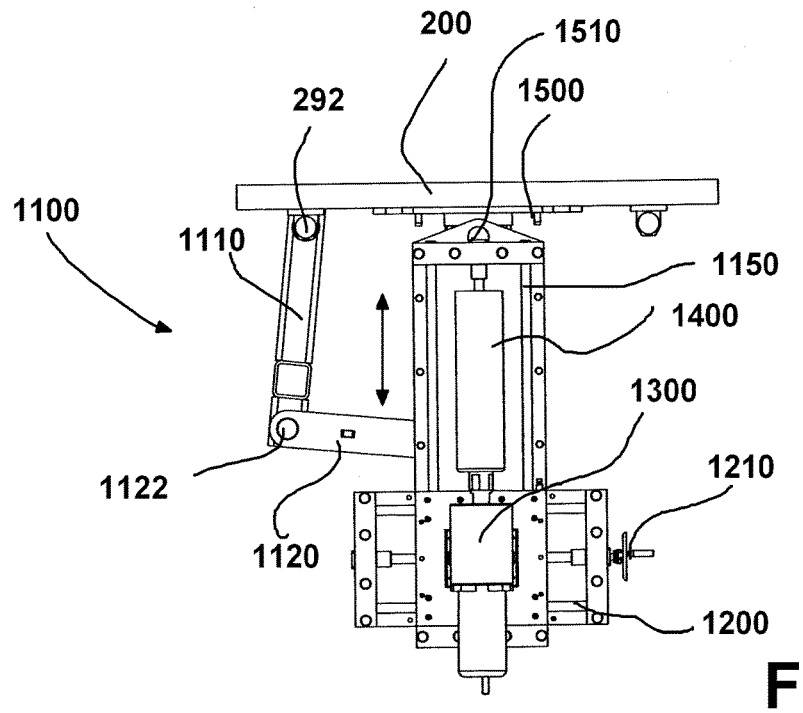
FIG. 41 is a top view of the articulating drill system of FIG. 37 where the system is connected to the plate, perpendicular to same and in the center of main plate opening with the double arrow schematically indicating that drill tip can move back and forth through main plate opening.
Figure 42:
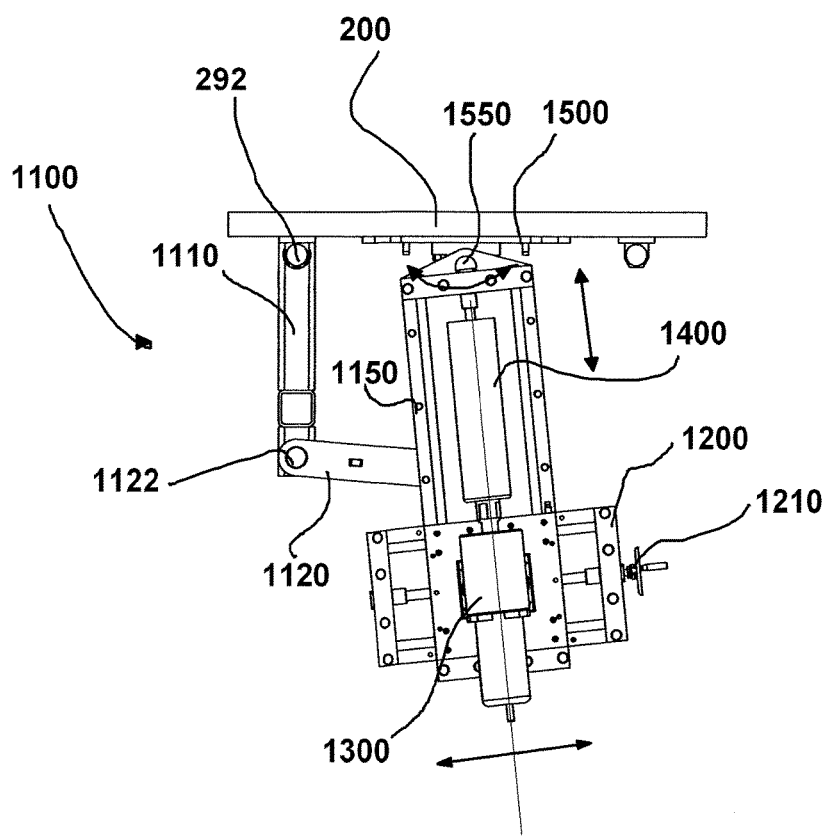
FIG. 42 is a top view of the articulating drill system of FIG. 37 where the system is connected to the plate, angled from same and in the center of main plate opening with the two sets of double arrows schematically indicating that drill tip can move back and forth through main plate opening along with rotating back and forth.
Figure 43:
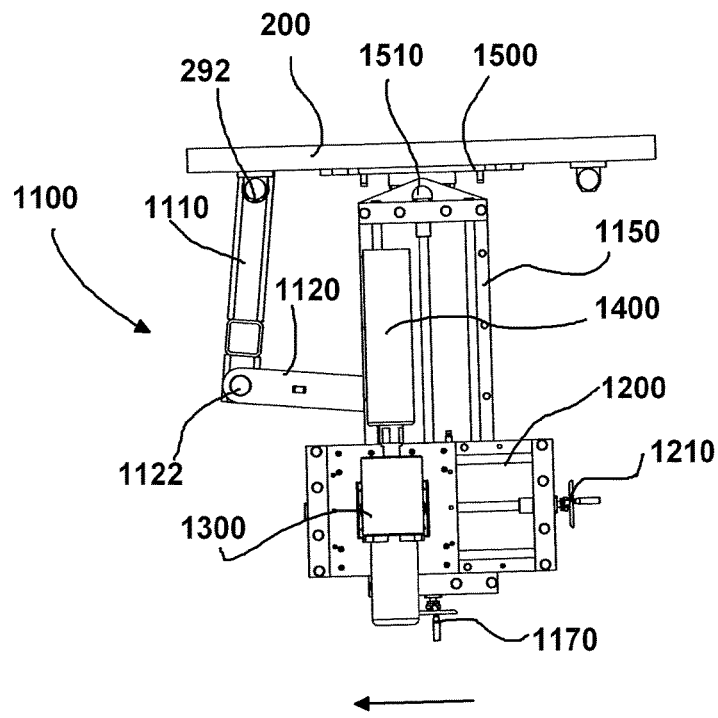
FIG. 43 is a top view of the articulating drill system of FIG. 39 where the system is connected to the plate, perpendicular to same and offset in the left direction of the arrow from the center of main plate opening.
Figure 44:
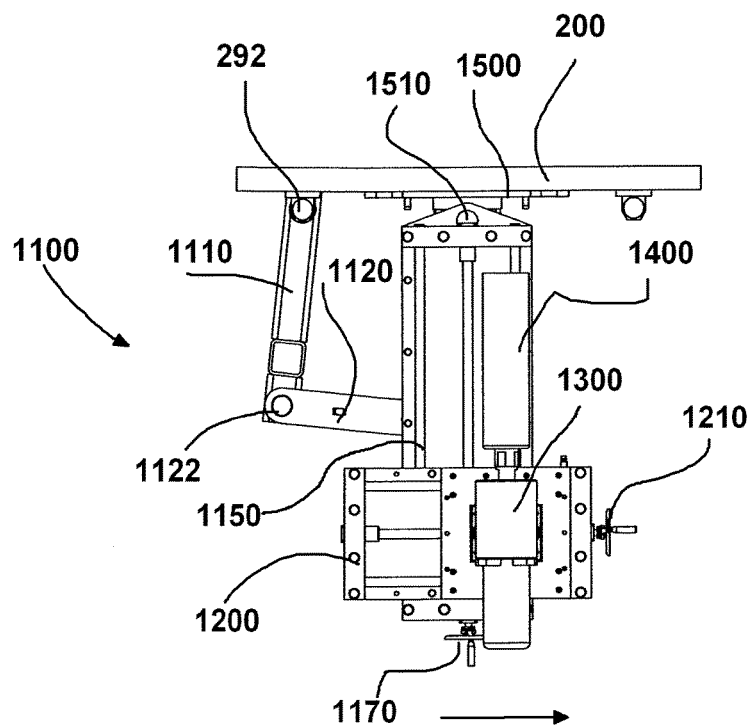
FIG. 44 is a top view of the articulating drill system of FIG. 39 where the system is connected to the plate, perpendicular to same and offset in the right direction of the arrow from the center of main plate opening.
Figure 45:
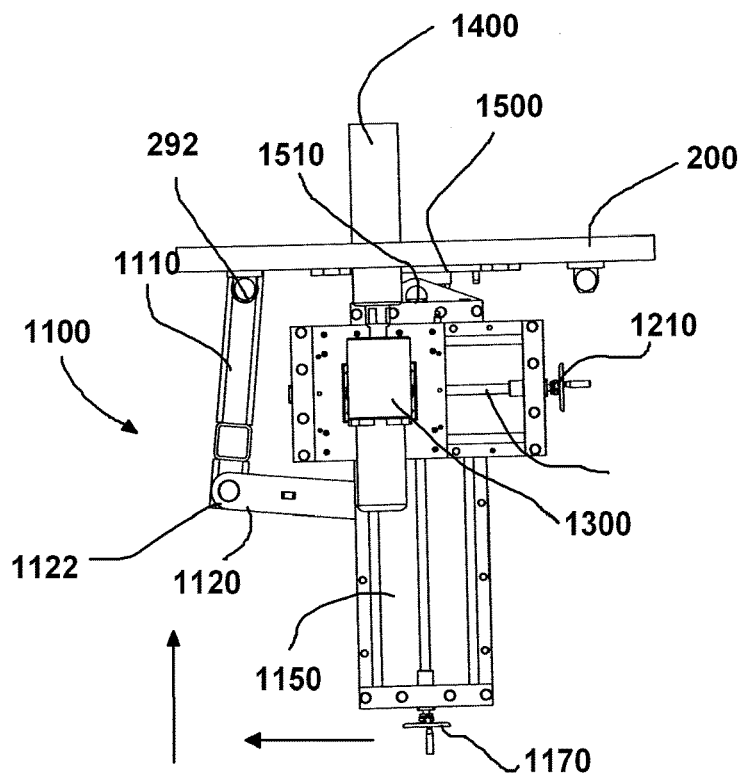
FIG. 45 is a top view of the articulating drill system of FIG. 39 where the system is connected to the plate, perpendicular to same and offset in the left direction of the arrow from the center of main plate opening and the drill tip is passed through the main opening.
Figure 46:
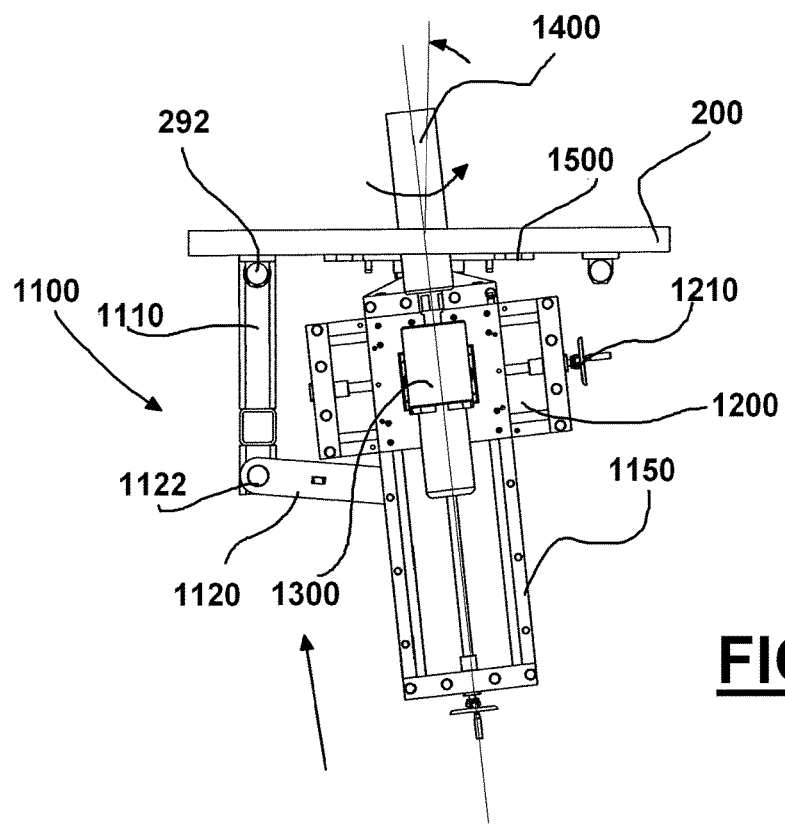
FIG. 46 is a top view of the articulating drill system of FIG. 39 where the system is connected to the plate, angled from a perpendicular to same as indicated by the arrows, where and the drill tip is passed through the main opening.
Figure 47:
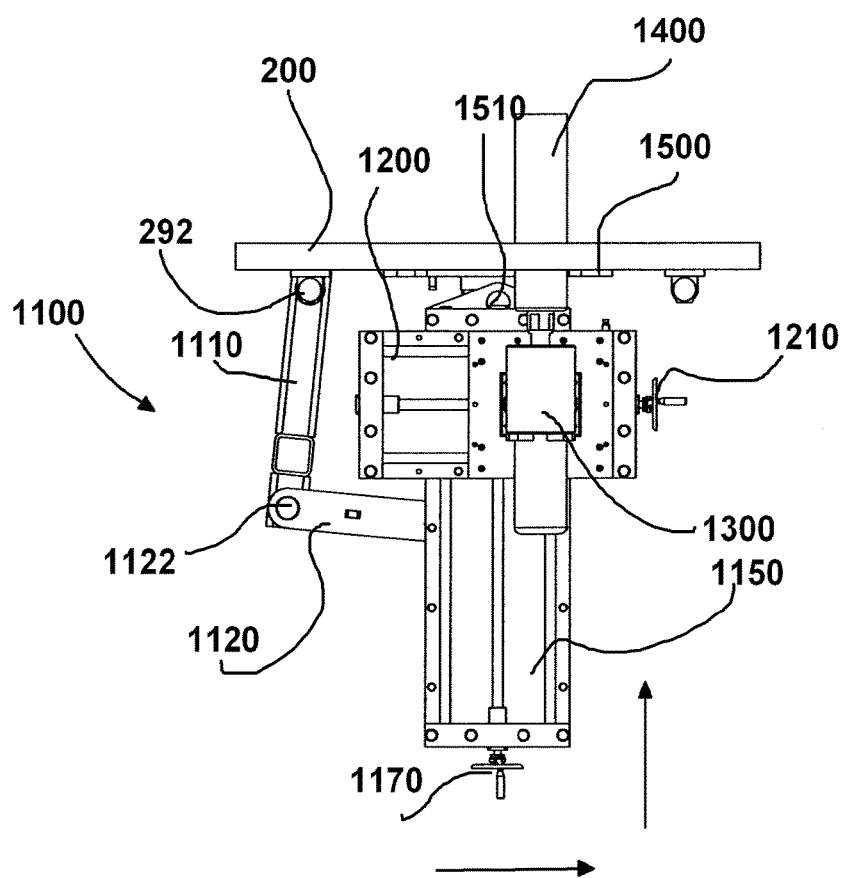
FIG. 47 is a top view of the articulating drill system of FIG. 39 where the system is connected to the plate, perpendicular to same and offset in the right direction of the arrow from the center of main plate opening and the drill tip is passed through the main opening.
Figure 60:
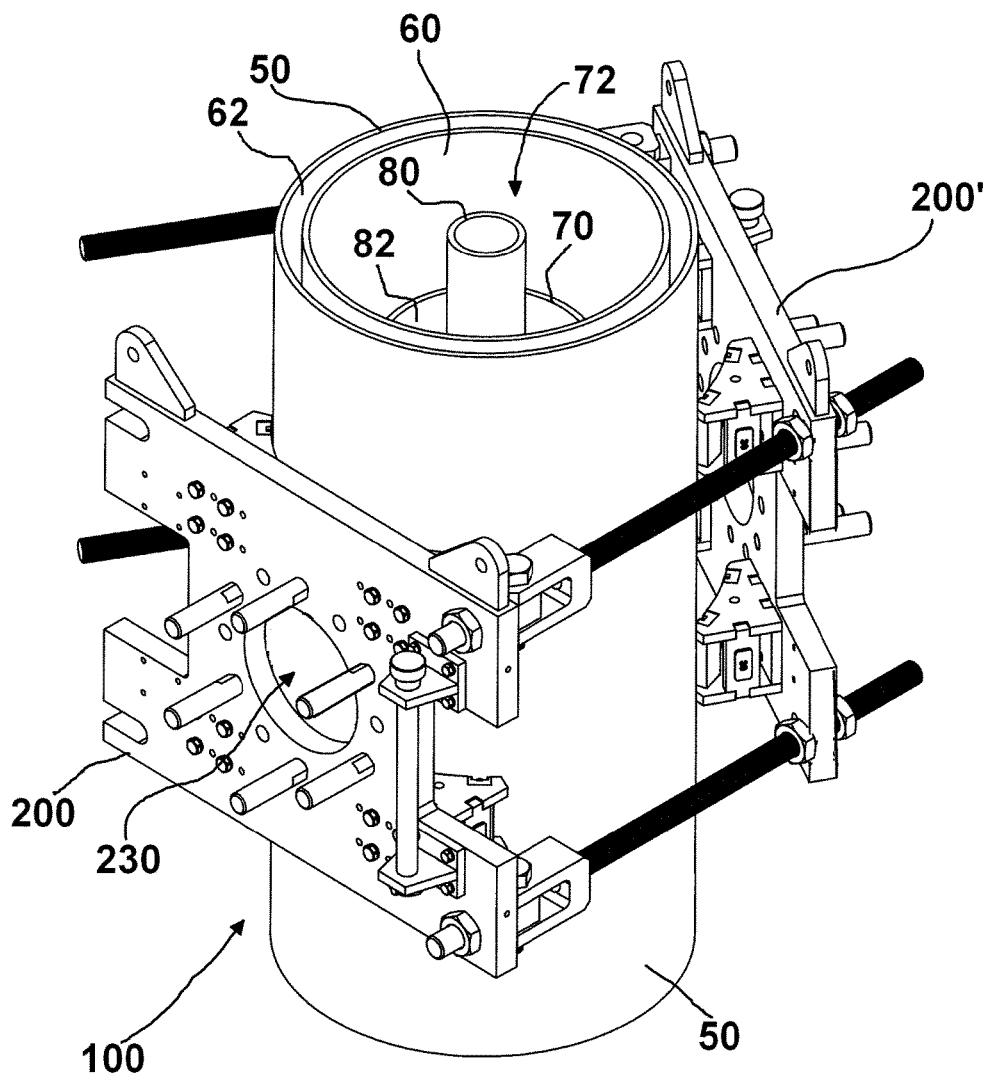
FIG. 60 is a perspective view showing the two plate embodiment being placed on the riser piping system.
Figure 61:
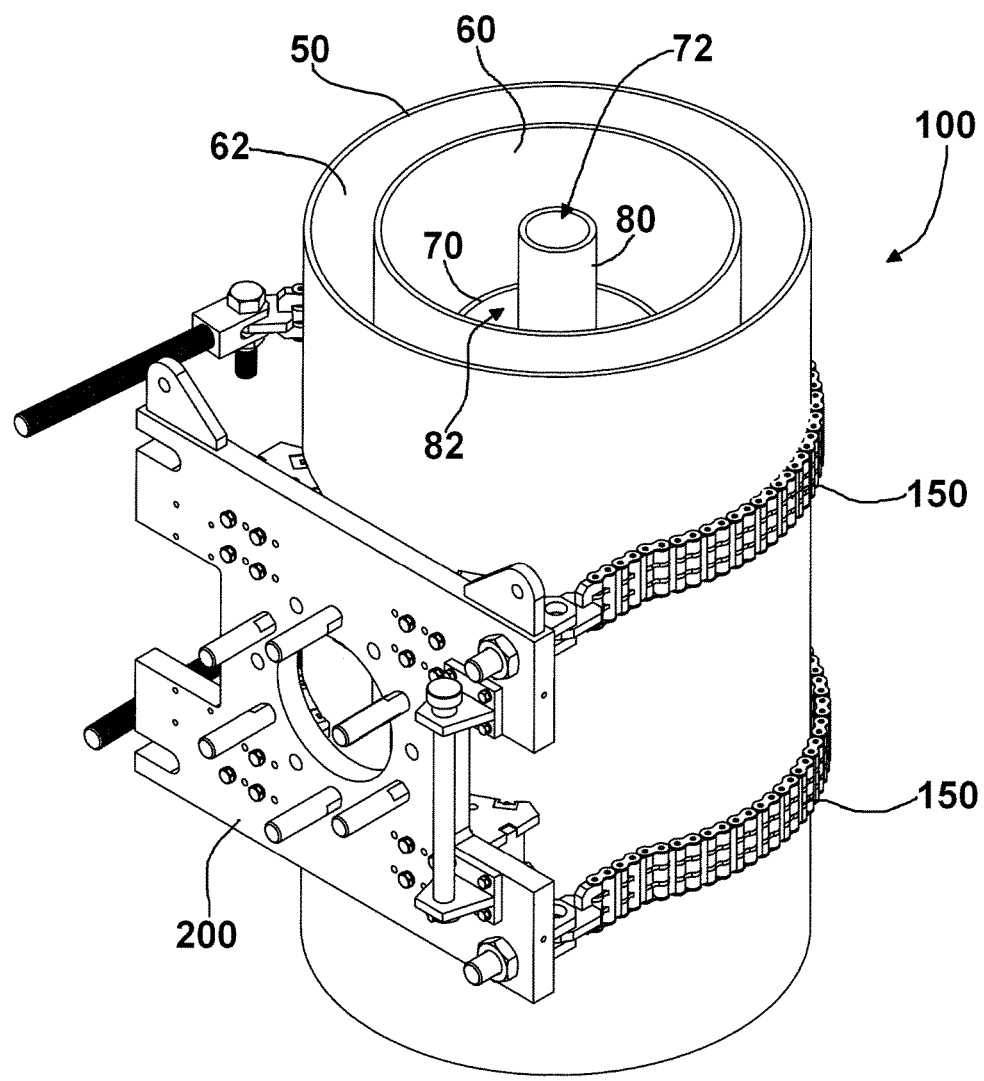
FIG. 61 is a perspective view showing the one plate and chain embodiment being placed on the riser piping system.
Figure 62:
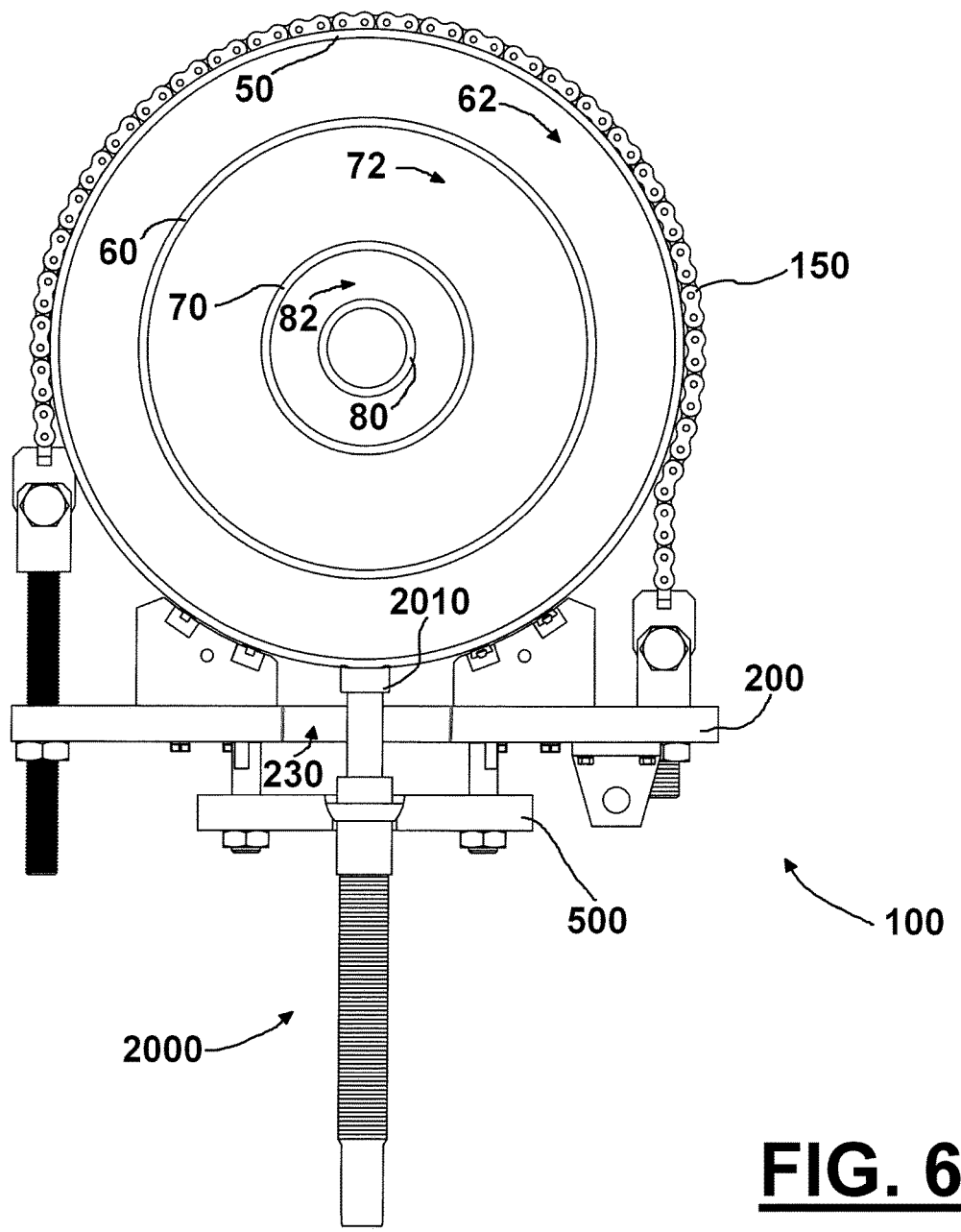
FIG. 62 is a schematic top view of the embodiment shown in FIG. 61 illustrating the step of hot tapping of a first exterior pipe.
Figure 63:
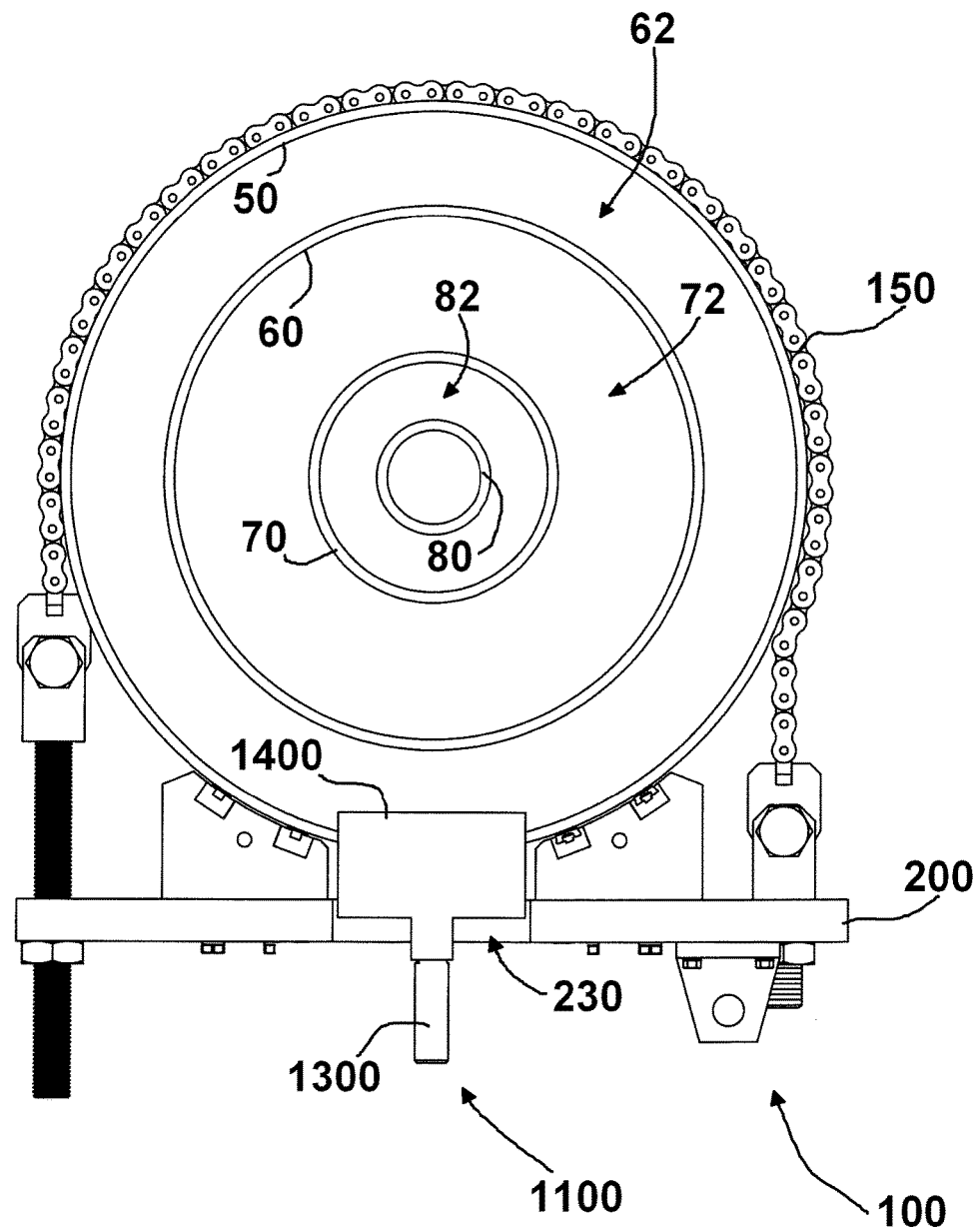
FIG. 63 is a schematic top view of the embodiment shown in FIG. 61 schematically illustrating the step of making an opening in the first exterior pipe.
Figure 64:
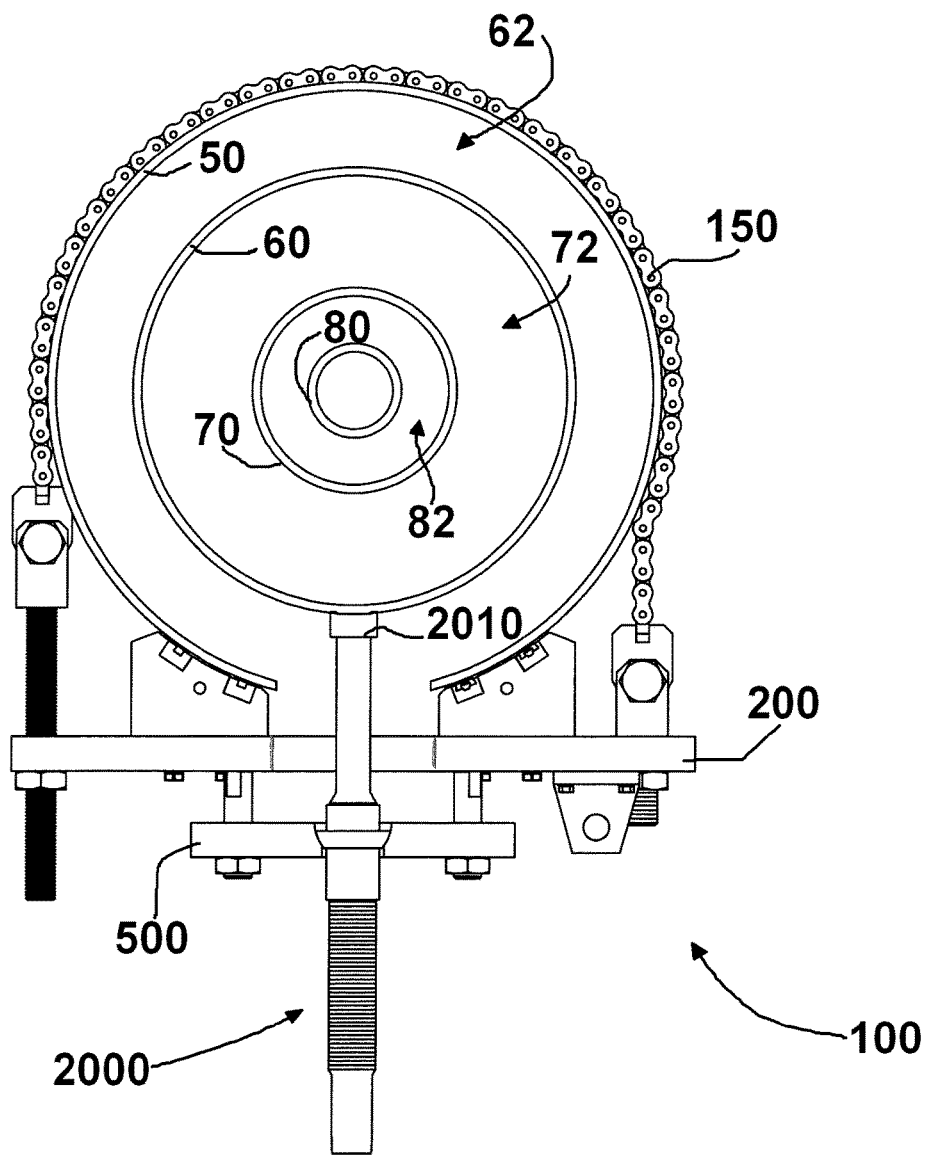
FIG. 64 is a schematic top view of the embodiment shown in FIG. 61 illustrating the step of hot tapping of a second interior pipe wherein the second interior pipe is concentrically located within the first pipe.
Figure 65:
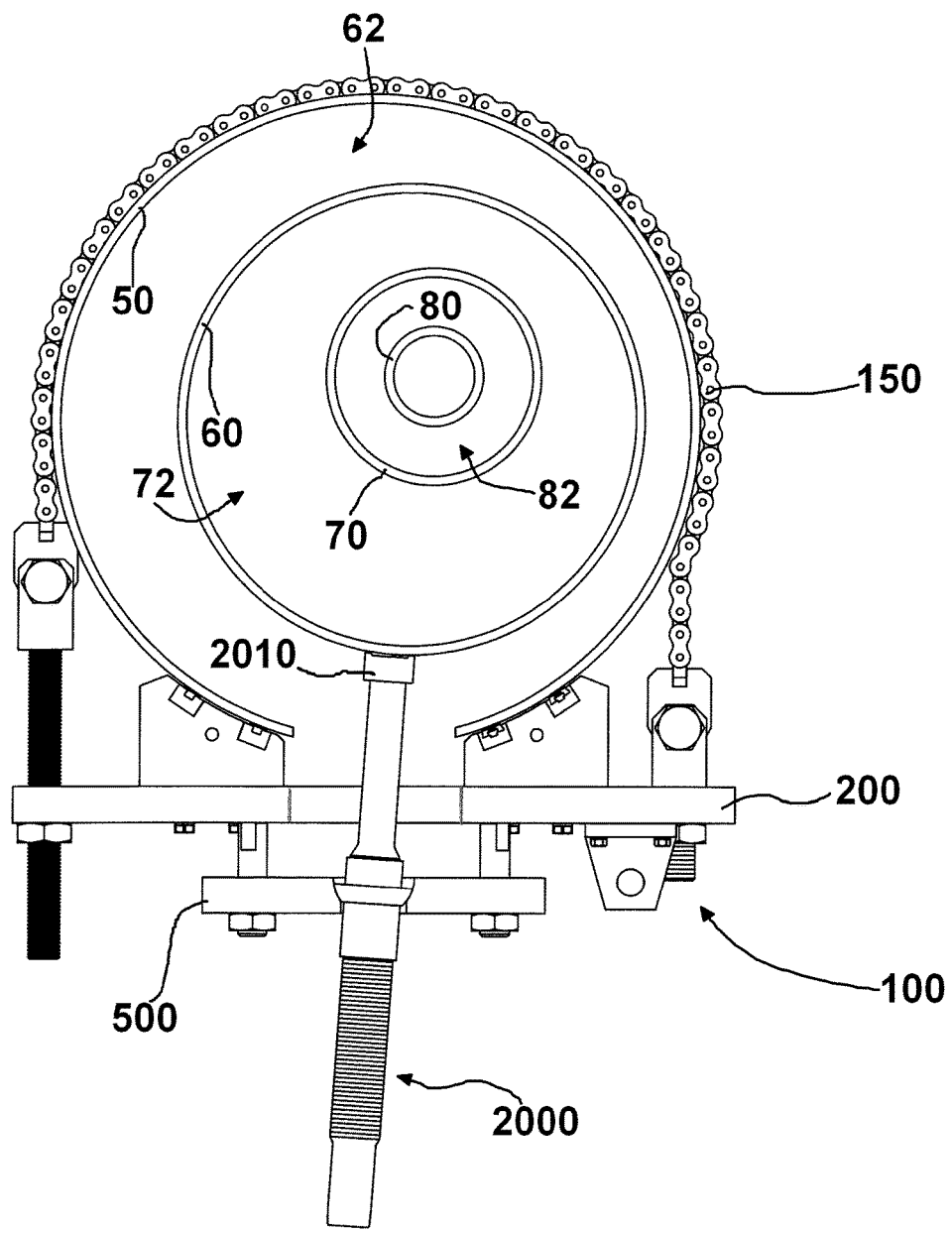
FIG. 65 is a schematic top view of the embodiment shown in FIG. 61 illustrating the step of hot tapping of a second interior pipe wherein the second interior pipe is non-concentrically located (angularly offset from a perpendicular) within the first pipe.
Figure 66:
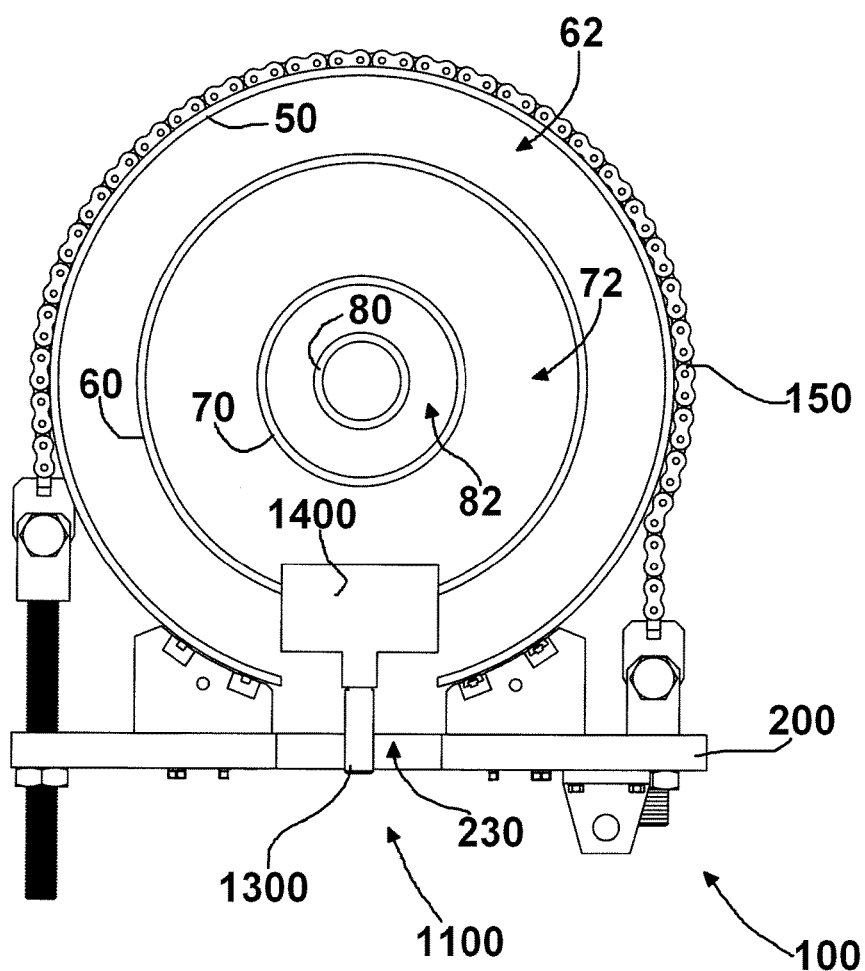
FIG. 66 is a schematic top view of the embodiment shown in FIG. 61 schematically illustrating the step of making an opening in the second pipe.
Figure 67:
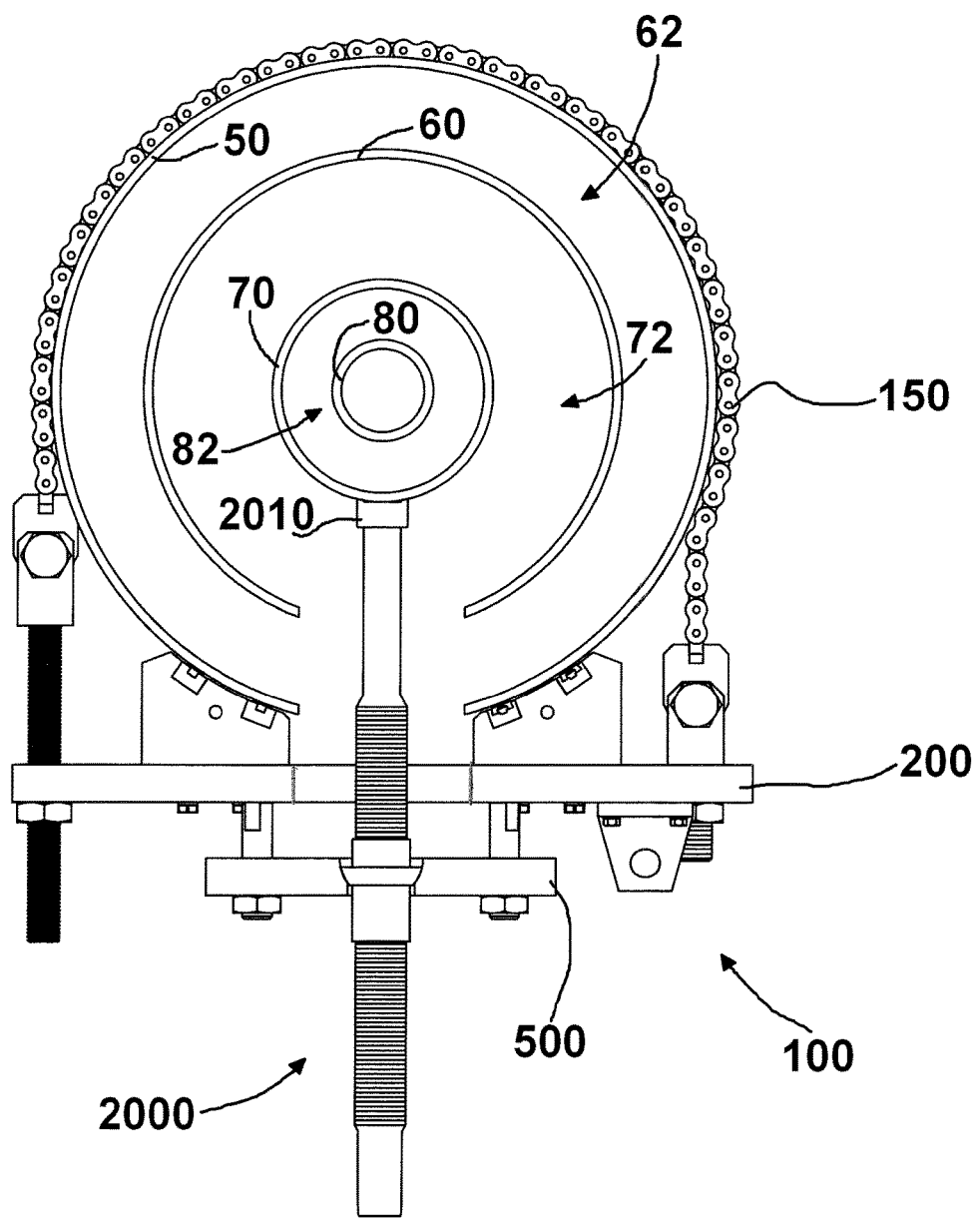
FIG. 67 is a schematic top view of the embodiment shown in FIG. 61 illustrating the step of hot tapping of a third interior pipe wherein the third interior pipe is concentrically located within the first pipe.
Figure 68:
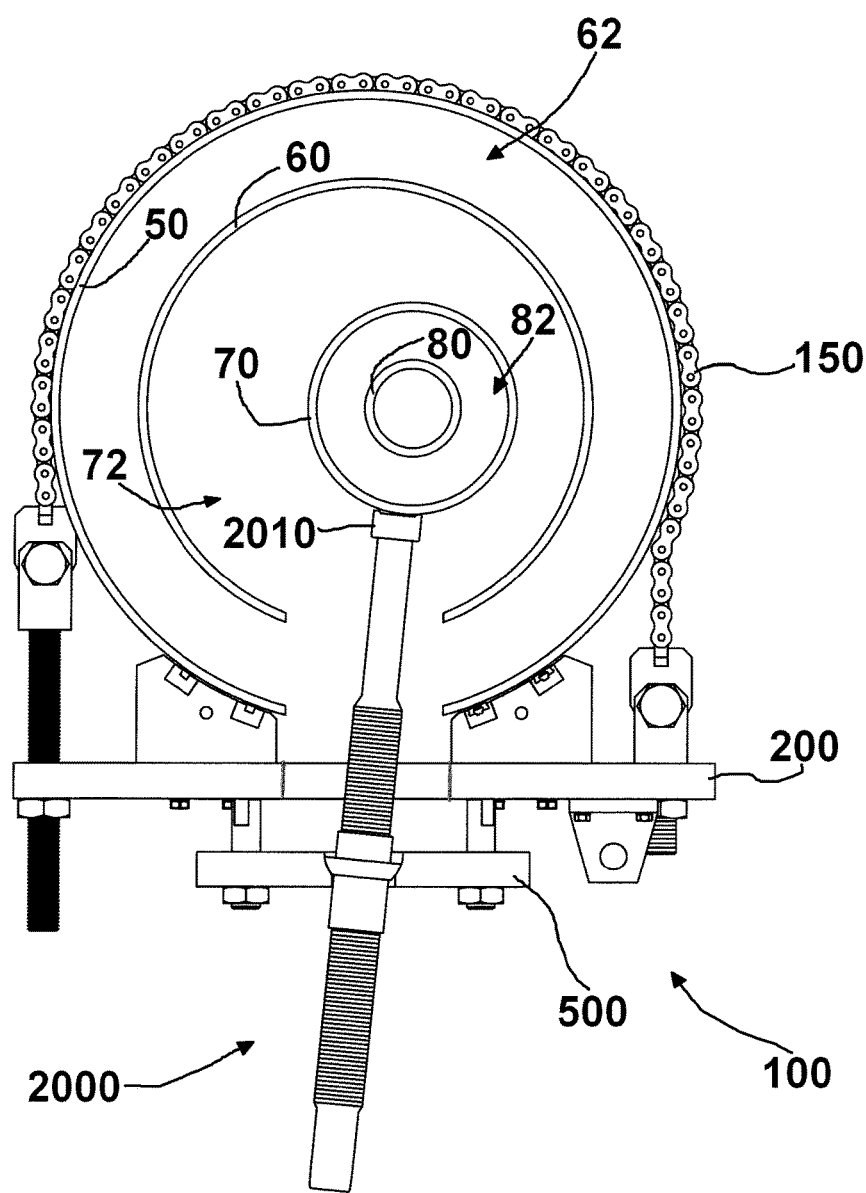
FIG. 68 is a schematic top view of the embodiment shown in FIG. 61 illustrating the step of hot tapping of a third interior pipe wherein the third interior pipe is non-concentrically located (angularly offset from a perpendicular) within the first pipe.
Figure 69:
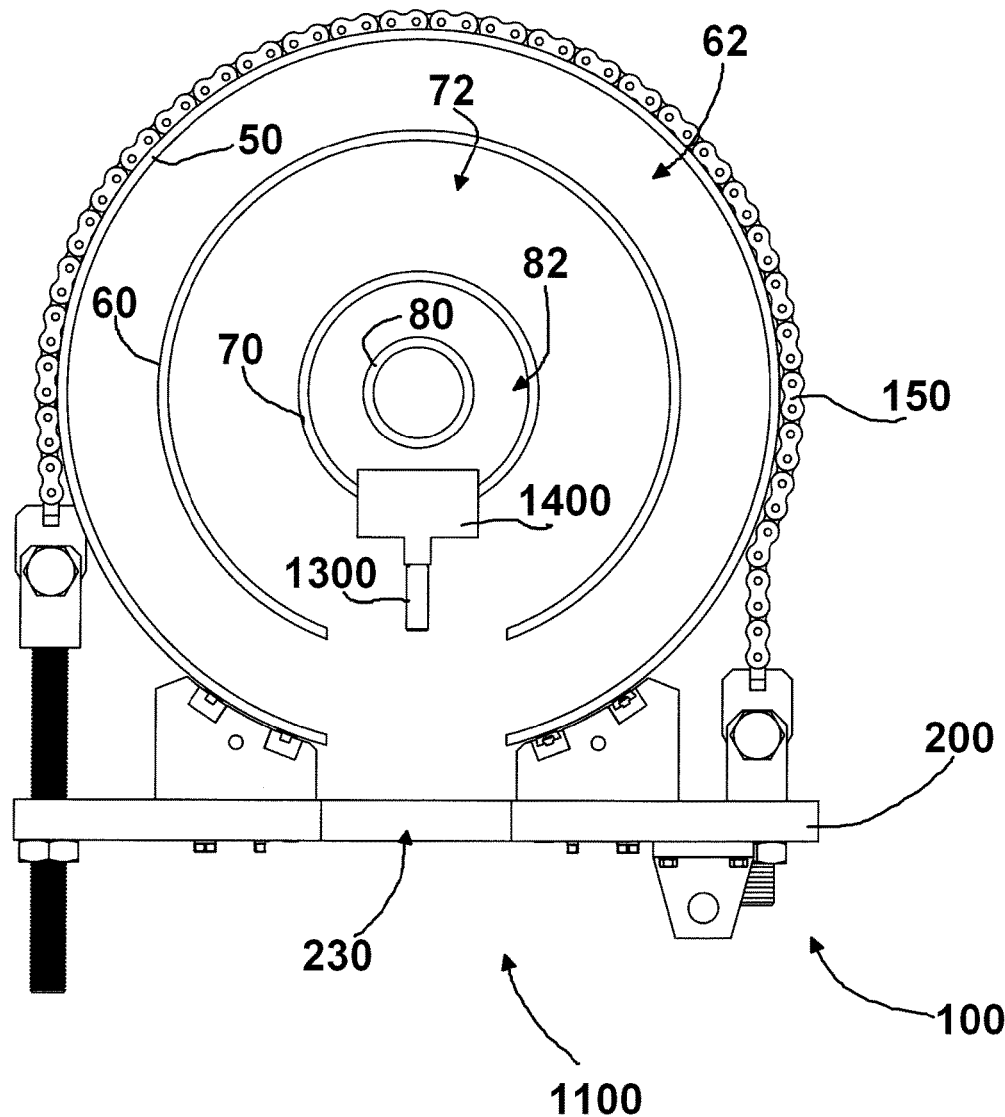
FIG. 69 is a schematic top view of the embodiment shown in FIG. 61 schematically illustrating the step of making an opening in the third pipe.
Figure 70:
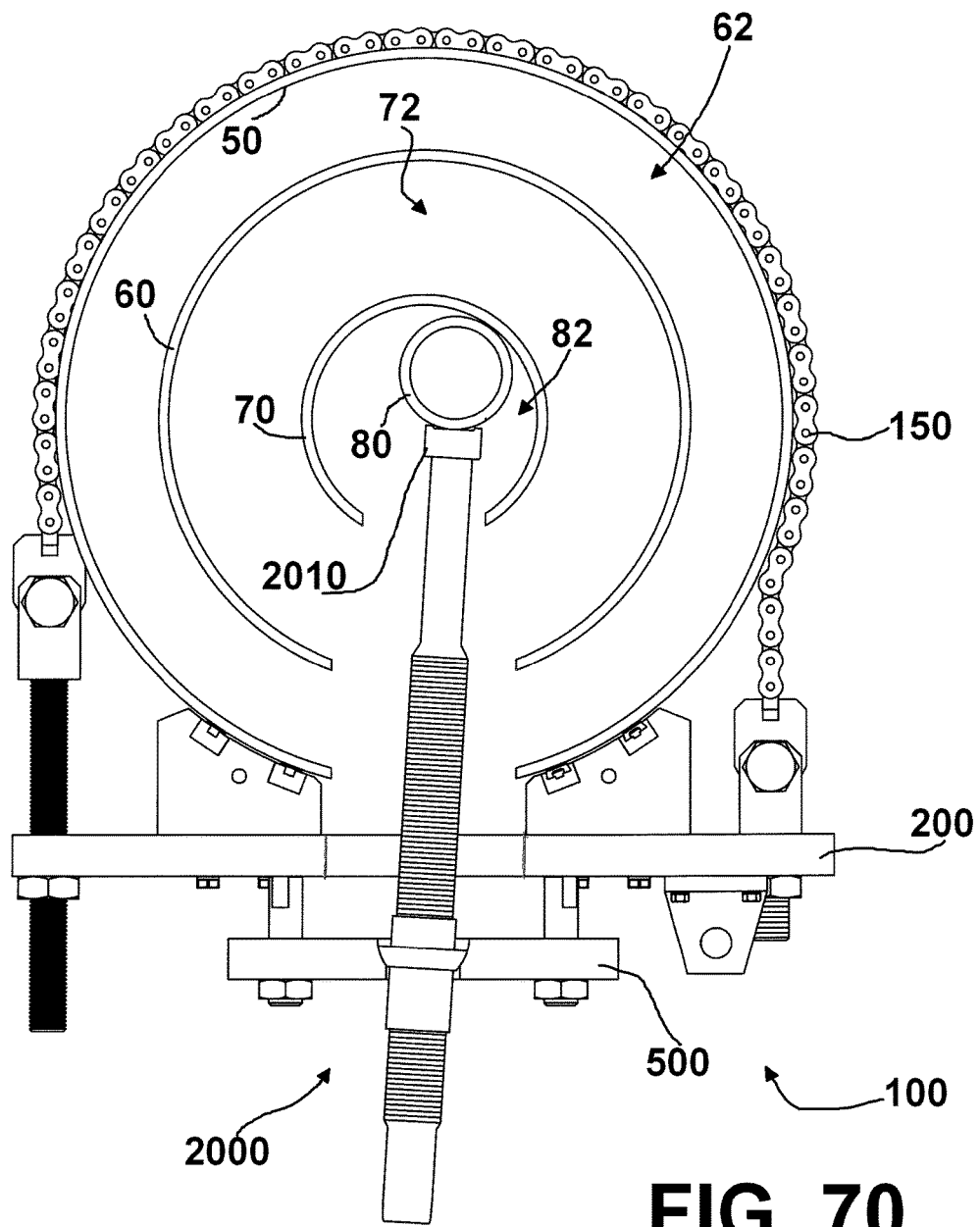
FIG. 70 is a schematic top view of the embodiment shown in FIG. 61 illustrating the step of hot tapping of a fourth pipe or tubing where the hot tapping tool is angularly offset from a perpendicular to assist in making the hot tapping seal between the tip and the pipe along with pushing the fourth pipe or tubing back, and to a location where it contacts the third interior pipe and enough backward resistance by the fourth pipe or tubing to maintain a good seal between the tip of the hot tap tool and the surface of the fourth pipe or tubing.
Figure 71:
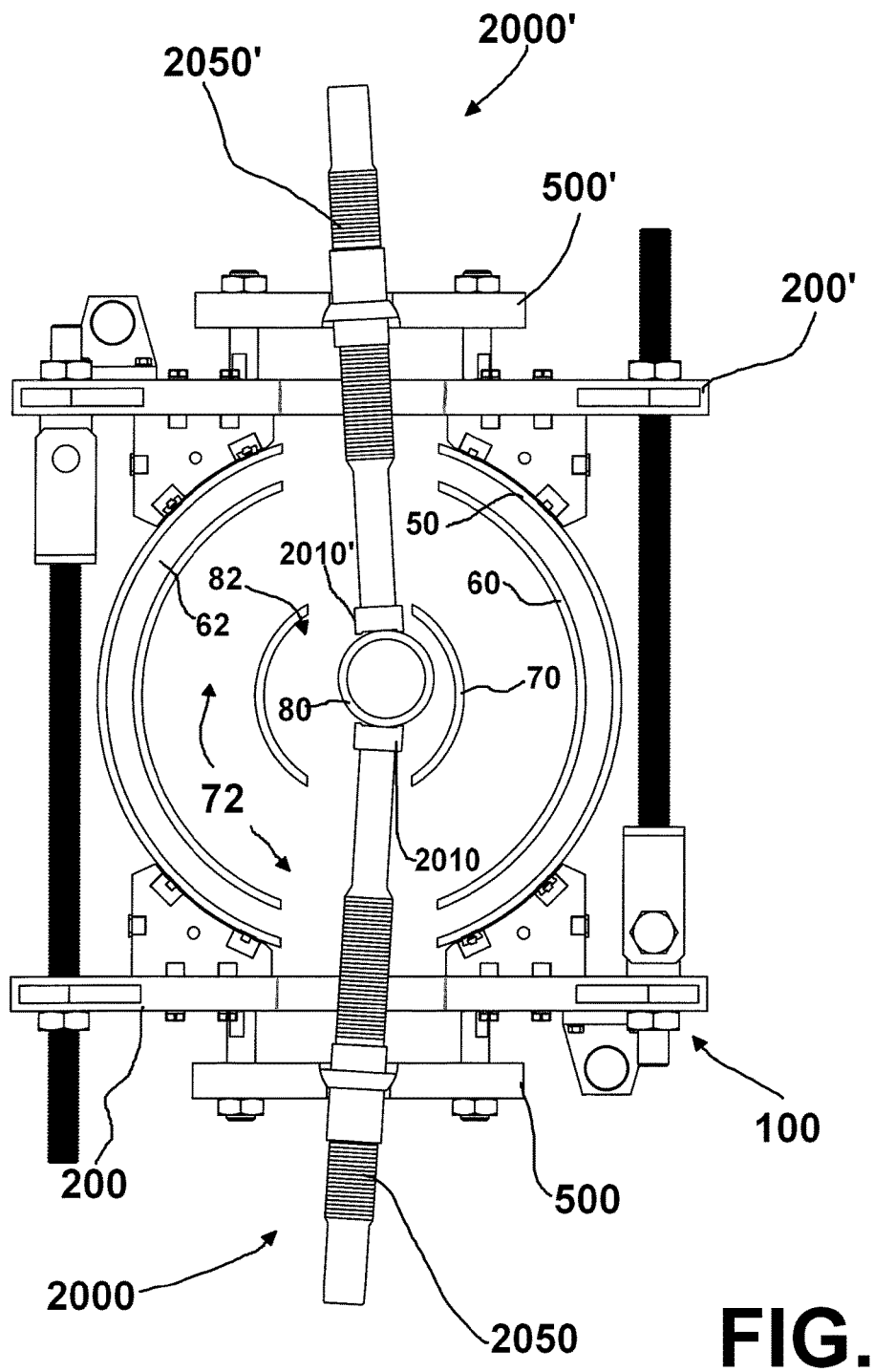
FIG. 71 is a schematic top view illustrating the step of hot tapping of a fourth pipe or tubing where the hot tapping tool is angularly offset from a perpendicular to assist in making the hot tapping seal between the tip and the pipe, along with the step of using a second tool to provide support for the tubing when making a seal between the hot tapping tool and the tubing.

FIGS. 37 and 38 are perspective views of one embodiment of an articulating drill system 1100 for making enlarged openings through the different pipes with drill system 1100 shown swiveled out of the way of the clamp 100. Different drilling FIG. 39 is a top view of the articulating drill system 1100 shown in the same position as FIG. 37. FIG. 40 is a perspective view of articulating drill system 1100 shown in position to make a cut through one of the pipes. FIG. 41 is a top view of the articulating drill system 1100 where the system is connected to the plate 200, perpendicular to same and in the center of main plate opening 230 with the double arrow schematically indicating that drill tip 1400 can move back and forth through main plate opening 230. FIG. 42 is a top view of the articulating drill system 1100 where the system is connected to the plate 200, angled from same and in the center of main plate opening 230 with the two sets of double arrows schematically indicating that drill tip 1400 can move back and forth through main plate opening 230 along with rotating back and forth. FIG. 44 is a top view of the articulating drill system 1100 where the system is connected to the plate 200, perpendicular to same and offset in the right direction of the arrow from the center of main plate opening 230. FIG. 43 is a top view of the articulating drill system 1100 where the system is connected to the plate 200, perpendicular to same and offset in the left direction of the arrow from the center of main plate opening 230. FIG. 44 is a perspective view of the articulating drill system 1100 where the system is connected to the plate 200, perpendicular to same and in the center of main plate opening 230. FIG. 45 is a top view of the articulating drill system 1100 where the system is connected to the plate, perpendicular to same and offset in the left direction of the arrow from the center of main plate opening 230 and the drill tip 1400 is passed through the main opening 230. FIG. 46 is a top view of the articulating drill system 1100 where the system is connected to the plate 200, angled from a perpendicular to same as indicated by the arrows, where and the drill tip 1400 is passed through the main opening 230. FIG. 47 is a top view of the articulating drill system 1100 where the system is connected to the plate 200, perpendicular to same and offset in the right direction of the arrow from the center of main plate opening 230 and the drill tip 1400 is passed through the main opening 230. Drill system 1100 can include an articulating stabilizer 110, which itself can include a plate 111 having central slot 114 and plate openings 112, 113. The plate 111 is clamped or sandwiched in between housing sections 117, 125 with bearing 115 in between. Bearing 115 is an annular bearing that is sized and shaped to fit cavity 118 of housing section 117 while enabling bearing 115 to pivot with hot tapping tool that passes through opening 116. Clamps or bolts 121, 122 can be loosened to allow bearing 115 (and a hot tapping tool) to pivot while being supported by the bearing 115 and the housing sections and plate 111, 117, 125. Each clamp or bolt can have a lever or handle 123 or 124 for enabling a user (e.g. diver 9) to tighten the bolts or clamps 121, 122 once a selected angular position of the hot tapping tool is selected. Housing section 125 has surface 130 which slides upon surface 134 of plate 111. Housing section 125 has surface 131 which slides upon surface 135 of plate 111. Housing section 132 slides upon rear surface 136 of plate 111. In this fashion, a user such as diver 9 can loosen bolts or clamps 121, 122 and slide the housing sections 117, 125 laterally relative to plate 111. The plate 111 can be bolted to a selected part of clamp 100 using bolted connections at plate openings 112, 113. The housing section 125 has internally threaded openings 126, 127 that accept threaded portions 138 or 139 of bolts 121 or 122.

FIG. 48 is a perspective view of clamp 100 with cut outs 51 and 71 made in two of the pipes/tubulars (50,70) to hot tap the innermost tubular 80. Pipe 60 shown in other Figures has been omitted for clarity. FIG. 49 is a front view of FIG. 48. FIG. 50 is a top view of FIG. 48 showing that innermost nested tubular 80 is offset and swivel nut 800 (and mandrel 2050) allows direct connection of hot tap tip 2010 to tubular 80 without repositioning clamp 100.

FIGS. 51 through 53 show the eccentric compression plate 500' with the main opening 550 respectively at the 3, 6, and 9 O'clock positions to illustrate various modes of rotation adjustment of eccentric main opening 550. Pipe 60 has been omitted for clarity.

FIG. 54 is a perspective view of clamp 100 but with eccentric compression plate 500' with main opening 550 at the 3 O'clock position, and with cut outs 51 and 71 made in two of the pipes/tubulars (50 and 70) to hot tap the innermost tubular. FIG. 55 is a front view of clamp 100. FIG. 56 is a top view of clamp 100.

FIG. 57 is a perspective view of clamp 100' with double main opening compression plate 700 and schematically indicating the simultaneous hot tapping of two pipes or tubulars 80 and 80' with the same clamp 100'. FIG. 58 is a front view of clamp 100' with the arrows schematically indicating angular adjustability of mandrels 2050 and 2050'. FIG. 59 is a top view of claim 100'.

In one embodiment an angular adjustment of tapping tool 2000 both up and down and side to side can be made while attached to clamp 100 to effect a hot tapping seal. Such angular adjustment helps contact tip 2010 of hot tapping tool 2000 and making a seal with hot tapping tool.

In one embodiment the adjustable angular offset of hot tapping tool 2000 in the compression plate (500 and/or 600) can be at least about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, and 45 degrees from a perpendicular to compression plate. In one embodiment the adjustable angular offset is between about any two of the above specified angles.

In one embodiment compression plate (500 and/or 600) can be rotationally adjustable in at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 50, 55, 60, 65, 70, 75, 80, 85, and 90 degree increments. In one embodiment the rotational adjustability is between about any two of the above specified angular increments.

In one embodiment two hot tapping tools 2000, 2000' are simultaneously connected to compression plate 600. In one embodiment each of the hot tapping tools 2000, 2000' are angularly adjustable as specified with compression plate 500.

Visually Locating Tip of Hot Tap Tool

In one embodiment one or more openings provide visual access to pipe 50, 60, 70, and/or 80 is provided through compression plate 500 even while hot tapping tool 2000 is mounted in main opening 550.

Figure 9:
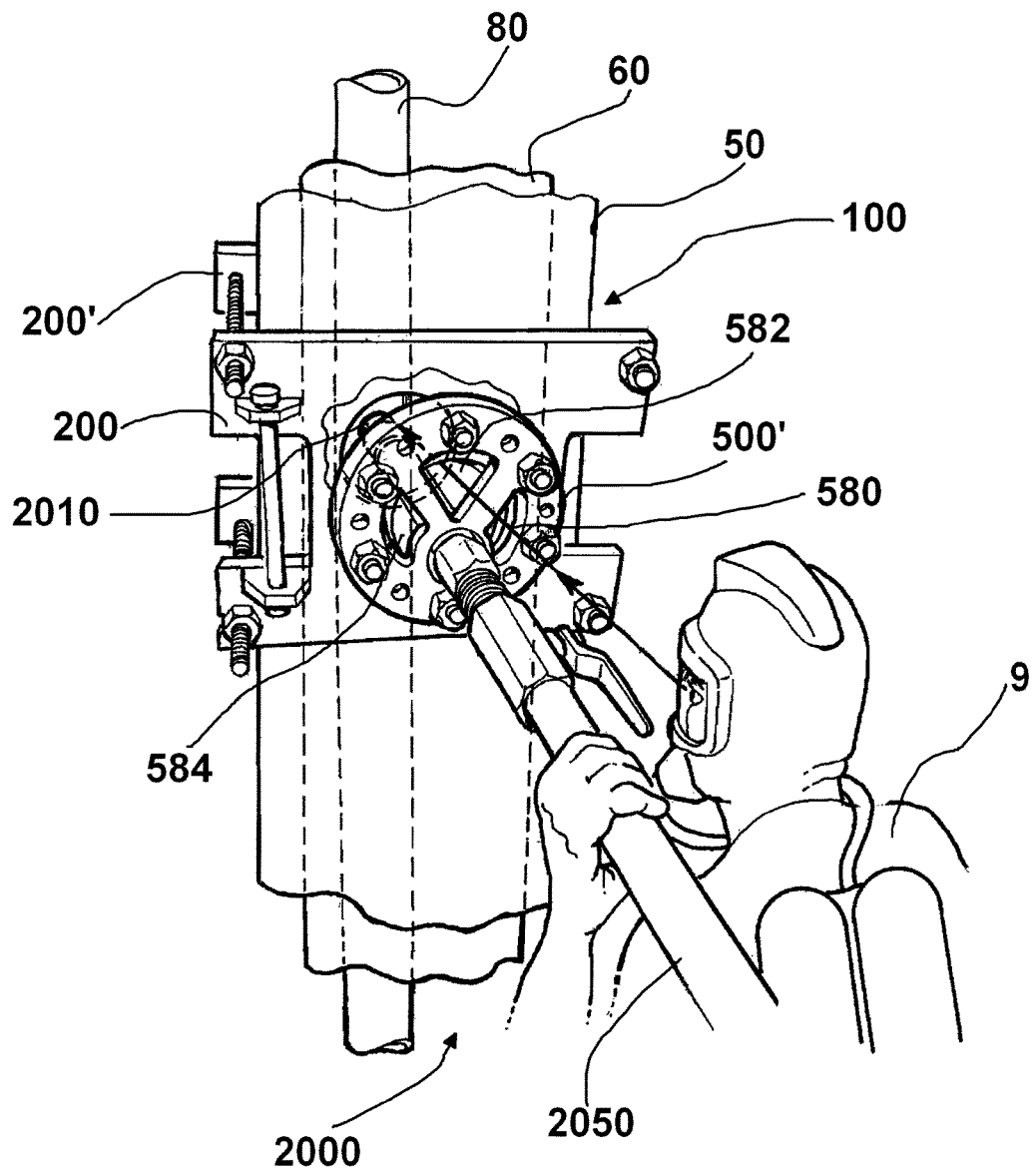
FIG. 9 is a closeup perspective view of a diver using the hot tap tool.

FIG. 9 is a closeup perspective view of a diver 9 using the hot tap tool 2000. FIG. 10 is a perspective view of a diver 9 using the articulating saw 1100. This figure illustrates the ability of diver 9 to locate by eyesight the tip 2010 of hot tap tool 2000 when hot tapping a pipe located inside of nested tubulars (e.g., pipe 80 located inside of tubulars 50, 60, and 70 (although tubular 70 is omitted for clarity). Here diver 9 can see through one of compression plate 500's viewing windows (e.g., 580, 582, and/or 584) to see hot tapping tip 2010 and by locate the position of tip 2010 relative to the nested tubular to be hot tapped. In FIG. 9, diver 9 would see through view window 582, main opening 230 (of plate 200), opening 51 (of pipe 50), opening 61 (of pipe 60), and opening 71 (of pipe 70 although not shown), to finally see tip 2010 and locate it properly on nested pipe 80 for hot tapping pipe 80.

In one embodiment, after jetting, system 10 is mounted on pipe 50 which is substantially out of round in a non-symmetrical manner. In one embodiment system 10 is mounted below the sea floor on a substantially out of round pipe. In one embodiment the sea floor is jetted clear of pipe 50 between 1 and 30, 1 and 25, 1 and 20, 1 and 15, 1 and 14, 1 and 13, 1 and 12, 1 and 11, 1 and 10, 1 and 9, 1 and 8, 1 and 7, 1 and 6, and 1 and 5 feet. In one embodiment the sea floor is jetted clear of pipe 50 between 2 and 30, 2 and 25, 2 and 20, 2 and 15, 2 and 14, 2 and 13, 2 and 12, 2 and 11, 2 and 10, 2 and 9, 2 and 8, 2 and 7, 2 and 6, and 2 and 5 feet.

Hot Tap Procedures

Below an abbreviated procedure for hot tapping is provided in one embodiment.

Abandonment Procedure for Wells on a Platform That Has Fallen over. There are basically two ways to restore control of the wells on a platform that has fallen over. Abandon the wells completely in the order they are accessed. Or remove the bent or broken portion of the well and install a subsea wellhead.

Preliminary Work (1) Move on location and set up as needed.

(2) Make a review of the platform. Determine at what depths the wells are broken over. Determine whether cutting into the wells conductor pipe will cause the platform to move. Are the wells holding up any weight besides their own? When performing multi string hot tapping, operations go much more efficiently when larger diameter access holes can be taken out of the drive pipe.

(3) Verify that the pipelines have been removed and have no pressure on same.

(4) Mark the well number clearly at several points along their length.

(5) Remove Debris as needed to give divers access to the wells where they are as close to vertical as possible or below where they are broken over. This may entail going below the mud line. Quite often the inner wells are broken over at a lower depth than the outer wells. Make a diagram showing the depth that all the wells are broken over in relation to each other.

(6) Visually attempt to determine if any of the drive pipes 50, 50', 50", etc. have failed or are broken open. If so are any of the inner casing strings broken open.

(7) The personnel in the field must be cognizant of what the operator wishes to accomplish in order to determine at what depth the outer wells will need to be cut off and or tapped into.

(8) Determine a game plan as to what order the wells will be accessed and how the operator wishes to regain control of the wells. This will determine at what depth the wells will need to be hot tapped.

Hot Tap Procedure (1) Divers have previously gained access to the well and have prepared for themselves a work area.

(2) Determine the depth where the hot tap will be done. Install ropes around the Drive pipe 50 where the pipe is vertical—if there is plenty of room for working—Install the soft line around the pipe approximately 3 feet apart. Take a 2 inch flat chisel and remove all the barnacles from the work area between the ropes.

(3) Once the pipe is clean for work. Measure the pipe 50 with a tape to verify the diameter of same. Use the tape to make a line around the pipe in the middle between the two ropes as straight as possible. Using an imaginary plane cutting the pipe perpendicular to its longitudinal axis, draw four (4) vertical marking lines extending from the top rope to the bottom rope which are radially spaced apart (e.g., preferably 90-degrees radially spaced from each other). In one embodiment these vertical lines will be at: (a) 0 degrees; (b) 90 degrees, (c) 180 degrees; and (d) 240 degrees going in a clockwise manner around the pipe. In this manner the space between the 0 degree and 240 degree lines will provide the most area work.

(4) Verify that the outer drive pipe 50 has no pressure—i.e., it is been broken open, or if not broken has no interior annular pressure. If it can be verified as not being pressurized, use a drill (which can be hydraulically powered and magnetically attached) to drill holes at the radial locations of 0, 90 and 240 degrees. The size of the holes to be drilled will be determined by the drive pipe 50 and the inner casing string (e.g., 60, 70, and/or 80). Once the holes 52 are drilled, remove any annular cement as needed to measure the distance from the outer drive pipe 50 to the inner casing string 60. Once the interior location of the inner casing string 60 is determined relative to the drive pipe 50, the location of tool attachment can be decided upon. When the outer drive pipe cannot be verified to have no pressure inside of it. The outer drive pipe will have to be hot tapped, as is done in this procedure.

(5) Install the saddle clamp tool 100 with the center of the openings 230, 230' set at the 0 and 180 degree positions as indicated by the 0 and 180 degree vertical lines. The saddle clamp tool 100 can be installed by closing the two bolts on the open side and snugging them down, then backing off the holding nut on the opposite bolts then tightening the tighten nuts on the other two bolts. Finally, going back and tightening the two original nuts.

(6) Install a hot tap barrel 2000 on the saddle clamp tool 100 by sliding it over the top slick bolt, and then lining up the barrel against the drive pipe. Preferably, the barrel includes a properly size tapping tip 2010 which has a curved flexible (e.g., Teflon) seal installed to sealing fit against the drive pipe 50. Tighten the sealing nuts 244 to create a seal between the drive pipe 50 and the hot tap tip 2010. Test the seal against drive pipe 50 to 250 pounds per square inch pressure. Note: the end of the barrel 2050 has a 2 inch 1502 weco connection. The seal test can be done by installing a ¼ inch (or 1½ inch hose) to the back of the barrel 2050 and pressuring up the connection. If pressure is maintained then a seal has been formed.

(7) Remove the pressure test hose and install the Hot Tap Tool to the end of the barrel 2050 using a 2 inch 1502 weco quick connection (by hammering up the quick connect). Run in the hot tap tool 2000 till the ¾" flat drill 2100 of the hot tap tool 2000 touches the drive pipe 50. Pressure up the barrel 2050 between the 1 inch polished rod and chevron packing on the hot tap tool 2000 and the Teflon seal 2010 against the outer casing to 250 pounds per square inch pressure. Double check the stop setting on the hot tap tool 2000—should be set for the thickness of the diameter size of the outer casing 50 (e.g., the drive pipe 50 diameter=¾ inch+¹⁄₁₆ inch extra). Install the drill 2100 on the end of the hot tap tool 2000 and rotate the polished rod to rotate the ¾ inch bit on the end. Advance the polished rod with the wheel with about ¼ inch linear advancement per turn as the diver is drilling the ¾ inch hole. This linear advancement of the drill bit 2110 should be continued until either: (a) pressure change is seen and/or (b) break thru of the drill bit is felt (e.g., the metal/drilling gets easier or the diver hits the stop/makes enough turns on the wheel to have advanced same the proper distance).

(8) Once the hot tap tool 2000 has drilled thru the outer drive pipe 50, the drill 2100 should be removed from the hot tap tool 2000 and the hydraulic hoses disconnected with the hot tap tool 2000 positioned in a nearby location until needed again. Back out the polished rod till it clears the ball valve on the end of the barrel 2050 and close the ball valve. Bleed off any remaining pressure on the hot tap tool 2000 and remove same from the barrel 2050—2 inch 1502 weco hammer union connection. Send the hot tap tool 2000 back to surface until needed again.

(9) If there is any pressure behind the drive pipe 50 (i.e., in the annular space 62 between the interior of the drive pipe 50 and the first inner casing 60), install a 1½ inch pump in line to the end of the barrel 2050—2 inch 1502 weco hammer union connection. Test the line against the ball valve. Open the ball valve opening the annular space 62 to the surface. Perform the necessary actions to remove any pressure and or hydrocarbons from this annular space 62.

(10) Once all pressures and hydrocarbons have been removed from the annular space 62, remove the barrel 2050 and send back to the surface to be redressed for the next casing string 70 by changing the hot tap sealing tip 2010'. In one embodiment the hot tap tool 2000 can be connected to the hot tap clamp 100.

(11) Once the barrel 2050 is removed, measure the linear distance to the exterior of the next interior casing, pipe, and/or tubing 60. Such linear distance can be measured with a measuring probe. In one embodiment there are 20 inch, 30 inch, and 40 inch measuring probes included for such measurements. Cement in the annular space may need to be removed prior to being able to take this measurement. Brushes, chippers, grinders, etc. can be included to assist the divers in clearing it out the annular space 62 for making such measurement.

(12) Once this measurement is taken, a determination can be made regarding the maximum enlarged hole 52 that can be drilled in the exterior casing/pipe 50 to provide operating space and visual access to the next interior casing, pipe, and/or tubing 60. Send the drill 1000 down to the diver. Remove the 1 inch holding pin—straight pick up—from the saddle clamp 100 and line up the drill 1000—drop the pin in holding same. The initial drill 1000 will have the proper size bit 1400 already installed on the drill 1000—on all subsequent drilling events the diver will have to change out the bit 1400' to the proper size as needed. The drill 1000 sits on a multiple degree of freedom swiveling arm carriage that is held in place by the pin. Swivel the drill bit 1400 into place, lock it down solid by tightening the drill holding nuts. Advance the drill bit 1400 until it touches the drive pipe 50.

Detailed Hot Tap Procedure

Below is a more detailed hot tap procedure which can be used for various embodiments.

Dual plates 200, 200' will be set up with 8-20 inch Jaws, 4—Pivot Pins (with 8—mount brackets and 4—1 inch pins to hold them in place), 4—Mount Brackets for Clevis's and 4—Clevis's with 1⅞ inch×36 inch Long Bolts & Nuts. The Long Bolts will have inner Nuts on the Closed Side of the DSC preset for 20 inch Drive Pipe.

Depending on how the Clevis Mount Brackets are installed the diver can install drill 1000 on either their right or left side if they have a preference of plate 200 or 200'. Clevis Mount Brackets can be set to allow free movement when Drill Slide 1160 is installed on the Pivot Pin on the right and side of the either Plate 200 or 200' can still be installed on the Left Pivot Pin.

Clamp 100 can be prepared to be installed on Drive Pipe 50 by first determining the size of drive pipe 50. In one embodiment drive pipe 50 can be 20 inches in diameter. Plates 200 and 200' can have bolt holes cut out (or open slots) on one side to allow the bolts to be swung into and out of position. Plates 200 and 200' can also have ½ inch keys welded onto the end of the cut outs to keep the nut and washer from slipping out of position when they are loose. A set of 1 inch×10'-4 part Nylon Slings (length depends on the crane—the longer they are the more easily it will be for the diver to open and close clamp 100.

Lower clamp 100 alongside drive pipe 50 to the desired attachment location. With the diver assisting pulling clamp 100 around pipe 50 via the open side of clamp 100. Once clamp 100 it is in place, the diver will release the tension in the come along just enough to allow plates 200 and 200' to close around pipe 50. Close the two long clevis bolts on the open side by rotating them into the cut out bolt holes, over the ½ inch stop keys, and tightening down the nuts and washers. The nuts should be tightened hand tight with a hammer wrench.

At this time the diver should take a look at clamp 100 to determine that it is in place and fairly squared up. Look and see if the dies on the jaws 350, 360, 370, and 380 are engaged and that the front and back plates 200, 200' are in their desired position relative to each other and drive pipe 50. At this time, or at any later time, clamp 100 can be easily moved around drive pipe 50 simply by loosening the nuts on the open side and tightening up on the come along until the dies or jaws 350, 360, 370, and 380 (and 350', 360', 370', and 380') on the open side become disengaged from pipe 50, then simply rotate clamp 100 to the desired position or have the crane operator lower or raise the clamp 100 as needed.

Once clamp 100 is in place and the open side has been hand tightened, slack off the remainder of the way on the come along making sure it has slack in it and is not holding a bind on clamp 100. Diver should go around to the closed side and back off the two inside nuts, once they are free turn them at least three full rounds to make sure they do not interfere with the outside nuts being tightened. Tighten the two outside nuts on the closed side with the hammer wrench—hand tight.

Once again look at clamp 100 to verify it is in position and is level with drive pipe 50. As long as at least three of the dies (from 350, 360, 350', and 360') on the top set of jaws (4 jaws on top with 2 dies each and 4 jaws on bottom with 2 dies each) are making contact with drill pipe 50, clamp 100 will stay firmly in place. Have the crane operator slack off clamp 100 as it will hold its own weight with the outer nuts just snug. Tighten up the 4 outside nuts with a hammer wrench and a one handed sledge hammer until they are tight. There is no need to beat it with a 101b or 121b sledge, you can if you would like—the 2 inch thick plates with the 1⅞ inch bolts will take whatever tightening you would care to give them but the 16-1¼ inch×5⅞ inch Diamond Tooth Tong Dies that are in the jaws are made to hold in every direction.

Once clamp 100 is installed remove the 1 inch×10' 4 part sling from the top of clamp 100. Prior to running down clamp 100 and installing a "Deer Stand" work platform on drive pipe 50 for the diver to work of, drive pipe 50 area should be cleaned.

Run the end of the bundle of Hydraulic Hoses down to the diver and attach them out of the way but handy. The Hydraulic hose bundle consists of a set of 1 inch hoses (inlet and outlet) used to run drill 1000 and a set of ½ inch hoses used to run all the hand tools. Quick connects are installed on all of the hoses with inlet and outlet having male and female respectively to make sure they cannot be put on backward. Run the ¼ inch 10,000 psi test hose down to the diver and have him secure it out of the way.

Tap the 20 inch Drive Pipe 50 to determine if it has pressure on the inside of same. Compression plate 500 can be used with a 20 inch Mandrel 2050. The 20 inch Mandrel 2050 will have attached to it the Swivel Nut 800, Backing Nut 802, Seal Tip 2010 (with Teflon Seal Installed) on one end and the Ball Valve (with 2 inch 1502 Weco Connection) on the other. The Swivel Nut 800 is screwed onto the mandrel 2050 and allows the center flange 500 to transfer the load to the mandrel 2050. This swivel nut 800 allows for up to 10 to 15 degrees of rotation of the mandrel 2050 thru the flange 500. Backing Nuts for the Mandrel can be installed on its threads as needed if accessories are wanted. For example, there may be a desire to attach a video camera as a camera would allow personnel on the topside (e.g., Dive Supervisor), to be able to see the seal tip 2010 and assist the diver when installing the mandrel 2050. Also, a video camera would allow the dive supervisor to observe the seal tip 2010 to make sure it is level with the pipe (50, 60, 70, and/or 80) prior to energizing the seal or to see any die leaking out around the seal while testing. These backing nuts can be installed on the mandrel 2050 for any reason needed. The Seal Tip 2010 with Teflon Seal Inserted will be for 20 inch pipe 50. The Seal Tip 2010 and seal are cut to the curvature of the pipe (50, 60, 70, and/or 80) to be hot tapped. The Tip 2010 and the mandrel 2050 will have a line drawn on it to show the diver how to line it up with the pipe. The Ball Valve (BV) can be a 2 inch 6,000 pounds per square inch heavy duty type with a 1½ inch ID thru same. The Ball Valve has 2 inch Line Pipe connections on both sides and a 2 inch 1502 Weco Male Connection will be installed on the BV. The BV will be run down to the diver in the open position.

The diver will receive the Center Flange 500 with 20 inch mandrel 2050 on a center flange with a 20 inch tip 2010 on one end and ball valve open on the other. The diver will set the flange 500 on the 18 inch stud that is in the 12 O'clock position and remove the strap that holds it. The diver will slide the flange 500 forward on the 18 inch stud until the flange 500 is lined up on the 4-1⅝ inch×12 inch studs in the 2/4/8/10 positions. The diver will install 4-1⅝ inch nuts on the 2/4/8/10 studs until the nuts are completely on the studs but no further. The 20 inch mandrel 2050 and tip 2010 will have a top dead center line run down the length of it. The diver will advance the 20 inch mandrel 2050 by rotating the swivel nut 800 until the Teflon on the tip 2010 is engaged against the 20 inch pipe 50. At that time the diver needs to verify that the mandrel 2050 is perpendicular to pipe 50 and that the line on the mandrel 2050 is on top (i.e., mandrel 2050 should be is lined up properly with pipe 50). In order to get a seal mandrel 2050 should be line up perpendicular to the particular pipe the diver is attempting to seal against.

Once mandrel 2050 is in the proper position, tighten the 4-1⅝ inch nuts with a hammer wrench taking care to tighten one half of a turn at a time when turning by hand then one fourth of a turn at a time when using a hammer, going from nuts 2 to 8; to 4 to 10; then back to nut 2. Preferably nuts are tightened evenly. This tightening compresses the Teflon seal against pipe 50. Once mandrel 2050 is tightened against pipe 50, stop and look at the entire set up and verify that everything looks proper such as whether the line on mandrel 2050 is still top center and the mandrel 2050 is perpendicular to pipe 50 tip 2010 is sealing against.

Test the Teflon seal on the 20 inch drive pipe 50 to 250 pounds per square inch low/1,000 pounds per square inch high for 5 minutes each test. The testing will be done by installing a 2 inch 1502 Female Weco hammer up connection to the 2 inch 1502 male Weco connection on the end of the mandrel. When hammering on and off the 2 inch 1502 Weco connections it is not necessary to use a big hammer and lots of force, please use common sense and caution. Install the ¼ inch test hose, or whatever test hose the operator chooses to use to the ½ inch outlet on the end of the mandrel 2050. When testing, if the operator chooses to do so, Green Dye can be available to be mixed with seawater to assist in seeing any leaks.

Crane to send down the 30 inch stroke Hot Tap Tool 2000 with a 5⅞ inch long×¾ inch Fluted Bit with insert tips 2010 installed on same. In this case we will be using a ¾ inch Flat Tipped Cutting Insert on the Bit. Make up the hot tap tool 2000 to Mandrel 2050 by making up a 2 inch 1502 Weco connection. Throughout the procedure we will be utilizing the 3 inch diameter×30 inch stroke 6,000 pounds per square inch working pressure Hot Tap Tool 2000. In one embodiment both a 30 inch stroke Tool 2000 and a 54 inch Stroke tool 2000' will be sent out. Both have been designed to be used with this system 10. The 30 inch stroke tool 2000 works with the 20 inch Mandrel 2050. The 54 inch stroke tool 2000' works with the 30 inch and 40 inch Mandrels (2050' and 2050") should an extended reach be needed. The 54 inch stroke tool 2000' can also be used in conjunction with the 20 inch Mandrel 2050 should something happen to the 30 inch tool 2050'. Along with two Hot Tap Tools spare parts will be sent with each tool including an extra Lower Drilling Rod Assembly for both tools so they can be rebuilt in the field if needed. The Hot Tap Tool 2000 has a 1 inch Drilling Rod that is sealed off against Chevron packing (6 part). The packing retainer on the tools is made in such a way that it can be tightened if the packing starts leaking while drilling or anytime that the hot tap tool 2000 is installed on the well. The diver will be supplied with a special wrench to be able to tighten the packing retainer nut if needed. The 1 inch Rod is attached to the bit with a standard #2 Morris Taper (1¼ inch OD). The Mandrel 2050 has a 1.30 inch ID. The Seal Tip 2010 has a ¾ inch ID that helps to align the ¾ inch bit.

Make up the hot tap tool 2000 on the mandrel 2050. Leave the hot tap tool 2000 hanging from the crane while it is in the water. The hot tap tool 2000 is fairly light+/−150 lb of weight and when using same on a real well it could be hung off from an air bag if it is necessary to remove it from the crane. Test the Teflon seal on the 20 inch drive pipe 50, the packing around the 1 inch rod and the 1502 connection to 250 pounds per square inch low/1,000 pounds per square inch high for 5 minutes each test. Bleed off the pressure. Run in the hot tap tool 2000 by turning the hand wheel. The Drive Rod on the hot tap tool 2000 is a 2 inch OD Course Acme Thread with 4 Turns to the inch or ¼ inch advancement per Revolution of the hand wheel. The 1 inch Drilling Rod runs thru the 2 inch Drive Rod. The hot tap tool 2000 has two stop subs. One on the outside of the Hot tap tool 2000 and another on the threads of the 2 inch Drive Rod. Prior to sending the Hot tap tool 2000 down the Stop Subs on the Hot tap tool 2000 will be preset to not allow the diver to drill more than 1/16 inch past the thickness of the pipe that will be drilled. The hot tap tool 2000 was designed to work in conjunction with the mandrel 2050 to where when the 20 inch Mandrel 2050 is used with the 30 inch stroke Hot tap tool 2000 the 30 inch Hot tap tool 2000 can only drill out approximately 2 inch past the Seal Tip 2010. This allows the diver to close up the Hot tap tool 2000 almost completely prior to starting to do any drilling with same, making it easier on the diver.

After testing. Bleed off the test pressure to Zero pounds per square inch, this allows the diver a better feel for what he is doing. Advance the bit in the Hot tap tool 2000 +/−27½ inch until it hits the Teflon seal. The Teflon seal when installed on the seal tip 2010 had a ¾ inch opening. Because the Teflon seal was compressed against the pipe to make a seal it has been compressed or flared on the inside as well as the outside. Once the diver advances the drill bit as far as possible rotate the drill on the Hot tap tool 2000 By hand to cut the Teflon away and advance the bit until the bit makes contact with the pipe. Sometimes the bit, because it is a flat tip, has trouble getting into the ¾ inch ID of the seal tip 2010 (the mandrel 2050 has a 1.30 inch ID). NOTE: It is easy to cut Teflon by hand, it is not as easy to drill metal and the diver can feel the difference. At this time the bit is against the Drive pipe 50. Take the time to double check the Stop Subs by looking at them and verifying they are set for drilling only the thickness of the pipe, in this case 1 inch wall thickness Drive pipe 50, +1/16 inch only. Pressure up on the Hot tap tool 2000 and seals to 500 pounds per square inch. Send down a hand drill and make it up on the hydraulic hoses.

Drill thru the 20 inch×1 inch Wall Drive Pipe 50 by drilling turning the bit 2110 with a hydraulic hand drill and advancing the bit 2110 with the wheel by hand. Keep track of the rounds turned on the wheel to verify the distance drilled. In this case 1 inch pipe will be 4 complete revolutions. Do not force the bit 2110—when the bit 2110 drills thru the pipe 50 the diver can feel it and there will be a fluctuation in pressure.

Once the diver has drilled thru the pipe 50 stop drilling and check and record the pressure. Advance and retract the bit 2110 thru the hole to make sure it is completely cut out to a ¾ inch opening. Watch for metal shavings getting the bit 2110 in a bind. If that occurs it is often remedied by pumping water into the Hot tap tool 2000 to flush or move the cuttings.

Once you are sure that the hole has been cut in the pipe 50 and there is a full ¾ inch opening. Secure the hand drill. Back out the bit 2110 until it clears the Ball Valve. If the casing is not static, close the Ball valve.

If the Ball valve is closed, bleed off any remaining pressure on the Hot tap tool 2000 and hose.

Disconnect the Test Hose and secure same.

Open the needle valve on the Hot tap tool 2000 to double verify there is no pressure left on it. Remove the Hot tap tool 2000 and send same to surface.

If the casing 50 drilled has pressure on it. Install the 1½ inch Kill Line and test as needed against the ball valve. Open the Ball valve. Deal with the pressure by pumping in or bleeding off as needed until the casing 50 is static. If there was no pressure on the casing the Ball valve was left open.

With the Ball valve Open, remove the Flange Plate 500 by backing out the 4-1⅝ inch nuts and send the Flange Plate 50 and Mandrel 2050 assembly to the surface.

Once the mandrel 2050 assembly has been removed, measure the distance with the measuring probe thru the ¾ inch hole to the next casing string 60. Hot tap tool 2000 has 20 inch, 30 inch and 40 inch measuring probes included in each box. Cement may need to be removed prior to being able to take this measurement. If needed send down a hand drill with a ⅝ inch masonry bit.

Normally the next casing string 60 size is known. In this case we have a string of 10¾ inch 45.5#/ft J-55 casing. When taking the measurement it is never known for sure if you are on a collar or not.

Care should be taken here when getting these measurements and selecting the size of core bit 1400 to drill out of casing 50. When drilling into any casing string a balance must be maintained between getting as big a hole as possible and not having the casing that is being drilled to fail or collapse. As a general rule the size of the hole being drilled should not exceed 50% of the casing 50 you are drilling. The Hot tap tool 2000 supervisor will be able to calculate that and look at the different size holes that can be drilled depending on outer casing size versus inner casing size and the distance between them. Calculate the maximum size hole that can be drilled without drilling into the next casing or tubing string. Prior to starting you also need to consider what size of hole you would like to have in the production casing. In this case the production casing is 7⅝ inch therefore the maximum hole size that can be drilled is +/−4 inch (+/−50% of 7⅝ inch), to be able to drill a 4 inch hole on the 7⅝ inch, you must drill at least a 4½ inch hole (½ inch bigger minimum) on the 10¾ inch casing, which means we must have at least a 5 inch hole on the 20 inch. So 5 inch can be the minimum size you can start with on the 20 inch Drive pipe 50. The Hot tap tool 2000 Saddle Clamp 100 has an 11½ inch Opening but the biggest hole recommended to start with is 10 inch.

Have the diver remove the Cotter Pin from the bottom of the 1½ inch Pivot Pin. Send down the articulating drill assembly 1000 attached on the crane. Line up the aluminum arm 1110 on same with the pivot pin on plate 200 and drop the Pivot Pin into place. Install the cotter pin on the pivot pin. Remove the crane straps or slings from drill assembly 1000. Send slings to surface.

20 inch Drive pipe 50×10¾ inch inner casing string (centered)=10 inch bit. The initial 10 inch bit 1400 will have been already installed on drill 1000—on all subsequent drilling events the diver will have to change out the bit 1400 to the proper size as needed. Rotate the DS into place in the front of clamp 100, the bottom five bolts can be used for the DS. It has been our experience that only two 1⅝ inch nuts will be needed to hold the Articulating drill 1000 in place on the Clamp 100 while drilling therefore on the bottom of the Clamp 100 two 1⅝ inch×8 inch long studs were installed for the Articulating drill 1000 on at the #5 and #7 positions. Tighten up the 2×1⅝ inch nuts installing the Articulating drill 1000 into place on the Clamp 100. Install 1 inch Hydraulic Hoses to the Drill 1000. Advance the drill until the bit 1400 touches the drive pipe 50. Start the drill 1000 and make sure it is turning properly. Cut out the 10 inch coupon being careful not to cut into the 10¾ inch casing 60.

Remove the 10 inch coupon.

Remove the 10 inch bit 1400 and send to the top.

Remove the two 1⅝ inch nuts and rotate the Articulating drill 1000 back out of the way and secure same. If possible leave the Hydraulic Hoses mounted to the drill. If not remove and secure same.

Clean out any cement between the 20 inch×10¾ inch annulus. Verify that there is not a collar in the way. During this test we know there is no cement in this annulus or a collar, but the 10¾ inch casing will have to be cleaned off where we will be installing the seal tip 2010. Send down tools as needed to clean off same.

If there is a collar on the inner casing string 60, a decision will have to be made to either move the Clamp 100 up or down to get away from it and starting over. Or, the Hot tap tool 2000 system has not only Center Flanges 500 but offset flanges 500' that allow movement of the Mandrel 2050 in a circle about inches in radius (up or down vertically from center), and to still be perpendicular to the inner casing string 60 for tapping purposes. Consideration should be given to whether this should be done on the basis of how many more inner strings will have to be dealt with and whether part of the collar can be cut out without sacrificing structural integrity of the pipe after it is tapped to gain access to the inner strings.

Next the diver needs to determine where the centerline of the inner casing string 60 lies in relation to the Clamp 100. In order to get a seal—the seal tip 2010 is preferably set on the centerline of the pipe 60 and the mandrel 2050 lined up perpendicular to pipe 60 attempting to be sealed against. One advantage of the method and apparatus is the flexibility allowed when lining up on the inner casing strings (60, 70, and 80). The hot tap tool 2000 swivel nut 800 is primarily used to allow the mandrel 2050 to be perpendicular to the inner casing string (60, 70, or 80) where there is a difference in angle from vertical between the Drive Pipe 50 and the inner casing strings (60, 70, or 80). This allows the new system some ability to get on Drive pipe 50 that is not only out of round but also still not vertical. The Offset Flange 500 with offset 552 allows the mandrel 2050 to be moved up and down as well as right and left (e.g., up to 4 inches). Extreme caution must be exercised when attempting to utilize the Swivel Nut 800 to make up for fact that the inner casing strings (60, 70, or 80) are more than 10 Degrees to the left or right of the centerline of the Clamp 100. When the 1⅝ inch nuts are tightened against the flange 500 to effect a seal, they move the flange 500 in the direction of the centerline of the Clamp 100 (and not in the direction mandrel 2050 is pointed when mandrel 2050 is offset). If the centerline of any subsequent inner string (60, 70, or 80) is encountered where it is more than 10 Degrees to the left or right of the Clamp 100 centerline then the Clamp 100 is preferably rotated on drive pipe 50 to line up Clamp 100 with the inner strings (60, 70, or 80).

Because casing 60 is found to be centered, 10¾ inch casing 60 will be tapped to determine if it has pressure on the inside of same, utilizing the Center Flange 500 with the 20 inch Mandrel 2050 assembly. The diver will receive the Center Flange 500 with 20 inch mandrel 2050 with a 10¾ inch tip 2010. The diver will set the flange 500 on the 18 inch stud that is in the 12 O'clock position and remove the strap that holds it. The diver will slide the flange 500 forward on the 18 inch stud till the flange 500 is lined up on the 4-1⅝ inch×12 inch studs in the 2/4/8/10 positions. The diver will install 4-1⅝ inch nuts on the 2/4/8/10 studs till the nuts are completely on the studs but no further. The 20 inch mandrel 2050 and tip 2010 will have a top dead center line run down the length of it. The diver will advance the 20 inch mandrel 2050 by rotating the swivel nut 800 until the Teflon on the tip 2010 is engaged against the 10¾ inch pipe 60. At that time the diver needs to verify that the Seal tip 2010 is on the centerline of the pipe and the mandrel 2050 is perpendicular to pipe 60 and that the line on the mandrel 2050 is on top (i.e., that the mandrel 2050 is lined up properly with the pipe 60). In order to get a seal—seal tip 2010 should be set on the centerline of the pipe 60 and the mandrel 2050 lined up perpendicular to the pipe 60 attempted to be sealed against. Once the mandrel 2050 is in the proper position, tighten the 4-1⅝ inch nuts with a hammer wrench taking care to tighten a ½ turn at a time when turning by hand then a ¼ turn at a time when using a hammer, going from 2 to 8 to 4 to 10 then back to 2. It is preferable that they are tightened evenly. This tightening compresses the Teflon seal against the pipe 60. Once the mandrel 2050 is tightened against the pipe 60 stop and look at the entire set up and verify that everything looks proper (i.e., the line on the mandrel 2050 is still top center and the mandrel 2050 is perpendicular to the pipe 60 it is sealing against).

Test the Teflon seal on the 10¾ inch casing 60 to 250 pounds per square inch low/1,500 pounds per square inch high for 5 minutes each test. The testing will be done by installing a on the end of the mandrel 2050. Install the ¼ inch test hose, pressure gauge and bleed off valve. After performing the test bleed off the pressures and remove the hose and connection.

Crane to send down the 30 inch stroke Hot tap tool 2000' with a 5⅞ inch long×¾ inch Fluted Bit with a ¾ inch Flat Tipped Cutting Insert on the Bit.

Make up the Hot tap tool 2000' on the mandrel 2050. Install the ¼ inch test hose to the ½ inch Needle Valve with a pressure gauge and bleed off valve. Test the Hot tap tool 2000 against the Teflon seal on the 10¾ inch casing to 250 pounds per square inch low/1,500 pounds per square inch hi for 5 minutes each test. Bleed off the pressure.

Prior to sending the Hot tap tool 2000' down the Stop Subs on the Hot tap tool 2000' will be preset to not allow the diver to drill more than 1/16 inch past the thickness of the pipe that will be drilled. In this case 10¾ inch 45.5#/ft casing is 9.95 inch ID=0.4 inch thick. Please note: the drift=9.794 inch therefore the casing could be up to 9.95 inch-9.794 inch/2=2.5/64 inch extra thick therefore the 1/16 inch extra will make up for it.

Advance the bit in the Hot tap tool 2000'+/−27½ inch until it hits the Teflon seal. Once the diver advances the drill bit as far as possible rotate the drill on the Hot tap tool 2000' by hand to cut the Teflon away and advance the bit until the bit makes contact with the pipe 60. Double check the Stop Subs.

Pressure up on the Hot tap tool 2000' and 10¾ inch seal to 1,000 pounds per square inch. Send down a hand drill and make it up on the hydraulic hoses.

Drill thru the 10¾ inch×0.4 inch Wall Casing 60 by drilling turning the bit with a hydraulic hand drill and advancing the bit with the wheel by hand. Keep track of the rounds turned on the wheel to verify the distance drilled. In this case 0.4 inch pipe+1/16 inch=0.0625 inch=0.4625 inch therefore it will be a little less than 2 complete revolutions. Do not force the bit. When the bit drills thru the pipe the diver can feel it and there will be a fluctuation in pressure.

Once the diver has drilled thru the pipe 60, stop drilling. Check and record the pressure and advance and retract the bit thru the hole to make sure it is completely cut out to a ¾ inch opening. Watch for metal shavings getting the bit in a bind. If that occurs it is often remedied by pumping water into the Hot tap tool 2000' to flush or move the cuttings.

Once you are sure that the hole has been cut in the pipe 60 and there is a full ¾ inch opening. Secure the hand drill. Back out the bit until it clears the Ball Valve. If the casing 60 is not static, close the Ball valve. If the Ball valve is closed, bleed off any remaining pressure on the Hot tap tool 2000' and hose. Disconnect the Test Hose and secure same.

Open the needle valve on the Hot tap tool 2000' to double verify there is no pressure left on it. Remove the Hot tap tool 2000' and send same to surface.

If the casing 60 drilled has pressure on it install the 1½ inch Kill Line and test as needed against the ball valve. Open the Ball valve, deal with the pressure by pumping in or bleeding off as needed until the casing 60 is static. If there was no pressure on the casing the Ball valve was left open.

With the Ball valve Open, remove the Flange Plate 500 by backing out the 4-1⅝ inch nuts and send the Flange Plate 500 and Mandrel 2050 assembly to the surface.

Once the mandrel 2050 assembly has been removed, measure the distance with the measuring probe thru the ¾ inch hole to the next casing string 70. Cement may need to be removed prior to being able to take this measurement. If needed send down a hand drill with a ⅝ inch masonry bit. In this case there is no cement between the casing strings so we will not have any to drill out.

Normally the next casing string 70 size is known. In this case we have a string of 7⅝ inch 33.7#/ft N-80. Casing. When taking the measurement it is never known for sure if you are on a collar or not.

Care must be taken here when getting these measurements and selecting the size of core bit to drill out of the casing. The Hot tap tool 2000 supervisor will be able to calculate that and look at the different size holes that can be drilled depending on outer casing size versus inner casing size and the distance between them. Always calculate the maximum size hole that can be drilled without drilling into the next casing or tubing string.

10¾ inch casing×7⅝ inch inner casing string 70 is found to be centered. Rotate the Articulating drill 1000 into place in the front of the Clamp 100. Install two 1⅝ inch nuts on the #5 and #7 position studs. Tighten up the 2×1⅝ inch nuts installing the Articulating drill 1000 into place on the Clamp 100. Hydraulic Hoses were previously installed to the Drill 1000. Advance the drill bit 1400 until the drill bit touches 10¾ inch casing/pipe 60. At this time the diver must make sure that the drill bit 1400 is lined up on the centerline of the inner string of casing 60. In one embodiment drill bit 1400 is adjustable in multiple directions (advanced in and out along with adjustment to be able to go right or left, along with the ability to pivot). Drill bit 1400 can be turned up to 5, 10, 15, 20, 25, and 30 degrees to the left or right of the centerline of the Clamp 100 in order to line up the drill bit 1400 on the centerline of any subsequent inner string (70 or 80) without having to rotate the complete Clamp 100 on the drive pipe 50 and starting over. However, should the diver be unable to line up the drill bit 1400 to the centerline of the inner casing strings 70 or 80 the diver should move the Clamp 100 and start over again.

Start the drill bit 1400 and make sure it is turning properly. Cut out and remove the coupon being careful not to cut into the 7⅝ inch casing 70.

Remove drill bit 1400 and send to the top.

Remove the two 1⅝ inch nuts and rotate the Articulating drill 1000 back out of the way and secure same. If possible leave the Hydraulic Hoses mounted to the drill 1000. If not remove and secure same.

Clean out any cement between the 10¾ inch×7⅝ inch annulus 72. Verify that there is not a collar in the way.

Next, the 7⅝ inch Production casing 70 will be tapped to determine if it has pressure on the inside of same. The Center Flange 500 will be used with a 20 inch Mandrel 2050 assembly.

Test the Teflon seal on the 7⅝ inch casing to 250 pounds per square inch low/3,500 pounds per square inch high for 5 minutes each test. The testing will be done by installing a on the end of the mandrel 2050. Install the ¼ inch test hose, pressure gauge and bleed off valve. After performing the test to everyone's satisfaction bleed off the pressures and remove the hose and connection.

Crane to send down the 30 inch stroke Hot tap tool 2000' with a 5⅞ inch long×¾ inch Fluted Bit with a ¾ inch Flat Tipped Cutting Insert on the Bit.

Make up the Hot tap tool 2000' on the mandrel 2050. Install the ¼ inch test hose to the ½ inch Needle Valve with a pressure gauge and bleed off valve. Test the Hot tap tool 2000 against the Teflon seal on the 7⅝ inch casing to 250 pounds per square inch low/3,500 pounds per square inch hi for 5 minutes each test. Bleed off the pressure.

Prior to sending the Hot tap tool 2000' down the Stop Subs on the Hot tap tool 2000' will be preset to not allow the diver to drill more than 3/32 inch past the thickness of the pipe that will be drilled. In this case 7⅝ inch 33.7#/ft casing is 6.765 inch ID=0.43 inch thick. Please note: the drift=6.640 inch therefore the casing could be up to 6.765 inch−6.640 inch/2=1/16 inch extra thick therefore the 3/32 inch extra will make up for it. NOTE: Normally we only use 1/16 inch extra—in this case we used 3/32 inch. Common sense will have to be used at all times when working on these wells.

Advance the bit in the Hot tap tool 2000'+/−27½ inch until it hits the Teflon seal. Once the diver advances the drill bit as far as possible rotate the drill on the Hot tap tool 2000' by hand to cut the Teflon away and advance the bit until the bit makes contact with the pipe 70. Double check the Stop Subs.

Pressure up on the Hot tap tool 2000' and 7⅝ inch seal 2010 to 1,500 pounds per square inch. Send down a hand drill and make it up on the hydraulic hoses.

Drill thru the 7⅝ inch×0.43 inch Wall Casing 70 by drilling turning the bit with a hydraulic hand drill and advancing the bit with the wheel by hand. Keep track of the rounds turned on the wheel to verify the distance drilled. In this case 0.43 inch pipe+3/32 inch extra=0.09375 inch=0.52375 inch will be about 2 complete revolutions. Do not force the bit. When the bit drills thru the pipe the diver can feel it and there will be a fluctuation in pressure.

Once the diver has drilled thru the pipe 70 stop drilling. Check and record the pressure. Advance and retract the bit thru the hole to make sure it is completely cut out to a ¾ inch opening. Watch for metal shavings getting the bit in a bind. If that occurs it is often remedied by pumping water into the Hot tap tool 2000 to flush or move the cuttings.

Once you are sure that the hole has been cut in the pipe 70 and there is a full ¾ inch opening. Secure the hand drill. Back out the bit until it clears the Ball Valve. If the casing 70 is not static, close the Ball valve. If the Ball valve is closed, bleed off any remaining pressure on the Hot tap tool 2000 and hose. Disconnect the Test Hose and secure same.

Open the needle valve on the Hot tap tool 2000 to double verify there is no pressure left on it. Remove the Hot tap tool 2000' and send same to surface.

If the casing 70 drilled has pressure on it. Install the 1½ inch Kill Line and test as needed against the ball valve. Open the Ball valve. Deal with the pressure by pumping in or bleeding off as needed until the casing is static. If there was no pressure on the casing the Ball valve was left open.

With the Ball valve Open, remove the Flange Plate 500 by backing out the 4-1⅝ inch nuts and send the Flange Plate 500 and Mandrel 2050 assembly to the surface.

Once the mandrel 2050 assembly has been removed, measure the distance with the measuring probe thru the ¾" hole to the tubing string 80.

Normally the OD of the tubing string is known. In this case we have a 2⅜" 4.7#/ft N-80 tubing. When taking the measurement it is never known for sure if you are on a collar or not.

Care must be taken here when getting these measurements and selecting the size of core bit to drill out the tubing. The Hot Tap Tool 2000 Supervisor will be able to calculate that and look at the different size holes that can be drilled depending on the inner versus outer size pipes and the distance between them. Always calculate the maximum size hole that can be drilled without drilling into the next casing or tubing string.

7⅝" casing 70×2⅜" tubing 80 is found to be centered. Install the bit on the Articulating drill 1000. Rotate the Articulating drill 1000 into place in the front of the Clamp 100. Install two 1⅝" nuts on the #5 and #7 position studs. Tighten up the 2×1⅝" nuts installing the Articulating drill 1000 into place on the Clamp 100. Hydraulic Hoses were previously installed to the Drill 1000. Advance the drill bit 1400 until the bit touches the 7⅝" casing 70. At this time the diver must make sure that the drill bit 1400 is lined up on the centerline on the inner string 70 of casing. In one embodiment drill bit 1400 is adjustable in multiple directions (advanced in and out along with adjustment to be able to go right or left, along with the ability to pivot). Drill bit 1400 can be turned up to 5, 10, 15, 20, 25, and 30 degrees of centerline of clamp 100 in order to line up the drill bit 1400 on the centerline of any the tubing string 80 without having to rotate the complete clamp 100 on the drive pipe 50 and starting over. However, should the diver be unable to line up the drill bit 1400 to the centerline of the inner string 80 the diver should move the Clamp 100 and start over.

Start the drill bit 1400 and make sure it is turning properly. Cut out the coupon being careful not to cut into the 2⅜" tubing 80. At this time the well will look like FIG. 12. Remove the drill bit 1400 and send to the top. Remove the 2-1⅝" nuts and rotate the Articulating drill 1000 back out of the way and secure same.

The 2⅜" tubing 80 will have to be tapped to determine if it has any pressure inside of same. The center flange 500 will be used with a 20 inch mandrel assembly 2050. When attempting to effect a seal against the tubing 80 it may be necessary to put a back up seal tip 2010' against same to keep the tubing 80 from moving as in FIG. 14.

Test the Teflon seal on the 2⅜" tubing to 250 pounds per square inch low/3,500 pounds per square inch High for 5 minutes each test. The testing will be done by installing a ¼" test hose on the end of mandrel 2050 with a pressure gauge and bleed off valve. After performing the test to everyone's satisfaction bleed off the pressures and remove the hose and connection.

Crane to send down the 30 inch stroke hot tap tool 2000' with a 5⅞"×¾" Bit with a ¾" cutting insert in the bit.

Make up Hot Tap Tool 2000' on the mandrel 2050. Install the ¼" test hose to the ½" needle valve with a pressure gauge and bleed off valve. Test the hot tap tool 2000 against the Teflon seal on the 2⅜" tubing to pounds per square inch low/3,500 pounds per square inch High for 5 minutes each test. Bleed off the pressure.

Advance the bit in the hot tap tool 2000'+/−27½" until it hits the Teflon seal. Drill out the seal by hand until it makes contact with the pipe 80. Pressure up on the hot tap tool 2000' and the 2⅜" tubing seal 2010 to 1,500 pounds per square inch. Send down a hand drill and make up the hydraulic hoses to same.

Drill thru the 2⅜" tubing 80. When the drill bit goes thru the tubing the diver will feel it and there will be a fluctuation in the pressure.

Check and record pressure. Advance and retract the bit to make sure it is cut out clean. Secure the hand bit. Back out the bit until it clears the Ball Valve. If the tubing 80 is not static close the ball valve. Bleed off any pressure.

Remove clamp 100 and the well is finished.

The following is a list of Reference numerals which are used in this application.

LIST OF REFERENCE NUMERALS

| Reference Number | Description |
| --- | --- |
| 10 | system |
| 50 | first pipe |
| 51 | opening |
| 60 | second pipe |
| 61 | opening |
| 62 | annular space between first and second pipes |
| 70 | third pipe |
| 71 | opening |
| 72 | annular space between second and third pipes |
| 80 | fourth pipe or tubing |
| 82 | annular space between third and fourth pipes |
| 84 | interior of fourth pipe or tubing |
| 100 | clamp |
| 110 | stabilizer system |
| 111 | plate |
| 112 | plate opening |
| 113 | plate opening |
| 114 | plate slot |
| 115 | annular bearing |
| 116 | central opening |
| 117 | first bearing housing section |
| 118 | cavity |
| 119 | opening |
| 120 | opening |
| 121 | bolt |
| 122 | bolt |
| 123 | lever/handle |
| 124 | lever/handle |
| 125 | second bearing housing section |
| 126 | internally threaded opening |
| 127 | internally threaded opening |
| 128 | upper part |
| 129 | lower part |
| 130 | upper flat surface |
| 131 | lower flat surface |
| 132 | middle flat surface |
| 133 | opening |
| 134 | upper flat plate surface |
| 135 | lower flat plate surface |
| 136 | rear flat plate surface |
| 137 | front flat plate surface |
| 138 | threaded portion |
| 139 | threaded portion |
| 150 | chain |
| 200 | first plate |

-continued

| Reference Number | Description |
| --- | --- |
| 210 | first side |
| 220 | second side |
| 230 | main opening |
| 240 | plurality of openings for supporting compression plate |
| 242 | plurality of threaded fasteners |
| 244 | plurality of sealing nuts |
| 246 | arrow |
| 250 | set of foot support openings |
| 252 | second set of foot support openings |
| 260 | set of foot support openings |
| 262 | second set of foot support openings |
| 270 | set of foot support openings |
| 272 | second set of foot support openings |
| 280 | set of foot support openings |
| 282 | second set of foot support openings |
| 290 | plurality of openings for pivot support bracket |
| 291 | bracket |
| 292 | plurality of openings for pivot support bracket |
| 293 | bracket |
| 294 | pin |
| 295 | plurality of openings for pivot support bracket |
| 296 | bracket |
| 297 | plurality of openings for pivot support bracket |
| 298 | bracket |
| 299 | pin |
| 300 | support opening |
| 302 | support opening |
| 304 | support opening or slot |
| 306 | support opening or slot |
| 350 | foot |
| 360 | foot |
| 370 | foot |
| 380 | foot |
| 390 | base |
| 392 | curved surface |
| 394 | traction system |
| 396 | traction system |
| 500 | compression plate |
| 510 | first side |
| 520 | second side |
| 530 | plurality of support openings |
| 550 | main opening |
| 551 | offset from centerline |
| 552 | arrow |
| 554 | arrow |
| 560 | tapered area |
| 580 | view opening |
| 582 | view opening |
| 584 | view opening |
| 586 | view opening |
| 600 | compression plate |
| 700 | double main opening compression plate |
| 702 | first section |
| 703 | viewing window |
| 704 | second section |
| 705 | viewing window |
| 710 | first side |
| 720 | second side |
| 730 | plurality of support openings |
| 750 | first main opening |
| 752 | tapered area for first main opening |
| 754 | bore |
| 760 | second main opening |
| 762 | tapered area for second main opening |
| 800 | swivel nut |
| 802 | backing nut |
| 810 | first side |
| 814 | plurality of sides |
| 820 | second side |
| 824 | plurality of sides |
| 830 | tapered area |
| 832 | flat surface |
| 840 | interior |
| 850 | threaded area |
| 854 | exterior diameter |
| 1100 | articulating drill system |

-continued

| Reference Number | Description |
| --- | --- |
| 1110 | first arm |
| 1120 | second arm |
| 1122 | pivot connection between first and second arms |
| 1150 | base |
| 1152 | pivot connection between second arm and base |
| 1160 | longitudinal track system |
| 1170 | handle for longitudinal track system |
| 1200 | perpendicular track system |
| 1210 | handle for perpendicular track system |
| 1300 | drill motor |
| 1400 | cutting tip |
| 1410 | arrow |
| 1420 | arrow |
| 1500 | connection plate |
| 1502 | plurality of openings |
| 1510 | pivoting joint between connection plate and base |
| 1550 | quick release/quick lock for pivoting joint |
| 2000 | hot tapping system |
| 2010 | tip |
| 2011 | sealing insert material |
| 2012 | curved surface of sealing insert material |
| 2014 | cup for sealing insert |
| 2015 | curved surface of tip |
| 2016 | first end |
| 2017 | second end |
| 2018 | peripheral recess |
| 2020 | O-ring seal |
| 2050 | barrel |
| 2054 | threading |
| 2100 | hot tap drill |
| 2110 | drill bit |
| 2200 | arrow |
| 2210 | arrow |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A system for hot tapping a plurality of nested pipes including an exterior pipe having a bore and at least one interior pipe contained within the bore comprising:
   (a) a hot tap tool guide assembly detachably connected to the exterior pipe, the assembly including at least one plate having a plate opening:
   (b) a hot tapping tool capable of penetrating a selected one or more of the pipes, the tool including a hot tapping tip;
   (c) a seal member on the hot tapping tool that enables a seal to be perfected between the hot tapping tool and a selected one of the pipes; and
   (d) the hot tap tool guide assembly including a swiveling connection opening for supporting the hot tapping tip wherein the tip can be non-linearly adjusted relative to the plate and wherein the tip is longitudinally extendable through the plate opening.

2. The system of claim 1, wherein the tip is articulable in three hundred and sixty degrees about a generally circular path.

3. The system of claim 1, wherein the tip is connected to the assembly through the swiveling connection and the swiveling connection includes a ball and socket joint.

4. The system of claim 1, wherein the swiveling connection includes a swivel nut mounted on the plate which operatively connects the tip to the assembly and allows the angular articulation of the tip relative to the plate.

5. The system of claim 1, wherein the hot tap tool guide assembly includes a compression plate and swivel nut, the swivel nut being connected through a ball and socket joint to the compression plate, the swivel nut being threadably connected to a mandrel, and the tip being connected to the mandrel, so that rotation of the mandrel relative to the swivel nut in a first direction causes movement of the mandrel towards the interior of the hot tap tool guide assembly, and relative rotation of the mandrel relative to the swivel nut in a second direction causes movement of the mandrel away from the plate.

6. The system of claim 5, wherein the plate includes at least one viewing window.

7. The system of claim 5, wherein the swivel nut is eccentrically mounted on the plate so that rotation of the plate causes linear movement of the swivel nut relative to the hot tap tool guide assembly.

8. The system of claim 5, wherein the swivel nut is eccentrically mounted on the plate so that rotation of the plate causes a relative change in position of the swivel nut relative to the hot tap tool guide assembly.

9. The system of claim 1, wherein the hot tap tool guide assembly includes a clamp which detachably connects the hot tap tool guide assembly to the exterior of the pipe.

10. The system of claim 1, wherein there are straps attached to the plate that enable the plate to be secured to the pipe, wherein the straps hold the plate to the pipe.

11. A method of tapping hot tapping a plurality of nested pipes having an exterior pipe and at least one interior pipe comprising the steps of:
   (a) connecting a hot tapping tool to the exterior pipe;
   (b) non-linearly adjusting the hot tapping tool in relation to at least one of the plurality of nested pipes;
   (c) providing a seal member on the hot tapping tool that creates a sealing connection with an exterior surface of a selected one of the plurality of nested pipes; and
   (d) hot tapping to the selected one of the plurality of the nested pipes.

12. The method of claim 11, wherein in step "a", the hot tapping tool includes a swiveling connection for a hot tapping tip wherein the hot tapping tip can be non-linearly articulated from a line that is generally perpendicular to an exterior surface of the exterior pipe.

13. The method of claim 11, wherein the tip is connected to hot tapping tool through a ball and socket joint.

14. The method of claim 11, wherein the tip includes a swivel nut which operatively connects the tip to the hot tapping tool and allows the angular articulation of the tip.

15. The method of claim 11, wherein the hot tapping tool includes a compression plate which provides a longitudinal force on the tip to compress the tip, and swivel nut, the swivel nut being connected through a ball and socket joint to the hot tapping tool, the swivel nut being threadably connected to a mandrel, and the tip being connected to the mandrel, such that rotation of the mandrel relative to the swivel nut in a first direction causes movement of the mandrel towards an interior of the hot tapping tool, and relative rotation of the mandrel relative to the swivel nut in a second direction causes movement of the mandrel away from the interior of the hot tapping tool.

16. The method of claim 15, wherein during step "d", the hot tapping tool includes at least one viewing window which allows for viewing of the tip.

17. The method of claim 15, wherein during step "d" the hot tapping tool includes a plurality of viewing windows, each of which allows for viewing of the tip.

18. The method of claim 11, wherein multiple coaxial strings of underwater piping and/or tubing for overturned rigs or platforms are simultaneously hot tapped.

19. The method of claim 11, wherein during step "b" angular adjustment of the tip relative to the exterior piper includes adjustment both up and down and side to side, and in a spherical manner.

20. The method of claim 11, wherein during step "d" one or more openings provide visual access to pipes and the area of hot tapping seal even while hot tapping tool is mounted on the clamp.

\* \* \* \* \*